US008239750B2

(12) United States Patent
Thomsen

(10) Patent No.: US 8,239,750 B2
(45) Date of Patent: Aug. 7, 2012

(54) EXTRACTING SEMANTICS FROM DATA

(76) Inventor: Erik Thomsen, Cambridge, MA (US)

( * ) Notice: Subject to any disclaimer, the term of this patent is extended or adjusted under 35 U.S.C. 154(b) by 401 days.

(21) Appl. No.: 12/560,389

(22) Filed: Sep. 15, 2009

(65) Prior Publication Data

US 2010/0169758 A1    Jul. 1, 2010

Related U.S. Application Data

(60) Provisional application No. 61/136,565, filed on Sep. 15, 2008, provisional application No. 61/193,004, filed on Oct. 21, 2008.

(51) Int. Cl.
G06F 17/30 (2006.01)
(52) U.S. Cl. ............................................ 715/212
(58) Field of Classification Search ............. 715/212
See application file for complete search history.

(56) References Cited

U.S. PATENT DOCUMENTS

| 2002/0165865 | A1 | 11/2002 | Hosokai | |
|---|---|---|---|---|
| 2004/0172591 | A1* | 9/2004 | Rothschiller et al. | 715/503 |
| 2004/0267760 | A1* | 12/2004 | Brundage et al. | 707/100 |
| 2005/0076031 | A1* | 4/2005 | Xu et al. | 707/9 |
| 2006/0167931 | A1* | 7/2006 | Bobick et al. | 707/102 |
| 2006/0253431 | A1* | 11/2006 | Bobick et al. | 707/3 |
| 2006/0282429 | A1* | 12/2006 | Hernandez-Sherrington et al. | 707/6 |
| 2007/0016596 | A1* | 1/2007 | Fabret et al. | 707/100 |
| 2007/0067343 | A1* | 3/2007 | Mihaila et al. | 707/104.1 |
| 2008/0086498 | A1 | 4/2008 | Sureka | |
| 2008/0140696 | A1* | 6/2008 | Mathuria | 707/102 |
| 2008/0320017 | A1* | 12/2008 | Mihaila et al. | 707/100 |

OTHER PUBLICATIONS

Attinel et al., DAMIA—A Data Mashup Fabric for Intranet Applications, ACM, Proceedings of VLDB '07, Sep. 23-28, 2007, p. 1370-1373.*
Chang et al., Gadget Creation for Perfonal Information Integration on Web Portals, IEEE, Proceedings of IRI '08, Jul. 13-15, 2008, p. 469-472.*
Singh et al., Security Policy Analysis Using Deductive Spreadsheets, ACM, Proceedings of FMSE '07, Nov. 2, 2007, p. 42-50.*

* cited by examiner

Primary Examiner — Laurie Ries
Assistant Examiner — Frank D Mills
(74) Attorney, Agent, or Firm — Robert Plotkin, P.C.

(57) ABSTRACT

Embodiments of the invention convert data from atomic tuples found in data sources such as spreadsheets (e.g., raw numbers, words, and formatted dates) into semantically enriched schemas and associated tuples. In addition to the data content, visual content, such as font and background color, is also analyzed as a part of the interpretation process. Embodiments of the invention also provide methods of interacting with the raw data via the semantically enriched schema tuples.

52 Claims, 29 Drawing Sheets

String interpretation resolver

Character symbol match accumulator using the character_count index

Using lookup tables for character matching

Calculating and selecting the most believable candidate symbol during character matching

Figure 8

Context-wide accumulator of string to symbol match results

| Container_id | Source string | Cnt (interpretations) | Int# | Cnt (symbols) | Per character range if cnt(symbol) > 1<br>1. Match status per symbol<br>2. Symbol_id<br>3. Belief per match |
|---|---|---|---|---|---|
| Cell B17 | USA | 1 | 1 | 1 | 1. Exact character and Sequence match<br>2. S_id = 9<br>3. B = 1.0 |
| Cell D31 | Soles | 1 | 1 | 1 | 1. Proximal match: "remove vowels"<br>2. S_id = 35<br>3. B = 0.90 |
| Cell:D18 | Full function | 1 | 1 | 1 | 1. Exact character and sequence match<br>2. S_id = 23<br>3. B = 1.0 |
| CellD21 | All stores | 1 | 1 | 2 | Characters 1-3<br>1. Exact character and sequence match<br>2. S_id = 2<br>3. B = 1.0<br><br>Characters 5-10<br>1. Exact character and sequence match<br>2. S_id = 29<br>3. B = 1.0 |
| | | | | | |

Figure 9

Table of Match states

| Match state | Matching processes that can produce it | Example | | | |
| --- | --- | --- | --- | --- | --- |
| | | Character sequence | Symbol | How selected | How believability is calculated |
| Exact match (character + sequence) | Term match or proximal match | New | New | Term "new" discovered thru parsing source string. It matches a symbol | Exact match = 1 |
| All character match out of sequence | Proximal match | Grene | Green | Thru proximal character match | Formula 1502 |
| 1 near-match not matching any under-matched symbol | Proximal match | Gren | Green | Thru proximal character match | Formula 1503 |
| 1 near-match matching under matched symbol | Proximal match | misisippi | mississippi | Thru proximal lookup match | Formula 1503 |
| Multiple near-matches 'a,b,c not matching any under-matched symbol | Proximal match | Gron | Groin Groan | Thru proximal lookup match | Formula 1503 |
| No term match | Term match | Qwerty | N/A | N/A | Formula 1503 |
| No near-matches | Proximal match | Qwrety | N/A | N/A | Formula 1503 |

Figure 10a

|  |  |  | 2007 | 2008 | 2009 |
|---|---|---|---|---|---|
|  |  |  |  |  |  |
| USA |  |  |  |  |  |
|  | Sales |  | $489 | $611 | $705 |
|  | Costs |  | $410 | $510 | $590 |
|  | Margins |  | 19% | 20% | 19% |
| Canada |  |  |  |  |  |
|  | Sales |  | $198 | $251 | $298 |
|  | Costs |  | $160 | $184 | $212 |
|  | Margins |  | 24% | 36% | 41% |

Figure 10b

|  |  |  | Year | Year | Year |
|---|---|---|---|---|---|
|  |  |  |  |  |  |
| Country |  |  |  |  |  |
|  | Account |  | Currency | Currency | Currency |
|  | Account |  | Currency | Currency | Currency |
|  | Account |  | Percent | Percent | Percent |
| Country |  |  |  |  |  |
|  | Account |  | Currency | Currency | Currency |
|  | Account |  | Currency | Currency | Currency |
|  | Account |  | Percent | Percent | Percent |

Figure 14

|  |  |  | 2007 | 2008 | 2009 |
|---|---|---|---|---|---|
| USA |  |  |  |  |  |
|  | Sales |  | $489 | $611 | $705 |
|  | Costs |  | $410 | $510 | $590 |
|  | Margins |  | 19% | 20% | 19% |
| Canada |  |  |  |  |  |
|  | Sales |  | $198 | $251 | $298 |
|  | Costs |  | $160 | $184 | $212 |
|  | Margins |  | 24% | 36% | 41% |

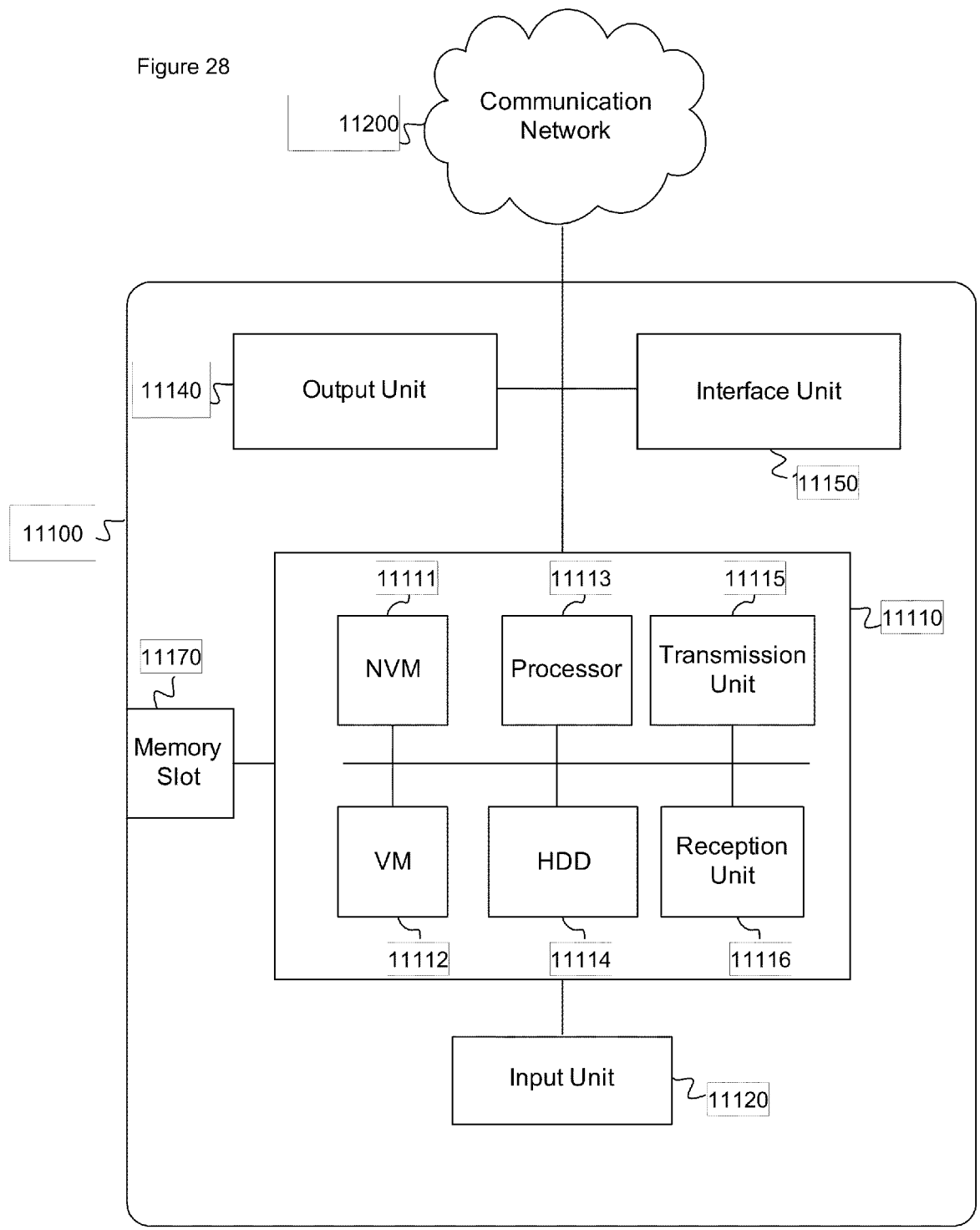

EXTRACTING SEMANTICS FROM DATA

CROSS-REFERENCE TO RELATED APPLICATIONS

This application claims priority from U.S. Prov. Pat. App. Ser. No. 61/136,565, entitled, "Method of defining and manipulating abstract types and using those types to create multi-modal, multi-level logical/semantic representations for fast recognition and/or performance, and a method of understanding the contents of freely structured spreadsheets and learning new term-meaning relationships within them," filed on Sep. 15, 2008; and U.S. Prov. Pat. App. Ser. No. 61/193,004, entitled, "Method of defining and manipulating abstract types and of using those types to create multi-modal, multi-level logical/semantic representations for fast recognition and/or performance, a method of understanding the contents of freely structured spreadsheets and learning new-term meaning relationships within them, and a method of using located content types for grounding symbolic discourse in experiential transactions," filed on Oct. 21, 2008.

BACKGROUND

Spreadsheets were the original "killer application" for individuals; however they became the dark matter of the corporate universe: a hugely important, widely distributed, invisible information asset (or liability). Spreadsheets can not be queried like databases (e.g., one can not execute SQL-like queries on a spreadsheet), making it impossible to detect, much less solve, security, data quality, compliance, redundancy and other productivity problems using data stored in spreadsheets. What is needed, therefore, are improved techniques for interpreting data in spreadsheets.

SUMMARY

Embodiments of the present invention automatically interpret—in normal business terms—the contents of any relevant spreadsheet in any format. Such embodiments open the door to providing numerous high-value services including:
1) Monitoring/correction of data, metadata and formula quality problems
2) Direct querying of large collections of spreadsheets (data, formulas, and metadata)
3) Linking spreadsheets and their owners to other related spreadsheets (and their owners)
4) Reformatting spreadsheets to facilitate analysis and charting
5) Building spreadsheets that leverage prior work
6) Automatically maintaining/updating spreadsheets.

Additionally, embodiments of the present invention interpret words, whether stored, for example, in gridded or sequential form. In real-world applications, such as in spreadsheets and elsewhere, words are misspelled, synonyms are not declared, and the same word may be used in different ways or be associated with different formulas in different unspecified contexts. To address these problems, embodiments of the present invention provide techniques for matching misspelled words, recognizing and resolving ambiguity, recognizing and associating meanings with specific contexts, and looking for and leveraging grammar terms (which are typically discarded by search engines) in order to improve the extraction of semantically relevant information as well as leveraging, wherever possible, prior knowledge.

Embodiments of the invention convert data from atomic tuples found in spreadsheets (e.g., raw numbers, words, and formatted dates) into semantically enriched schemas and associated tuples. In addition to the data content, visual content, such as font and background color, is also analyzed as a part of the interpretation process. Embodiments of the invention also provide method of interacting with the raw data via the semantically enriched schema tuples.

The process of interpretation performed by embodiments of the present invention takes place against a logical information model. In such embodiments, it does not matter which model is used. Since the most common information models used explicitly or implicitly within the business and analytical community are expressible in terms of SQL or so-called dimensional languages such as any one of the numerous flavors of OLAP and since there are significant business benefits to being able to translate the data in spreadsheets into SQL tables and/or OLAP cubes, SQL/OLAP may be used in the examples provided below. Such examples are provided merely for ease of explanation, however, and do not constitute limitations of the present invention.

A spreadsheet may be interpreted according to embodiments of the present invention using ten phases of processing in three interconnected layers 1) a first layer comprising an eight-phased set of interpretation processes 2) a second layer of semantically enriched user (or process) interactions called phase nine and 3) a catalog-driven set of hypothesis generation processes called phase 10. The catalog may encode all logical structures and their linkages from the smallest individual tokens to the largest heterogeneous schema. The catalog levels may comprise that of 1) Token, 2) Type, 3) Homogeneous schema and 4) Heterogeneous schema.

As described herein, there are multiple ways to sequence the ten processes and their respective sub-processes. The three-leveled, ten-phase process is merely an example, however, and does not constitute a limitation of the present invention. For example, any of the phases may be performed in ways other than those described below. Fewer than all ten phases may be performed. Phases in addition to those shown may be performed. Phases may be performed in a different sequence than that described below.

Phase 1 maps the both the data and the visual contents of spreadsheet cells to recognized types where by "recognized" is meant that the type appears in the catalog. In the present embodiment, the contents of cells are further grouped by assigned type thereby creating Type-functionally homogenous cell groups (FHCG) whereby all cells in any particular FHCG have the same assigned type as each other. The contents of a single cell may contain more than one term. A single term may be recognized by more than one symbol And a symbol may contain more than one meaning (i.e., role in a logical type to which it maps). For example the term 'blue' may map both to a color type and a state of mind type. While a single meaning may map to multiple symbols. For example, a cell labeled YTD will be mapped to the same FHCG as a cell labeled Year-To-Date.

For cells that contain numbers or dates or just formatting information, the assignment of types to cells can be done directly, in one step. For cells that contain words, type assignment may involve a term extraction and symbol matching process. Words that can denote grammar terms, (e.g., articles, prepositions and adverbs) such as "of", and "per", are used to infer relationships between the types assigned to other terms. Interestingly, grammar terms like prepositions are the first things removed by a search engine. In this sense, the current approach is very different from the processing approach taken by search engines.

The characters found within the cells of a spreadsheet may be quite messy in the sense that words may, for example, be misspelled or poorly delimited or simply unrecognized. They may contain sentence fragments with grammar terms that need to be understood in order to derive the meaning of the words in the cell.

In any event, whether directly interpreted or interpreted via a symbol table, at the end of phase one, all cells in the spreadsheet have been associated with one or more logical types. As words can be ambiguous—think 'green' the color versus 'green' the political party or 'green' the marketing term, a particular word may be associated with more than one logical type. Phase one is complete upon the creation of one or more FHCGs.

Phase 2 processing creates contiguous 1-by-N segments from each of the FHCG and then figures out based on certain observable properties whether each such segment (called a G1 or first-order group) is being used as a dimension or as data/content.

Phase 2 begins by reaching into the first FHCG and for each one starting with some one cell and trying to build both horizontal and vertical contiguous segments. Along the way, conflicting interpretations of cells in the FHCG may be identified and resolved, and both unrecognized and empty cells may be absorbed into G1s which otherwise contain cells of a known and shared logical type. When all recognized cells have been so processed an attempt is made to create G1 shapes from the remaining unrecognized cells that were not absorbed into a G1 of known logical type.

After a G1 is created (either after each G1 is created or all G1s have been created), a schema-role analysis of the G1 is made to determine whether it's schema role is more likely that of locator or content. The output phase two is a list of G1s, their associated types, their schema-roles and, for each of the cells in the G1s, a unique identifier of the G1 to which it was assigned.

Phase 3 binds together adjacent G1s that were assigned the same schema-role into larger structures called G2s that have the same schema roles as the G1s of which they are comprised. Towards that end, the present embodiment tries to extend each G1 by combining it with one or more adjacent G1s having the same schema-role, thereby creating a G2. This attempt at extension relies upon the characteristics of the G1's neighbor(s). Along the way numerous irregularities may be encountered as a result of which the expanding G2 may need to be split or merged with another G2. Every time a structure is edited, (e.g. by adding cells, removing cells, splitting the structure into pieces or merging the structure with another structure) all of the implicitly altered component structures are edited as well.

A global structure that tracks all objects and their edits and components is used to enable appropriate accounting for this dynamic multi level structure. When all possible G2s have been created, phase four processing is triggered.

In phase 4, each G2 locator structure is combined where possible with one or more other orthogonally-oriented G2 locator structures to create perpendicular location structures. Whichever G2s can not be so combined are left as vertical or horizontal. During this phase, embedded schemas are detected. After all the G2s have been processed and embedded schemas been resolved, the resulting location structures, including the G2s that did not bind with an orthogonal G2, are combined with adjacent G2 content structures to form a first pass of a homogeneous schema definition that is associated with the data which data is now in a larger group called a G3/4.

In phase 5, irregularities between the edges of the G2 locator structures, called G2Ls and content structures are detected and resolved. Irregularities may occur at the end-points or along the edges of the boundaries between locator-defining and content-defining G2s.

In phase 6, differences in the types that had been assigned to the G1s that make up the 1-by-N sections of G2s and are parallel to the orientation of the G2, are detected and resolved either by finding a type called the extended signature that is common to the G1s, or by splitting the G3/4 structure. Once the type definitions of the G2s are homogeneous across the slices, the tuple creation process begins. One aspect of the tuplization process is the processing of missing values in the G1s of the G2s used as locators. In normal spreadsheet usage, repeating values such as repeating city names or times may be left out of the spreadsheet in which case, these values need to be inferred. As their inference requires a homogeneous locator structure and knowing the data distribution of the associated content vector, this step occurs here in phase six.

The output of phase six are homogeneous logical schemas in tuple form and their mapping back to the G3/4 structures from which they were extracted.

In phase 7, the logical schema specifications extracted from the analyzed data are consolidated. Then a search is made for content names and other schema-relevant information in the regions surrounding the schema if they are not all found within the cell boundaries of the schema. Content values are then tested for consistency with the known attributes associated with the content names.

In phase 8, existing interpretations are used to boost the interpretations of G1s of unrecognized type and of unrecognized cells within G1s of known type. Then all cell-specific formulas are converted into dimensional formulas and then generalized to produce normal human or business termed formulas.

The output of phase eight processing is a collection of semantically enriched homogeneous and possibly heterogeneous logical schemas and for each schema a collection of semantically enriched tuples and the mapping back to the raw data.

In phase 9 processing a rich collection of interaction methods whereby a person or a software program can interact with the raw data mediated via the interpretation created in phases one through eight is described.

In phase 10 processing inference processes are run to generate hypotheses for interpreting data that has not yet been interpreted.

One embodiment of the present invention is directed to a computer-implemented method and/or apparatus for converting a plurality of atomic tuples, representing contents of a plurality of cells stored in a grid, into a plurality of schema tuples. The method includes assigning a plurality of catalog-defined types to the plurality of atomic tuples; assigning a role of locator to a subset of the plurality of cells based on the plurality of catalog-defined types; and determining whether a locator tuple slice in the plurality of cells contains a missing value.

Another embodiment of the present invention is directed to a computer-implemented method of converting atomic tuples originating in gridded or sequential form into tuples of a logical schema by assigning a plurality of catalog-defined types to the atomic tuples and assigning those tuples schema roles of locator (e.g., dimension, or key) and content (e.g., measures or non-key attributes) and creating locator tuple slices for which it can be determined by looking at data distributions in the vicinity of the locator tuple slice whether an empty cell in a locator tuple slice is missing and needs an inferred value in order for the tuple slice to perform its logical schema function of individuating contents relative to other locator tuple slices in the same locator tuple structure or whether it serves no logical role and is thus not missing and requires no inferred value.

Another embodiment of the present invention is directed to a method of converting logical schema tuples, wherein each logical type in the schema has either the schema role of locator value or content value into semantically enriched schema tuples, where variables (i.e., content names) are identified, and wherein those content names may be positioned along the rows and/or the columns of the grid or even outside the borders of the grid, whether that be in the zero zone of the worksheet or the boundaries of the worksheet or even in the worksheet or file name. Furthermore, the method tests whether the content values associated with the content names are consistent with the understood definitions of those contents.

Another embodiment of the present invention is directed to a method of converting logical schema tuples into general formulas that abstract away dimensional qualifiers that either have the same value for both the output cell and one or more input cells or have related values capable of being formulated as a relationship supported by the types that comprise the cell.

Another embodiment of the present invention is directed to a method of calculating, for every identified content name within a collection of spreadsheets, the set of right hand side formulas for that content name.

Another embodiment of the present invention is directed to a method of semantically searching within a collection of data, from which has been extracted enriched semantic tuples, to determine whether there is any data similar to some data treated as input by extracting the semantically enriched schema from the input data and providing schema-based query and navigation over the entire collection of data.

Another embodiment of the present invention is directed to a method of converting a given locator and one or more other locators joinable with and orthogonal to the given locator into one or more internally homogeneous location structures where each location structure is defined by a vertical and a horizontal locator G2LV, G2LH and no location structure exists within the cell range covered by the cartesian product of the G2LV and the G2LH Another embodiment of the present invention is directed to a method of associating sequences of string-based characters with their best proximal symbol match by transforming character sequences that did not exactly match a symbol into a plurality of transformed sequences of characters via one or more transformations deemed equivalent in some dimension and then using an index comprising both the identity and count of a character in a symbol as a way to retrieve potential symbol matches in parallel Another embodiment of the present invention is directed to a method of using prior knowledge to generate hypotheses about the meanings of unrecognized terms by matching recognized terms in the vicinity of the unrecognized terms and then mapping those recognized terms to schemas wherein from the parts of the schema that link with the recognized terms can be discovered the parts of the schema that do not yet match any terms and then using the unmatched schema parts to generate hypotheses as to the meaning of the unrecognized term(s).

BRIEF DESCRIPTION OF THE DRAWINGS

FIG. 8 shows a context-wide accumulator of symbol match results according to one embodiment of the present invention.

FIG. 9 is a table showing the possible status results of term-symbol matching operations according to one embodiment of the present invention.

FIGS. 10a and 10b depict a representative spreadsheet form of data in a grid with labels and formatted numbers, and illustrate the $1^{st}$ intermediate representation of logical types associated with cell locations superimposed upon their corresponding cells in the spreadsheet form according to one embodiment of the present invention.

FIG. 14 illustrates the representative spreadsheet of data introduced in FIG. 10a overlaid with cell boundaries corresponding to the instantiated third intermediate representations (G2)as produced by phase 6 according to one embodiment of the present invention.

FIG. 28 shows the structure of computer hardware that may be used to implement embodiments of the present invention.

DETAILED DESCRIPTION

Figure 1:
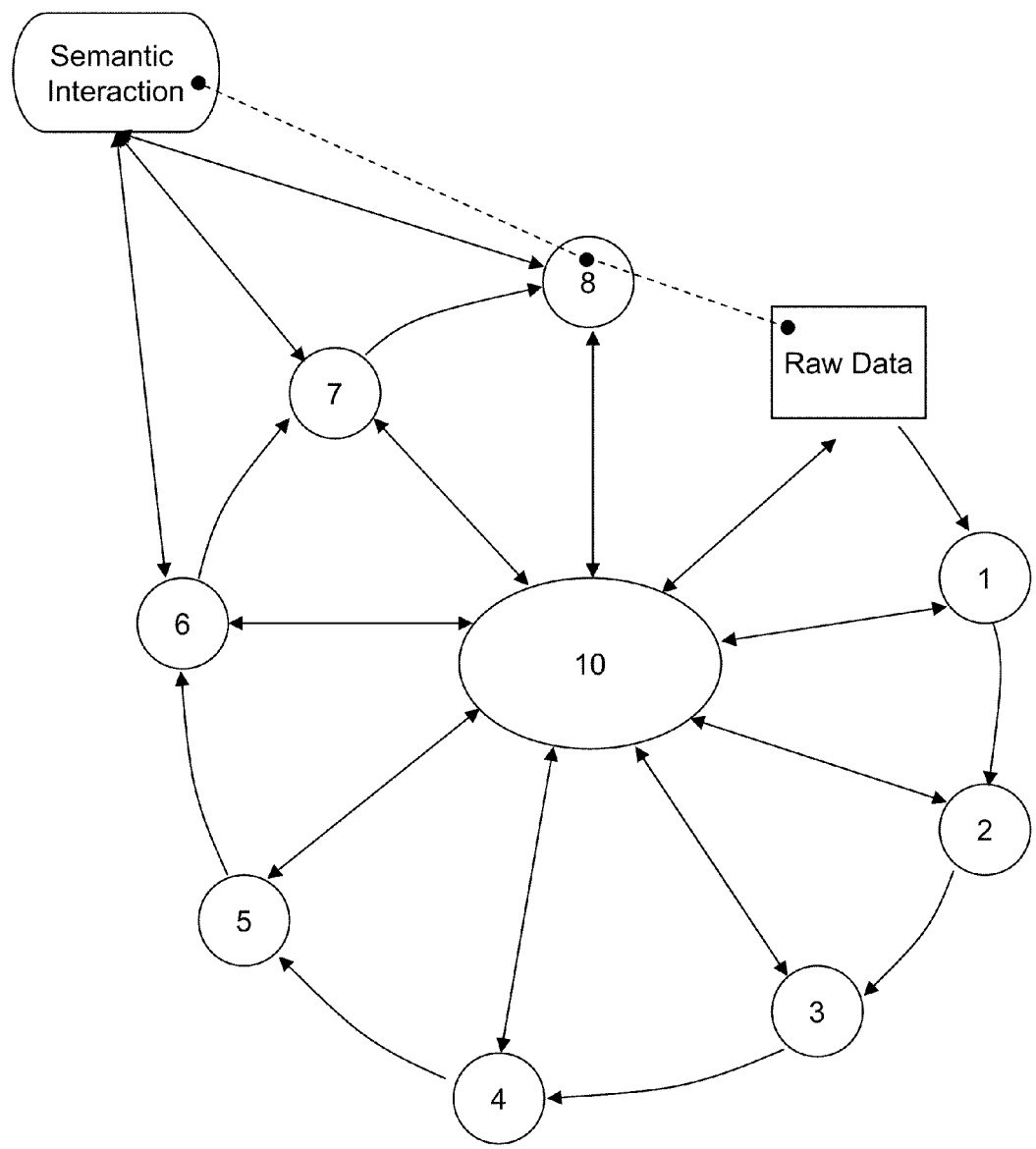
FIG. 1 is an overview diagram depicting all the processing phases of one embodiment of the present invention.
Figure 2:
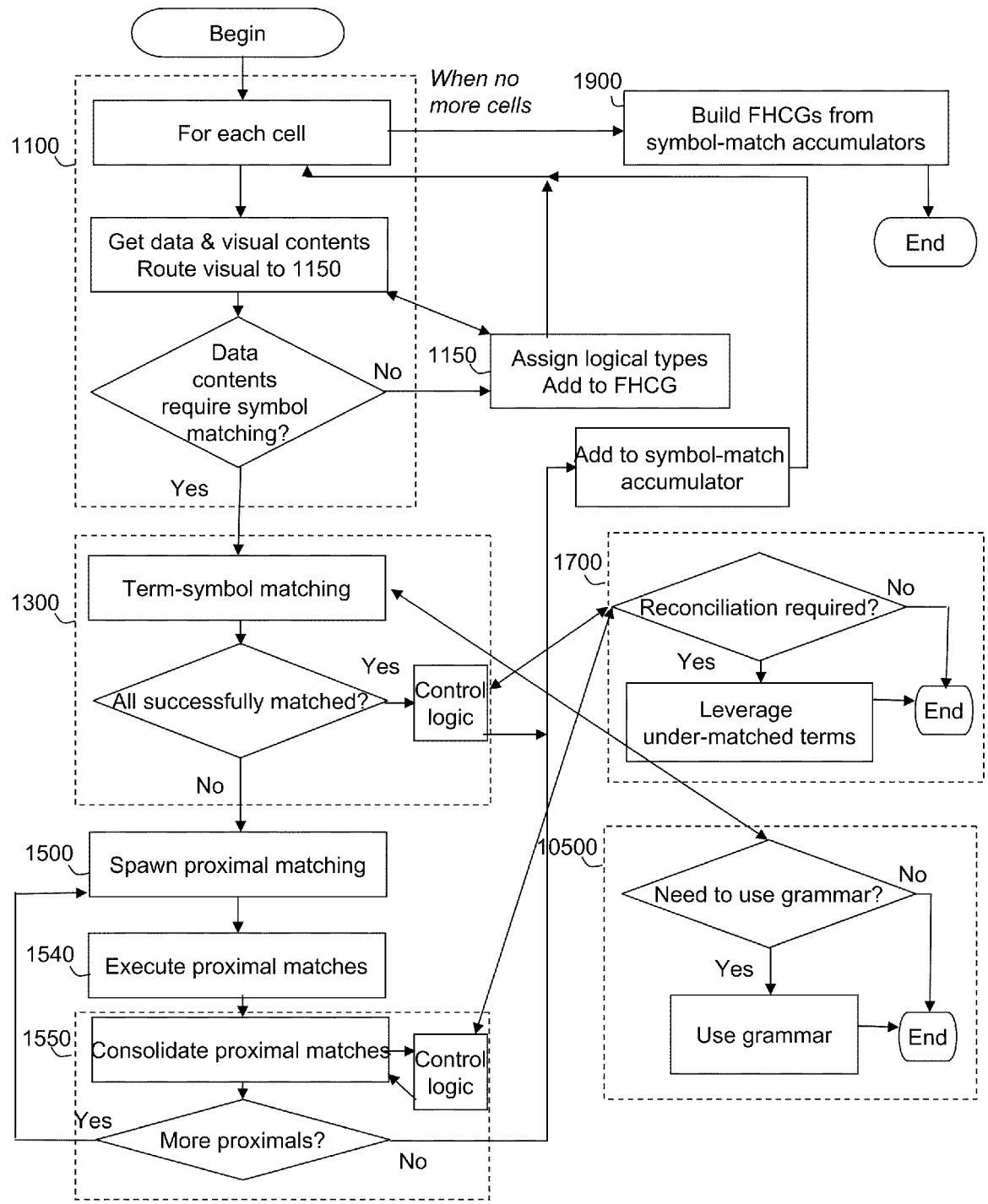
FIG. 2 is a block-level functional diagram of the processes of phase 1 and its processes 1100, 1150, 1300, 1500, 1700, and 10500 according to one embodiment of the present invention.
Figure 3:
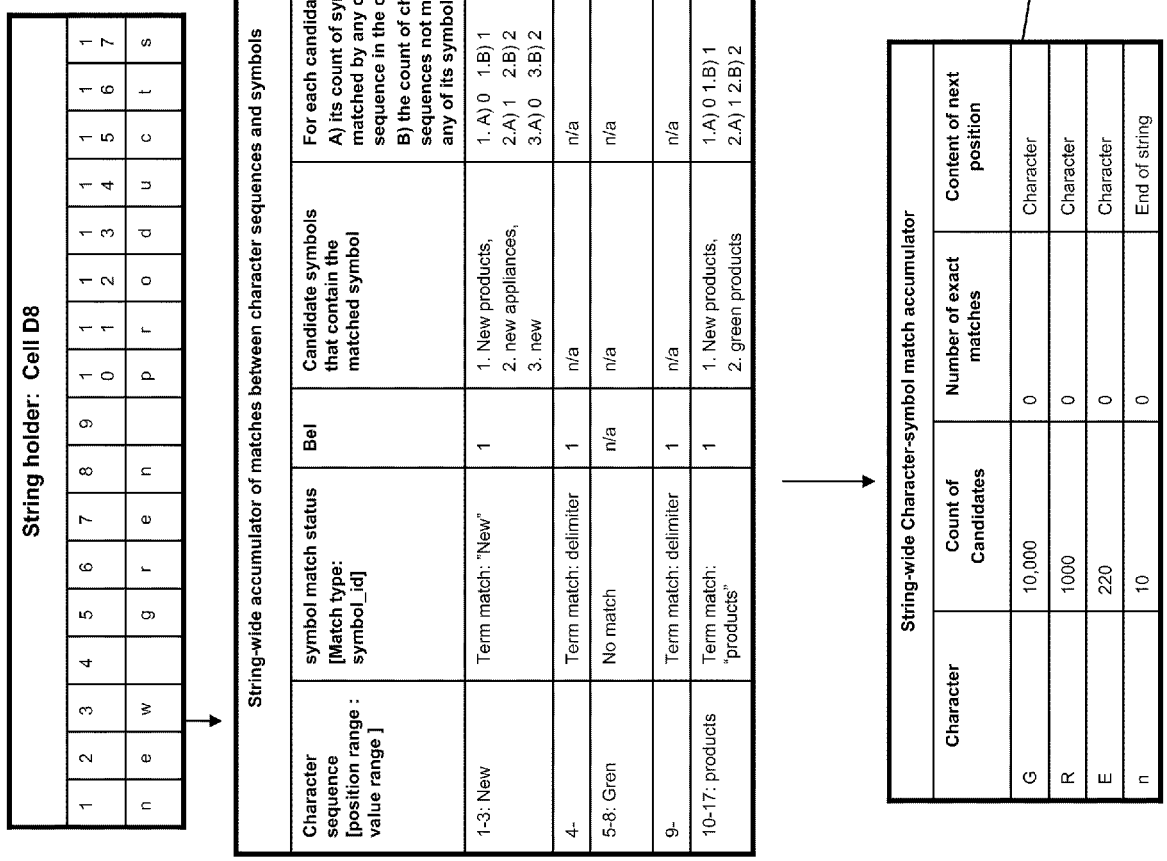
FIG. 3 shows the major structures that support the processes in phase one according to one embodiment of the present invention.

Before describing certain embodiments of the present invention, definitions of certain terms will be provided to aid in understanding of certain embodiments of the present invention. Such definitions do not constitute limitations of the present invention.

Cell identifier: An identifier of a cell which identifies the cell by its row and column.

Cell contents: Information associated with a cell, such as its internal, raw data, any format string, any external formatted value, formula, notes, and border design.

Term: An atomic unit of physically represented information. Words, numbers and isolated punctuation marks are examples of terms. Well formed terms are separated by delimiters determined by grammatical convention: blank space, commas, semi-colons, etc. Terms that are not well formed, such as misspelled words need, to be inferred by the interpretation process.

Word: A term comprised of letters. Note that numeric information can be conveyed by words as, for example, when numbers are spelled out.

Number: A term composed of digits. Note that textual information can be conveyed by numbers as, for example, when categorical values are represented in terms of numeric codes.

Symbol: A unit of recognition which has an entry in a library of recognizable symbols. Any entry in the symbol table that is associated with a physical representation of a part (i.e., role) of a logical type or structure is a symbol. A symbol may have more than one associated type role. Each type role is considered a distinct meaning of the symbol. Entries that are not associated with physical representations of a part of a logical type are called tokens.

Atomic symbol: A symbol none of whose parts are also symbols. Note that as learning occurs, atomic symbols may become molecular symbols as meanings become associated with the atomic symbol's parts.

Molecular symbol: A symbol, some of whose parts are also symbols.

Symbol meaning: The association of a symbol and a physical representation of a role of a logical type or structure. A single symbol may have multiple meanings. Multiple symbols may have the same meaning.

Gridded form: Tokens represented in any rectangular coordinate system such as spreadsheets or regular tables as found for example in word processing, presentation, database, or any other information processing software.

Logical types: Data structures intended to convey meaning. In the database industry, for example, logical types such as "domains" in SQL applications or "dimensions" or "measures" in OLAP applications contrast with physical types or methods of representation such as "double precision floats", or "8 Byte character strings."

Logical signature: A collection of one or more types mapped to a term, a cell, or any level group. For example, the logical signature of a cell that contained terms that matched the symbol 'USA' and the symbol 'Shoes' might be 'Country' and 'Products'.

Extended signature: For any type, or collection of types, serving as the logical signature for a cell or any group such as a G1 or G2, its extended signature is the collection or collections of types if any exist for which the given type or collection of types functions as a unit.

Atomic tuples: For data in some data source such as but not limited to a spreadsheet, word processing package or other business application software, the pairing of a logical type as given by the source data application such as string, number, date and time for a spreadsheet, with an atomic term such as a word or number.

Locator: Any logical type, or group of any level, whose most probable schema role is that of locator.

Slices: In vertical G1s and G2s, a slice is a row of the group. In horizontal G1s and G2s, a slice is a column of the group.

Slots: In vertical G1s and G2s, a slot is a column of the group. In horizontal G1s and G2s, a slot is a row of the group.

Locator tuples: Slices of a group whose schema role is locator where each slot in the slice is associated with its logical signature.

Logical schema tuples: Instances of a schema where each instance includes a collection of type names that correspond to the types in the schema where each type name is paired with: (1) a value of the type, called its semantic value, if such a value is present; or (2) otherwise, a logical state.

Semantically enriched schema tuples: Instances of a schema that has been enriched with (1) the identification of content names and for each content name a range of location tuples for which the content name has or could have values and a partitioning of that range of location tuples into zones within which the formula for the content name is constant and between which the formula varies and (2) the specification of general formulas in the place of cell formulas or fully qualified dimensionally referenced formulas.

Location structure: Any candidate key for a schema.

Missing values: Empty cells that serve an informational role within a schema and for which values need to be inferred.

Content: Any logical type that serves as the data accessed via the location structure.

Content structure: The collection of one or more logical types that define the content to be accessed via some location structure.

Schema: Any structure for which one or more types form a key into the individual tuples that comprise the structure.

Homogeneous schema: Any schema in which all tuples have the same collection of logical types (where that sameness may only exist at the level of the extended signatures).

Heterogeneous schema: Any schema in which not all tuples have the same collection of logical types.

Logical state: For any tuple within a schema defined by some location structure and some content structure, the term "logical state" applies to each individual content for some location and refers to whether that content is or is not applicable at its given location, and if applicable whether it is present or missing.

Semantic value: For any present content, the value that is present.

Catalog of recognized symbols: A collection of symbols within an interpretation system for which some method exists to determine which symbol or symbols, if any, best match a given collection of terms in a data source.

First approximation schema-roles: The schema roles of locator and content assigned during phase one processing.

Contiguous 1×N cell groups: Within a gridded data source, any 1 by N shape or area.

Contiguous collections: Within a gridded data source, any single shape or area.

Un-matched symbols: When a term from a data source matches a symbol from the catalog and that symbol is a part of a molecular symbol that contains other symbols which have not matched any symbol, the other symbols are called "un-matched symbols".

Under-matched symbol: Relative to a term that matched a symbol that is a part of a molecular symbol MS that contains un-matched symbols, MS is called "under-matched".

Candidate symbols: Symbols accessed during the process of term-to-symbol or character-to-symbol matching that partially match the given term or collection of characters and for which further processing is required to determine the presence or absence of a match.

Reftypes: Any logical type whose values are the names of other types.

FHCG: A functionally homogeneous cell group by which is meant that all the recognized cells in the FHCG share the same logical signature and are thus homogeneous with respect to that signature.

G: Some cell group of any level.

G0: A cell group consisting of a single cell.

G1: A contiguous 1×N cell group whose recognized cells were assigned the same logical signature. A G1 may also contain unrecognized cells and/or empty cells.

G1L: A G1 with schema role of locator.

G1C: A G1 with schema role of content.

G1LV: A G1L with a vertical orientation.

G1LH: A G1L with a horizontal orientation.

G2: A contiguous collection of G1s that have the same schema-role.

G2L: A G2 with the schema role of locator.

G2C: A G2 with the schema role of content.

G2LV: A vertically oriented G2L.

G2LH: A horizontally oriented G2L.

Orthogonal GLs: GLs that share a perpendicular orientation relative to each other. G3/4: The binding of one or more G2Ls with one or more G2Cs.

G3: The binding of G2Ls that are exclusively vertical or horizontal with a 1×N shaped G2C.

G4: The binding of G2Ls that are both vertical and horizontal.

Zero zone: The collection of cells that includes the region defined by the top edge of the G2LV and the left edge of the G2LH in a G4 and may extend upward and leftward until encountering another G3/4.

Certain embodiments of the present invention, which include several phases, will now be described. The purpose of phase 1 is firstly to independently assign the data and visual contents of spreadsheet cells to recognized logical types where by "recognized" is meant that the logical type has an entry in the catalog, and secondly to assign cells to groups where the cells in a group share the same logical type or types hereafter called functionally homogeneous cell groups (FHCG) with different groups being created for data and for visual contents In the present embodiment FHCG are the endpoint of phase one phase 1 and also the beginning of phase 2.

As shown in FIG. 1, phase 1 is composed of the following four subsidiary processes: 1) Ascertaining cell contents and either assigning the cells data contents and visual contents directly to FHCG or assigning just the visual contents to a FHCG and then sending the data contents to processes 1100 and 1150; 2) Matching extracted terms from the cell data contents with symbols that exist in the symbol layer (process 1300 called term-level symbol matching); 3) Matching portions of inadequately-matched extracted terms with symbols in the symbol layer (process 1500); 4) Creating FHCGs from cell data contents sent to process 1300 (process 1900). Additionally, there are two major shared sub-processes, to test candidate symbols against unmatched symbol-tokens (process 1700) and surrounding recognized terms (process 10500).

The purpose of process 1100 is to ascertain the contents of each cell and to determine to what degree the logical type(s) of the cell's data contents can be ascertained without first performing term-level symbol matching.

The first step of process 1100, step (1110) identifies contextual attributes that may impact how the process 1100 interprets cell contents. For example, knowing that the current worksheet is in French will give priority to French meanings during symbol lookups. Any determinable fact about the data source that has a representation in the library and which may serve as a branching point in the interpretation process may be considered a contextual attribute. Contextual attributes may include at least: a machine identifier from which a spreadsheet file was accessed, a spreadsheet's author, the name of a spreadsheet, the names of worksheet tabs in a tabbed spreadsheet such as Excel.

The second step, step (1120) determines the bounding box for populated cells within the gridded data source.

The third step, step (1130) ascertains the data and visual contents of each cell in the bounding box. Cell data contents may be ascertained in any of a variety of ways. For example, if a cell has an associated format string that describes how the cell's binary contents are translated to a sequence of characters and/or patterns visible on a display device, then step (1130) may ascertain the cell's data contents unambiguously based on a combination of the cell's format string and the cell's contents and thereby route the data contents of the cell to the appropriate subsequent processing. As another example, in the absence of a format string, step (1130) may classify the cell's contents by parsing the cell contents to ascertain the cell's contents as a date, time, number, or other type of data, if such can be determined unambiguously.

If the cell data contents are ascertained to be either of numeric or date or time format or to be of a string formatted representation of a number date or time the cell data contents are routed to step (1) of process 1150 for direct assignment to one or more FHCGs. Otherwise, if the cell data contents are ascertained to be any other kind of string, the cells data contents are routed directly to process 1300. All visual content is routed to step (2) in process 1150.

The purpose of process 1150 is first to assign the data contents of cells ascertained to be either of numeric or date or time format or to be of a string formatted representation of a number, date or time to one or more FHCGs based on the kind of data contents and in step 2 to assign the visual contents of cells to one or more FHCGs based on the kind of visual contents Process 1150: (step (1)) If it is ascertained in step (1130) that the data contents of a cell are either of numeric or date or time format or to be of a string formatted representation of a number, date or time, a lookup is performed to test if there currently exists a FHCG for that kind of date, time or numeric information. If not, a FHCG with the logical signature of the discovered cell data contents is created and populated with the cell_id. Additionally, if there is no catalog entry for a logical type denoting that logical signature, one is created and added prior to creating the FHCG. (End step (1))

Although in the example above there is a one-to-one mapping between logical types and FHCGs, this is not a limitation of the present invention either for assigning data or visual contents to FHCG. Rather, a single FHCG may have more than one type as for example, with a cell that contained the three terms "USA" "Sales" "Total". Each term could match a different logical type and the concatenation of the types would define the logical signature of the cell's data contents and the FHCG.

(Step (2)) For all cells processed, their visual contents are processed in the second step of process 1150. For each item of visual content in a cell including but not limited to font color, background color, font size and style, a lookup is performed to test if there currently exists a FHCG for that kind of visual item. If there is, the cell_id is added to the list of cell_ids in the FHCG. If there is not, a FHCG with the logical signature of the discovered cell visual contents is created and populated with the cell_id. Additionally, if there is no catalog entry for a logical type denoting that logical signature, one is created and added prior to creating the FHCG.

For another example, Table 1 illustrates a mapping between visual content items and FHCGs in one embodiment of the present invention.

TABLE 1

| Visual content items | FHCGs assigned to the visual content items |
|---|---|
| Background color | One FHCG per discovered background color per worksheet |
| Foreground color | One FHCG per discovered foreground color per worksheet |
| Underlines | One FHCG for the presence of underlines |
| Bold | One FHCG for the presence of Bold |
| Font size | A small number (e.g., three) of FHCGs for fonts larger than the default (binning the range of fonts sizes into that same small number (e.g., 3) of equal font ranges) |
| Italics | One FHCG for the presence of italics |
| Cell border existence | Size | One FHCG for each of a small number of cell border size bins (e.g. 3 for small, medium and large) |
| and | Orientation | One FHCG for each of two possible orientations: vertical and horizontal |

Process 1300 relies on an available table of recognized symbols (the "symbol table"), including both atomic and molecular symbols composed of individual tokens (e.g. "cheese") and molecular symbols (e.g. "cheddar cheese"). The symbol table also includes entries for grammar terms (such as 'and', 'of', 'per', 'for'). The text is divided into substring sequences based on a user-definable set of delimiters; if none are found, the entire text of the cell is considered as the substring. A fast whole term indexing technique is applied (such as, but not limited to, hashing) to each substring to map each substring sequence called an extracted term to the symbol table. One benefit of this technique is that it quickly discovers all correctly delimited exact matches.

Since both the symbols in the symbol table and the source (cell) strings may contain multiple components (for example, "North" and "Dakota" in "North Dakota"), although all the individual terms in a source string may be recognized, multiple molecular symbols may contain all of the terms in the source string though no one of those molecular symbols exactly matches the entire source string due to including another term not present in the source string. The method here described anticipates this case and provides for a string-wide resolver to select which multi-term symbol(s) best match(es) the multi-term string.

If each of the extracted terms matched some symbol and there exists one possibly molecular symbol that exactly matches the collection and sequencing of extracted terms, the cell data contents are considered to be successfully matched. The matching symbol and the cell_id of the matched cell data contents are the placed in the context-wide accumulator. When there is no exact match in the symbol table for at least one extracted term, or when all the extracted terms matched a symbol and there are multiple molecular symbols matched but no one symbol that accounts for all the extracted terms (for example, the text "firm cheddar cheese" is found, and "cheddar cheese" is a symbol entry without "firm"), and so too is "firm promise" further processing is performed, as follows.

If all the extracted terms did match one or more symbols—called candidate term-matched symbols—(and no one candidate term-matched symbol accounts for all the extracted terms in sequence), then (firstly) all distinct combinations of candidate term-matched symbols are created, and for each combination a believability score is computed. The following is one example of a process for computing a believability score that is used in an embodiment of the present invention, in which the highest score corresponds to the most believable:

Let:
CTMS=set of candidate term-matched symbols relative to the cell C whose data contents were routed to process 1300
x=count of entries in CTMS
y=Count of tokens in the CTMS that do not match any of the extracted terms from the C
z=Count of matched terms from C that are in a different ordinal position in the CTMS for those candidate term-matched symbols comprised of 2 or more tokens.

The believability of a collection of candidate symbols is calculated by the formula $$1/(x+y+z)$$

Secondly, the extracted terms are tested to see if any of them correspond to recognized grammar terms. If one or more grammar terms is detected, process 10500 which leverages grammar terms to improve interpretation performance is run.

If not all of the extracted terms matched a symbol in the symbol table, a finer-grained proximal character-based matching process (process 1500) takes over. Such a failure to match may result from, for example, poorly placed delimiters, lowercase/uppercase mismatch, singular-plural disagreement, or typographical errors. As another example, the extracted term may represent a new symbol that needs to get added to the symbol table.

Proximal character-based matching may be performed, for example, using inverted indexing. Such inverted indexing may, for example, use an inverted character index having entries composed not just of distinct characters, but rather of the combination of the distinct character and its minimum frequency of occurrence within the term.

There is more than one way to link the faster term-based matching described above with the slower character-based matching. For example, the character-based process may be performed only after all strings have been term-processed. Or the character-based matching may be performed on a cell-by-cell basis each time a term-symbol match fails.

Furthermore, for any one sequence of characters that is given (from process 1300 in the present embodiment), there is more than one way to look for a character-based match. Each way might incorporate a different transformation whether occurring on the symbols in the catalog or the given sequence of characters. For example, character based matching that tries to correct for words misspelled due to phonetic reasons (e.g., spelling 'coffee' as 'kauphy') needs to transform either or both the given sequence of characters 'kauphy' and the catalog-based symbol 'coffee' in order to arrive at a match.

In the present embodiment, the input to the character-based matching process 1500 is a sequence of characters representing the cell data contents of a cell processed in process 1300 and which failed to match a symbol. It includes all characters treated as delimiters in process 1300 whether surrounding or within the given sequence of characters. It also includes all grammar terms which are frequently eliminated from popular text search algorithms.

Since there are numerous dimensions along which known words may come to be misspelled including but not limited to: misplaced delimiters, mismatching letter cases (eg. "usa" instead of "USA"), the presence or absence of prefixes or suffixes, phonetic equivalencies, common typos and more random mistakes, the first step in process 1500 is to create one or more dimension-specific equivalency transformations (i.e., transformations that preserve the meaning of the sequence of characters under that dimension's transformation) of the given sequence of characters and to run the same character-based matching process on each transformation.

Each dimension-specific equivalency transform is initialized by a set of equivalencies that can be represented in a simple lookup table. For example with phonetic matching, each occurrence or sequence of letters for which a phonetic equivalent is known to exist is listed. Each entry is linked to its phonetic equivalents as with the following example

| Phonetic Equivalency table |
| --- |
| L - ll |
| M - mm |
| S - ss |
| F - ph |
| shun - tion |
| p - pp |

Then, the given sequence characters is compared with the entries in the equivalency table. Each occurrence of characters in the given sequence of characters for which an entry exists in the equivalency table is noted. When all such occurrences are identified, there will be $(2^N)-1$ different equivalent permutations where N=the number of occurrences found in the given sequence of characters. (The original character sequence isn't counted because we know it did not work, hence the minus one.)

Thus, for example, given the equivalency table above, the string "misisippi" would have 4 occurrences of characters with phonetic equivalents: m-mm, s-ss, s-ss, pp-p. Accordingly, there would be $(2^4)-1$ or 15 different phonetically equivalent forms for the sequence of characters "misisippi"

Each of those 15 such as "missisipi" and "Mississippi" would be used to instantiate a separate phonetic transform dimension equivalent sequence of characters, in addition to which there might also be created and run separate equivalency transforms for any of the dimension-specific equivalency transforms, each of which could, in parallel, be character matched against the character_count index according to the proximal character matching method described next. Process 1500 creates a transformed sequence of characters (TSC) for each distinct transformation constructed. For example, at most it would create 15 TSC instances for the 15 generated phonetic equivalences of "misisippi". If running a common-typo dimension transform also generated additional 5 distinct transformations, than another 5 TSC instances would be created for a total of 20. In order to control of systems resources employed, process 1500 uses user-configurable parameters to determine how many TSC instances will be created at a time and how many to create in total before ending the search for a proximal match.

Process 1540 is the actual character-based matching, performed per TSC instance, which is performed in the same way regardless of which equivalency transform was performed. Call the TSC instance $TSC_i$. The character-based matching process begins at the first character of TSC, finds the next character in the given $TSC_i$, and maps the found character to an entry for that character in an index named character_count.

The character_count index contains one or more entries, each of which corresponds to a distinct character paired with the minimum count of its occurrences in a symbol. The entry for a particular character points to the collection of all symbols in the catalog that contain the character and contains a subentry, for each distinct count of occurrences across all symbols in the catalog, with the count of characters and the list of symbols having at least that many instances of the character. Thus, for example, the index might have, under an entry for the letter G, a sub-entry G1 that points to all symbols in the catalog that have at least one 'G' character in them (e.g., green, grey, gregarious) and a sub-entry G2 that points to all symbols in the catalog that have at least 2 'G' characters (e.g., gregarious).

The collection of symbols in the catalog accessed through the character_count index based on reading the current character in the TSCi is intersected with the cumulative intersection of all prior collections of symbols in the catalog that were accessed by reading one of the previously read characters in the TSCi resulting in a new 'cumulative' intersection that defines the collection of symbols called "candidate symbols," that could be matches for the current TSCi based on the characters in the TSCi processed so far.

After each character in the TSCi has been mapped to its corresponding entry in the index and the character's corresponding symbol collection has been intersected with the cumulative intersection of the symbol collections of all prior characters in the TSCi, process 1540 calculates the count of candidate symbols and the count of symbol matches, and identifies the content of the next character position in the source string.

If the count of candidate symbols is greater than 1 and the count of symbol matches=0 and the content of the next position is a character, process 1540 is repeated for the next character in the TSCi.

Otherwise, process 1540 tests the following three conditions, branching into the first one for which the condition is true:

Condition (1): If the count of symbol matches in $TSC_i$ is greater than or equal to 1, the matching symbols are then tested to see if their sequence of characters matches the sequence in the TSC. (In other words, based on this method of symbol matching, the sequence of characters "y-a-m" could match (if found in the symbol table) the symbols "YAM", "MAY" and "AMY" as they all have the same set of characters.) If there is a sequence match, the collection of characters from the source string and the matching symbol are sent to the "term-symbol match accumulator".

If no sequence match is found, the believability of each of the symbol matches is calculated. The following is one example of a process for computing a believability score that is used in one embodiment of the present invention, where the believability of a particular sequence is calculated by the following formula:

Let w=Count of matching characters in the string not matching their ordinal sequence in the candidate symbol, x=The average ordinal distance across all the out-of-sequence characters, y=the count of characters in the candidate symbol, z=count of characters in the string.

The believability score is calculated as: $1/(w+(x/y))/((y+z)/2)$.

A threshold believability score may be pre-selected in any manner, such as by using training samples. Each of the character sequence/symbol pairs with a believability score above the threshold is sent to the character-symbol accumulator along with its corresponding proximal match status, which specifies how the symbol was selected. FIG. 9 describes the list of possible proximal status values. For example, a match status of "All character match out of sequence" indicates that a symbol was selected because it had the same characters as the source string, but that such characters were out of sequence but within threshold bounds of believability.

Condition (2) If the content of the next position in $TSC_i$ is a hard stop (the process has reached the end of the text), the process then gets the count of candidate symbols. The candidate symbols are ranked using a believability formulas such as the one described in (1503) for use by process 1550.

Condition (3) If the count of candidate symbols accumulated by $TSC_i$ equals zero, the proximal match status is set to "No near-matches".

Formula 1503

Let x=count of characters in the given string, y=count of characters in the candidate symbol, $$AC=(x+y)/2,$$

a=count of characters in candidate symbol not matching characters in the string, b=count of characters in the string not matching a character in the candidate symbol, c=count of matching characters in the string not matching their ordinal sequence in the candidate symbol, d=the average ordinal distance across all the out-of-sequence characters The formula is calculated as:

$$(a/AC)+(b/AC)+c+d/y$$

Process 1550 selects the best interpretation from the interpretations generated by the variety of transformation-based character matching processes that were executed.

Process 1550 begins when the character matching is completed for all $TSC_i$ generated by process 1500 across all dimensions in which an equivalency table was used (such as phonetic or typo) and reads the results in each of the matching results tables. Across all of the TSC instances that have run, there may be one or many symbol matches, no symbol matches but one or more candidate matches, or no candidate matches at all. If there are one or more matches or candidate matches, they might all be from TSC instances for a single misspelling dimension or from multiple dimensions. From the entire collection of possibilities (if any are found), process 1550 will select those to be added to the symbol-match accumulator.

Figure 5:
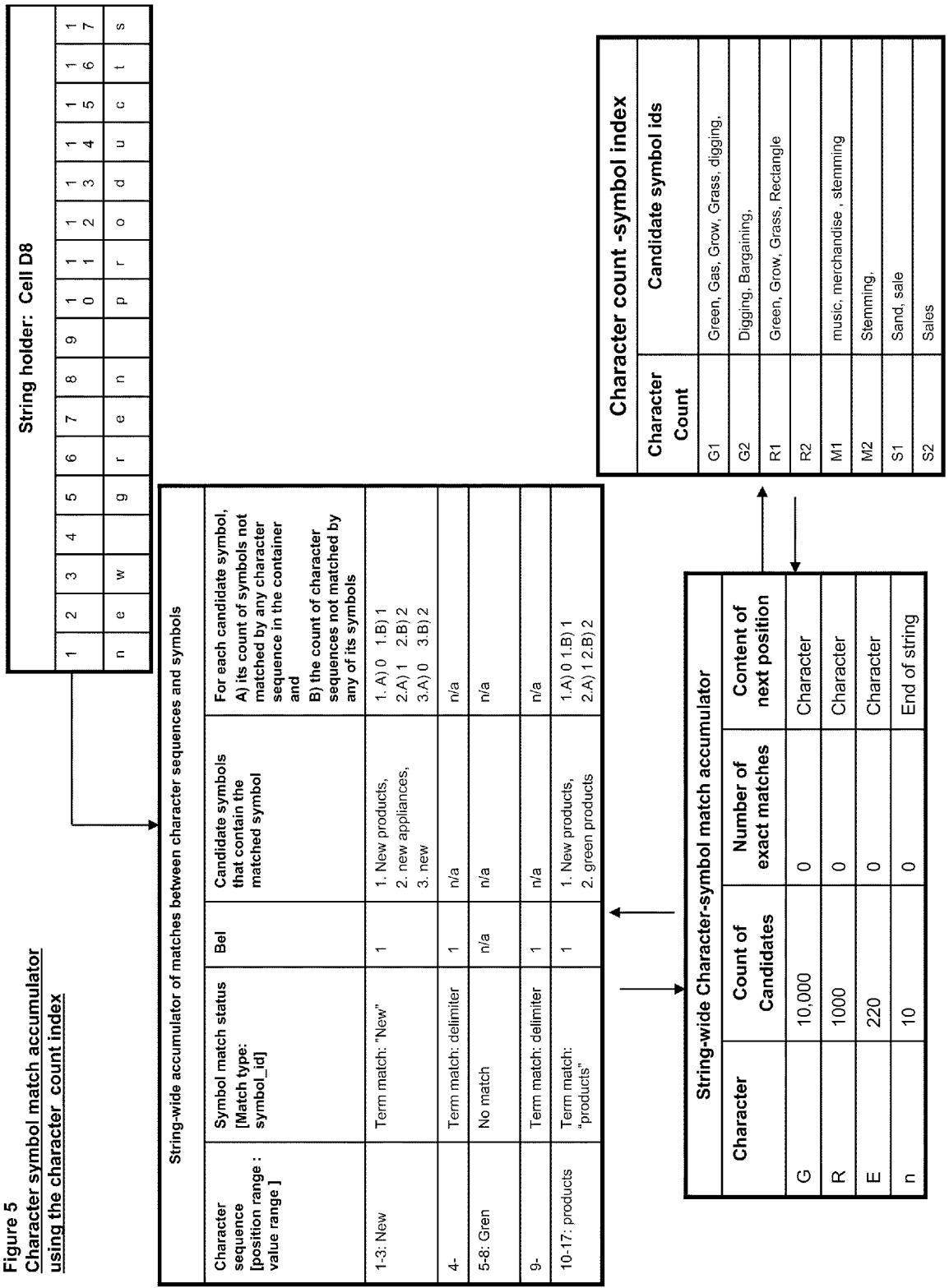
FIG. 5 shows the character match accumulator in progress according to one embodiment of the present invention.

1) If across all the matching results from all TSC there exists only one symbol match with matching sequence, write the original sequence of characters given from process 1300 and the $TSC_i$ that generated a symbol-match and the matched symbol from the catalog along with its proximal match status in the String-wide accumulator of matches between character sequences and symbol. FIG. 5 shows an example of symbol matching results including the string-wide accumulator of matches between character sequences and symbol. (The list of possible proximal match status values that may be generated is given in FIG. 9.) Then return to process 1300 and retest whether all the extracted terms in the cell originally passed from process 1300 have been matched to symbols.

2) If across all the matching results tables there exists more than one symbol match with matching sequence, write the original sequence of characters given from process 1300 and each $TSC_i$ that generated a symbol-match, and for each $TSC_i$, the matched symbol from the catalog along with the proximal match status in the String-wide accumulator of matches between character sequences and symbols. Then run process 1700 to test whether any of the matched symbols correspond to unmatched tokens in process 1300.

3) If no matches exist across any of the matching results tables, and assuming that all possible TSCs were created, test if there were any TSC character matching processes that produced a number of candidate symbols greater than zero and below the user-defined threshold. If so, run process 1700 against these candidate symbols. If process 1700 yields no matches, or if no candidates were sent to 1700, process 1550 will check the user-configurable parameters to see if 1500 should generate any more TSC instances. If so, process 1550 will restart 1500 to generate an additional set of TSC instances. If not, the original character sequence given from process 1300 will be determined to be unrecognizable.

Process 1700 tests candidates against unmatched symbols in the term-symbol accumulator.

Whenever there are a small number of candidate symbols none of which exactly matches the given TSC, the originating "term-candidate symbol accumulator" populated during process 1300 is tested to see if there any candidate symbols whose status is "under matched" meaning that some but not all of the tokens of a molecular symbol in the symbol catalog were matched by the set of one or more terms extracted from the given sequence of characters.

If there are under-matched candidate symbols, test if any of the candidate symbols from the current character-symbol matching process match any of the under-matched candidate symbols in the "term-candidate symbol accumulator". If yes, write this sequence of characters in the term-candidate symbol accumulator and assign it a near match status to the candidate symbol from the character-symbol matching process that matched the under-matched symbol in the term-candidate symbol accumulator.

If there are not any under-matched symbols, calculate the believability of each candidate. The present embodiment can make use of multiple formulas for this purpose. One example is the formula introduced above in formula 1503.

If there is a clear winner from executing formula 1503 and it has high believability, select it and write it and its match status to the "term-candidate symbol accumulator" for that transformation. If there is a set of multiple symbols with equally high believability, write the set to the term-candidate symbol accumulator along with the match status 'partially recognized'. If no candidate is highly believable, record that fact associated with the specific transform-based character matching that occurred and go to process 10500.

If no candidate symbols were found to match an under-matched symbol or if none was within the user-specified distance, then goto process 10500.

If process 10500 returns control to process 1700 having failed to produce a hypothesis that matches the term, process 1700 write "no match" in the String-wide accumulator of matches between character sequences and symbols. An example of this is depicted in FIG. 5: the character sequence "Gren" is not matched.

Process 1900 creates functionally homogeneous cell groups from string-symbol matches. When all the cells have been classified and processed according to process 1100, 1300 (and 1500 1700, and 10500 as necessary), the interpretation information that has been written to the Context-wide accumulator of string to symbol match results is processed by process 1900.

For each entry in this context wide accumulator, get the count of interpretations and the count of symbols per interpretation. If the count of interpretations=1 and the count of symbols >=1, map each symbol_id to the symbol table and get each distinct meaning found in the container links for the symbol. If the logical signature of the meaning is new with respect to the current context of worksheets being interpreted then create a new FHCG having that signature; retrieve all the types from the library wherein the type-signature of the FHCG is a unit; and add each found signature to the definition of the FHCG as a part of its extended logical signature.

If the logical signature of the meaning matches that of an existing FHCG, add the cell_id to the appropriate FHCG. If the count of interpretations >1 and less than some user-defined threshold then add each meaning of each symbol interpretation to the set of FHCGs in the same fashion as above. If the count of symbols per interpretation=0, the collection of terms is entered into the symbol table as a single unique token entry for the whole string and as a single token entry for each component term that may have been extracted from the string during process 1300 using whatever delimiters were used. Additionally, the symbol is marked unrecognized.

FIGS. 3, 4, 5, 6, 7, and 8 depict sample states of the accumulator and resolver structures employed in phase one when employing dimension-wide proximal match techniques to perform symbol matching with a molecular string value.

Figure 4:
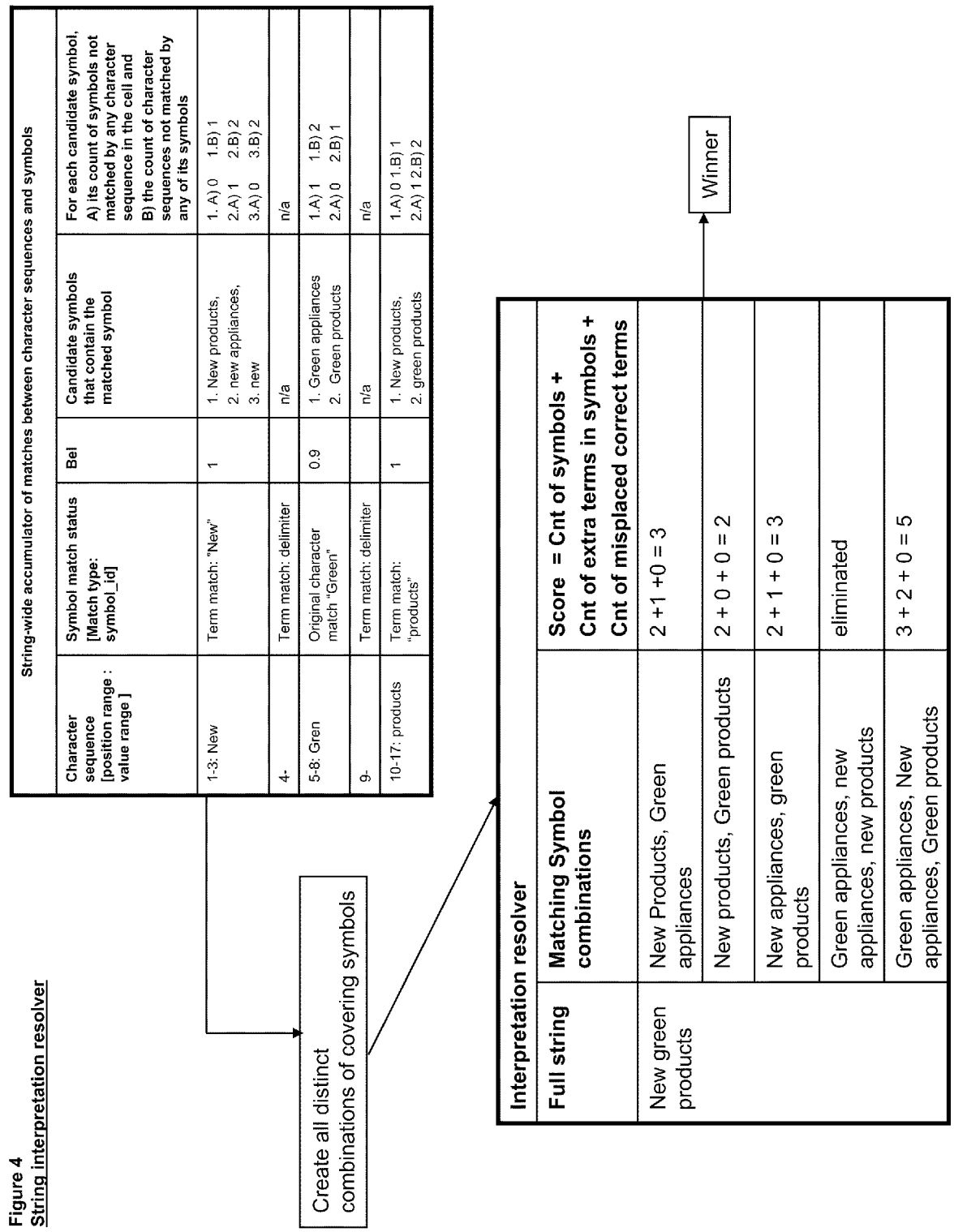
FIG. 4 shows the string interpretation resolver selecting a winning symbol interpretation according to one embodiment of the present invention.

FIG. 4 illustrates that when the string has been as interpreted as possible—when all character-matching processes have been run in the event that character sequences are not easily recognized—each term recognized in the string has associated some number of candidate symbols. The collection of candidates are converted into a set of distinct combinations where each distinct combination covers as many of the original character sequences/terms as were recognized. Each entry in the interpretation resolver is a distinct combination of symbols capable of being an interpretation of the source string. Each of these candidate interpretations is then given a believability score and the interpretation with the lowest score wins. If two or more interpretations have the same lowest score, and that number is less than a user-defined threshold, (typically 2)—they are each taken and placed in the file-wise accumulator of string-symbol matches.

Figure 6:
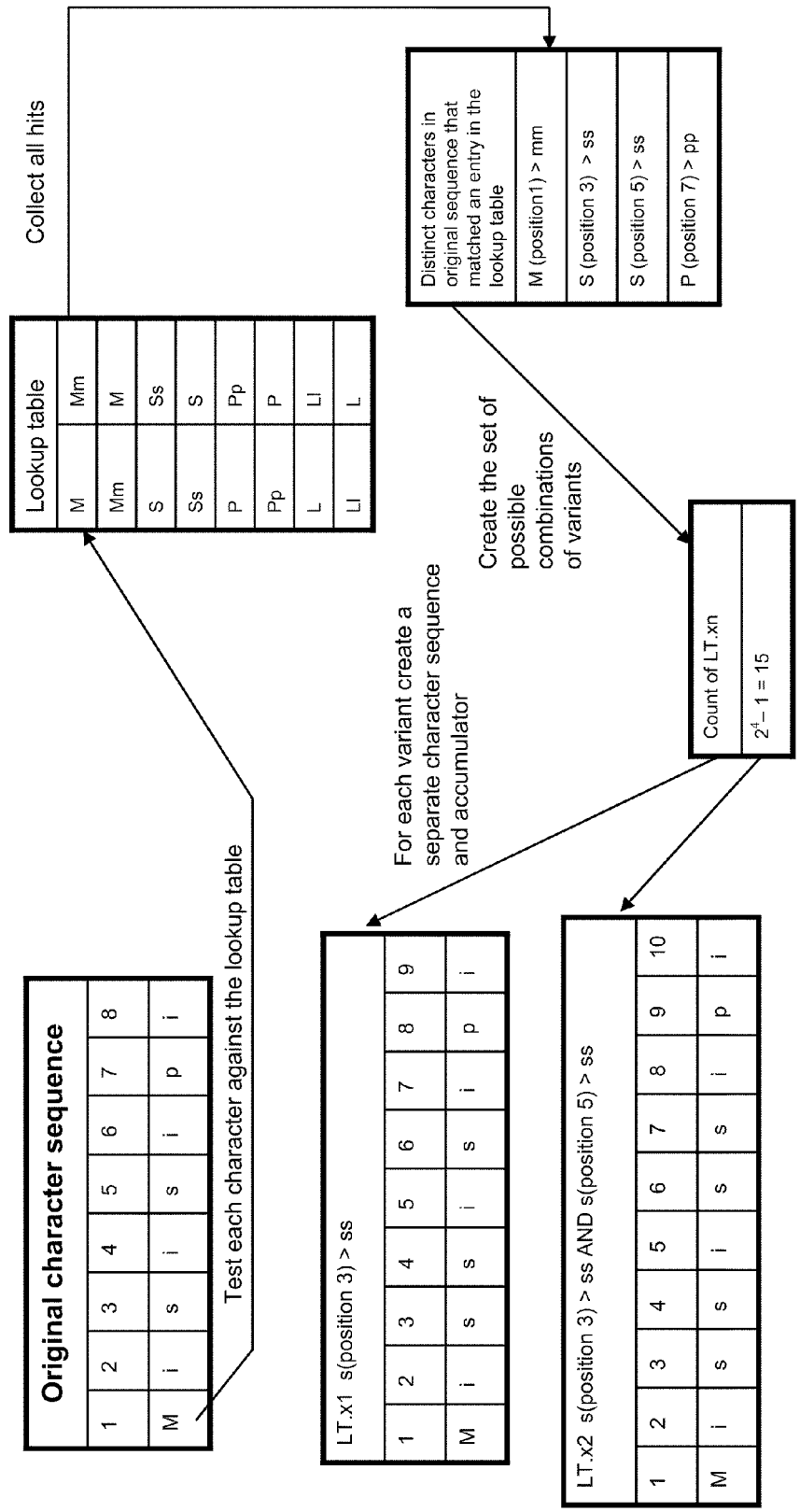
FIG. 6 shows the use of lookup tables to create equivalent transformations of sequences of characters

FIG. 5 illustrates what happens when character sequences that do not match a symbol thru term lookup are sent to the character accumulator for character matching. Each character in the accumulator is mapped to the character_count index. The set of candidate symbols is intersected against the set of symbols previously accessed through mapping previous characters. The character matching process may spawn any number of derivative matching processes: consonant match, phonetic lookup based matching, type lookup based matching, position by position offset based matching (a new accumulator is started for each position in the sequence of characters given). At some point they either fail or succeed. Regardless of outcome, the final results of character matching are deposited in the string-wide character-symbol match accumulator FIG. 6 illustrates relationship details for lookup tables used in character-based matching.

Figure 7:
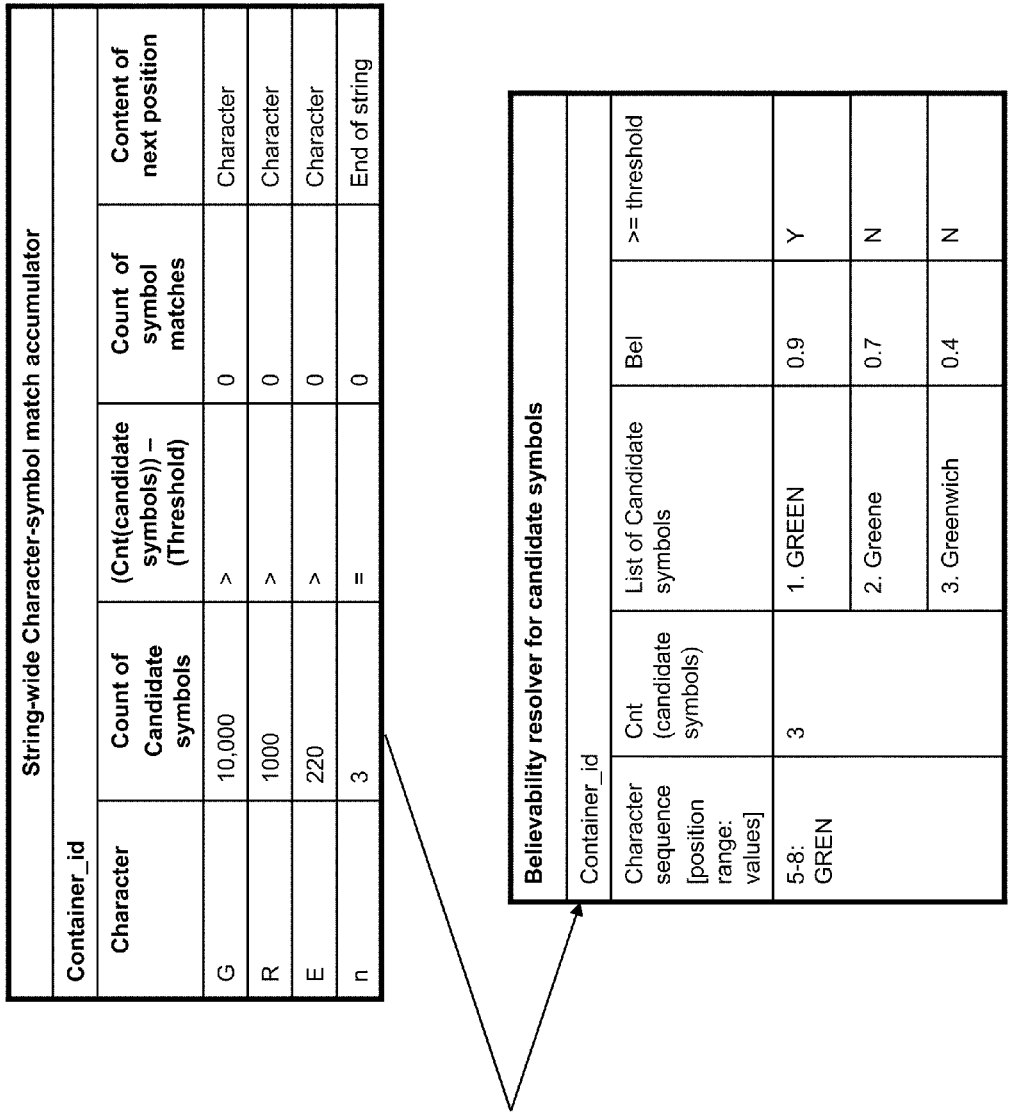
FIG. 7 shows the selection of the most believable symbol to match a sequence of characters according to one embodiment of the present invention.

FIG. 7 illustrates a set of cumulative match statuses as characters of the string "GREN" are considered in turn for character-symbol matching.

FIG. 8 illustrates an example state of the context-wide accumulator of string to symbol match results.

FIG. 9 provides a table of the match status values that can occur from attempts to match terms with symbols.

Figure 11:
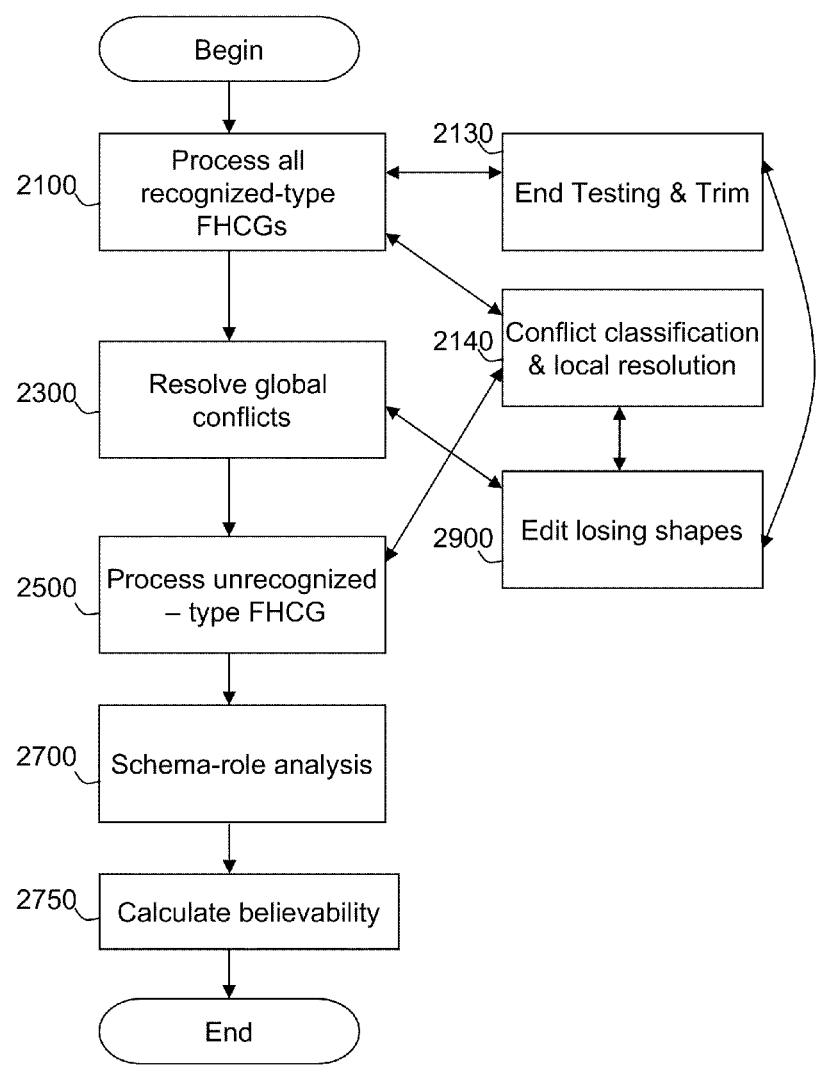
FIG. 11 is a block-level functional diagram of the processes of phase 2 according to one embodiment of the present invention.

FIG. 11*a* illustrates a spreadsheet grid with typical labels and data values. FIG. 11*b* illustrates the grid with the type signature of each cell superimposed in the cell. For each type signature, a single FHCG with its name includes all of the cells containing as a superimposed value the name of that type.

In the present embodiment, after FHCGs have been created as a first intermediate representation, the FHCGs are converted by phase 2 into a second intermediate representation called G1 groups or simply G1s. This in no way implies that G1 creation must follow FHCGs. In other embodiments, G2s (to be described below in phase 3 processing) might be created directly from the raw data with G1s created from the G2s. The same holds true for other processes and phases.

G1 groups are contiguous regions of cells that share the same logical signature or are empty or unrecognized (but potentially capable of having that signature). Although in the present embodiment G1s have either a 1-by-N shape, or, in the limiting case, a 1-by-1 shape (and these limiting cases are called G0s) in other embodiments, G1s could be allowed to assume M-by-N shapes as well. Once create, G1s may also be determined to have a schema-role that is most likely that of locator based on information available at this phase in the processing (or "key" or "dimension value", referred to hereafter as a role of "L"), or a schema-role that is most likely that of content (or "non-key" or "measure value" or "attribute value", referred to hereafter as a role of "C").

The processing that converts FHCGs into G1s and G0s takes place in four main subsidiary processes. Overall, phase 2 simply orchestrates these subsidiary processes. In, process 2100 all FHCGs are used to create G1 shapes. Any local conflicts of interpretation are caught at this point and determined to be either locally resolvable and then resolved or in need of global resolution. In process 2300, all global conflicts are resolved. In the present embodiment, after process 2300 has been executed, any remaining cells that were not recognized in phase one and were not assigned a G1 during processes 2100 or 2300 are grouped into two buckets: unrecognized strings and unrecognized numbers and then processed via process 2500 and thereby converted into G1 groups of unrecognized logical signature. In (process 2700) a schema-role analysis and believability calculation is performed on the results of the prior phase two processes. In addition, there is a shared process 2900 that executes the edit implications for shapes that lose cells during any conflict resolution process.

Figure 12:
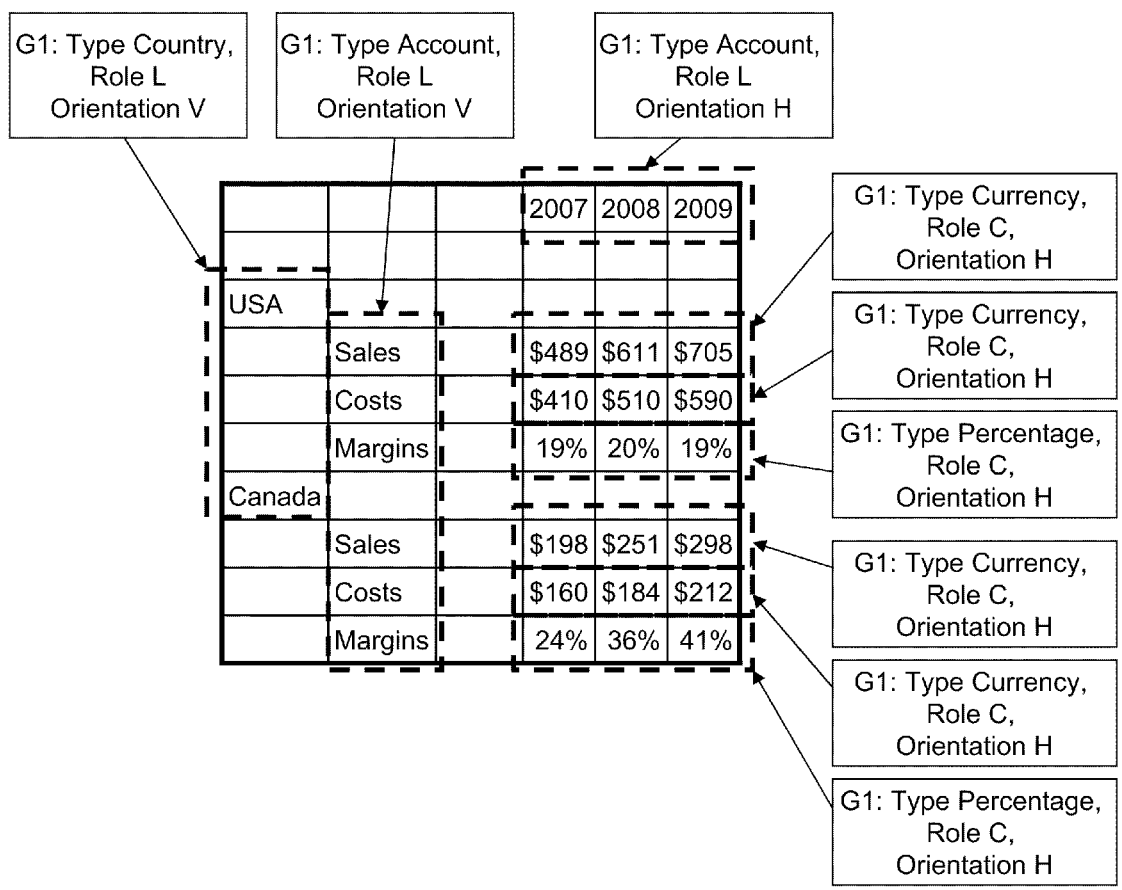
FIG. 12 illustrates the representative spreadsheet of data introduced in FIG. 10a overlaid with cell boundaries corresponding to the instantiated second intermediate representations (G1)as produced by phase two according to one embodiment of the present invention.

FIG. 12 provides a high-level functional diagram of phase 2, showing how its processes 2100, 2300, 2500 make use of processes 2130, 2140, and 2900.

Process 2100 is the main process for creating G1 shapes. It takes as it inputs a collection of FHCGs and produces a set of G1 groups and a set of groups of conflicts between G1 groups that need resolving. The FHCGs may be processed in many different orders, including for example in geometric order as defined by the physical placement of the data in the gridded data form, or in order of any kind of ranking criteria.

In the present embodiment, FHCGs of recognized logical signature are processed by process 2100 from the top left portions of each grid towards the bottom left. Each FHCG is processed both horizontally and vertically. In vertical FHCG processing, G1s are created with a vertical orientation, and cells of the FHCG are examined starting at the topmost cell of its leftmost column of cells. Subsequent cells for a column are examined proceeding down until the spreadsheet's last available cell for that column. In horizontal FHCG processing, G1s are created with a horizontal orientation, and the cells of the FHCG are examined starting at the leftmost cell of its topmost row of cells. Subsequent cells for a row are examined proceeding across until the spreadsheet's last available cell for that row.

The first cell of an FHCG is entered into a new G1 that is given an orientation of the direction of traversal, and the type(s) of the FHCG is(are) used as the signature of the G1. Subsequent cells are tested for subsumability into the G1. The test for subsumability depends on the type of the G1. If the type of the G1 is date, time, formatted numeric or visual content-typed G1, then the cell is subsumable if either the cell has the same logical signature as the FHCG, or the cell is empty. If the type of the G1 is a type whose values are string-based symbols, the cell is subsumable if the logical signature of the cell has the same set of types as the FHCG or a subset of the types, or the cell is empty, or the cell contains an unrecognized string.

If the cell is not subsumable into the G1, construction of the G1 ceases. Construction will also cease once the last available cell of the current column or row (according to orientation) in the spreadsheet is incorporated into a G1. When construction of a G1 ceases, the next G1 will start with the next cell of the FHCG according to the orientation (if vertical, the top-most cell of the FHCG in the next column that contains a cell; if horizontal, the left-most cell of the FHCG in the next row that contains a cell); if there are no more, processing of the FHCG is complete for that orientation.

When a G1 shape is completed, if it contains only 1 cell, then the G1 is deleted. Otherwise, it is "end-tested" by process 2130 as described next.

Figure 13:
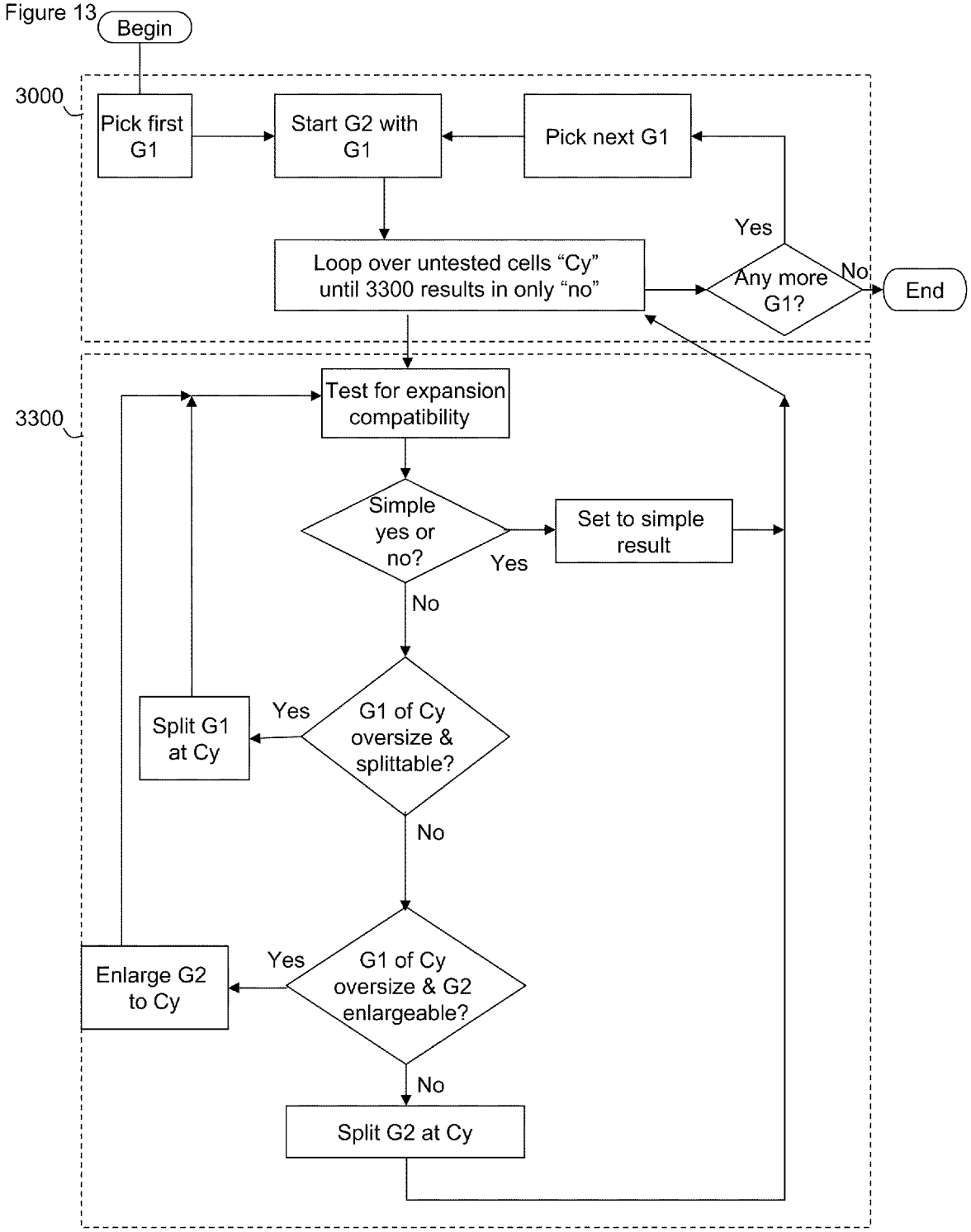
FIG. 13 is a block-level functional diagram of the processes of phase 3 according to one embodiment of the present invention.

Process 2130 proceeds as follows: In end-testing, the shape is tested to see whether its end cells are empty or filled. If empty, the shape is cut back to the point of the last filled cell. If this results in only 1 cell, then the G1 is deleted. For example, as shown in FIG. 13, the Country G1 would initially subsume down to the last row, but end-testing trimmed it back to the last cell that had an entry ("Canada"). (End of process 2130.)

If the G1 is not deleted for either of the foregoing reasons, then it is entered into a list of constructed G1 shapes, and the cell-shape tracker adds the G1 to the set of shapes constructed from each cell. The cell-shape tracker has the ability to detect that 2 or more G1 shapes use any cell, and by examining the G1s to detect whether they came from the same FHCG or different FHCGs.

After a FHCG has been processed in both orientations, the cell-shape tracker is queried to determine if any of the FHCG's cells are assigned to more than one G1. If so, the conflicting shapes are collected into a group and the conflicts between usages of the cells by the group are resolved by process 2140. Although in the present embodiment, G1s are limited to 1-by-N shapes, in other embodiments, especially for numeric data content and visual content, rectangle-shaped groups may be created during the G1 local conflict resolution process 2140 described below.

Process 2140 proceeds as follows: If there is only 1 cell in conflict in the group (and therefore, only two shapes conflicting), and the cell is either a beginning or end cell for each of the G1 shapes, then the cell is removed from both shapes using process 2900 and reassigned as a G0 group. Each of the shapes is then end-tested by process 2130, and either or both may be dissolved. If dissolved, they will eventually be reassigned as G0s.

If there is only 1 cell in the conflict group (and therefore, only two shapes conflicting), and the cell is a beginning or end for one G1 shape and an interior cell for the other, then it is removed from the shape for which it is a beginning or end using process 2900 and end-tested using process 2130 (either of which may delete the G1 wholly).

If there is more than one cell in the conflict group, and all are parallel except for one (which must therefore be perpendicular to the others), and the parallel shapes all intersect the perpendicular shape, and for each parallel shape, its conflicted cell is an end cell, then the conflict is resolved as follows: for each cell with a conflict, get the shapes that are conflicting. If the cell is a beginning or end cell for both shapes, then remove the cell from both shapes and reassign the cell as a G0. If the cell is an interior cell of the perpendicular shape, however, remove the cell from the parallel shape only by process 2900. For each G1 shape that has a cell removed, it is removed by process 2900 and then is end-tested by process 2130. Either of these may delete the G1 wholly.

If there is more than one cell in the conflict group and it does not meet the prior processing constraints, it will be input to process 2300 for conflict resolution. (End of process 2140.)

After all FHCGs (except for unrecognized string and general number) have been processed, there are two kinds of conflicts that can be queried from the cell-shape tracker: Conflicts that were not handled by process 2140, and conflicts where a cell has been incorporated into G1 shapes from two or more different FHCG. The process queries the cell tracker for these, and if they exist process 2300 is executed.

Process 2300: The first stage in the process of resolving global conflicts is to group shapes into independent conflict groups. Two shapes belong to the same conflict group when one shape's winning a cell is co-determined with the other shape's losing the cell. Shapes that belong to different conflict groups win or lose one or more cells without impacting each other.

The assignment of cells and shapes to conflict groups may be explained in terms of graph theory. Consider each conflicting cell as a vertex and each shape having a conflicted cell as an edge (and allowing for each edge to have 2, 3 or more points as opposed to only 2 points). A search for graph-theoretic connected components of the worksheet will establish the conflict groups, each connected component is a single conflict group.

The global conflict resolution process takes conflicted cells and shapes as inputs and tries to match them to known patterns that have an immediate solution. The set of known patterns and the contexts under which they apply is extensible.

First, shapes wholly contained in other shapes are removed. Across all shapes in a conflict group, the process calculates which shapes are wholly contained within other shapes. A shape might wholly contain another shape, and be itself contained within a larger shape. Of shapes "A" that are contained within shapes "B", the shapes B that are themselves not contained in other shapes are chose as the winners, and the conflicted cells assigned to these. The other shapes (that were contained within other shapes) are deleted and the cell-shape tracker updated to reflect that the losing shapes no longer contain these cells. If after resolving these conflicts of wholly contained shapes, there are no more conflicted cells, then the process terminates.

Otherwise, the process checks to see if there are any conflicted cells whose position is at the edge for at least one of the conflicted shapes touching it. If there is at least one such cell then for each such cell (call it C), its position (beginning, middle, end) is obtained for each shape in conflict at C. If C is a beginning and/or end for all the shapes in conflict, then it is removed from all the cells and reassigned as a G0 that has one interpretation for each distinct G1 signature that was in conflict at C. The shapes in conflict are edited as per processes 2140 and 2900, and may be removed entirely, perhaps with G0s created to replace them. If C is an interior for one or more shapes (as well as being a beginning or end for at least one), then it is removed from the shapes for which it is an interior, and processes 2140 and 2900 are executed on these shapes (which may result in these shapes being removed entirely). If C is still in conflict as a beginning/end cell for two or more shapes, it is processed as described above for the case when C is a beginning and/or end cell for all the shapes in conflict.

If there are any remaining conflicts, then the process invokes a "hypothetical edit-based resolution strategy" hereafter called "HS". HS leverages capabilities already described and so can be described at a higher level. HS uses process 2900 to specify what would happen to each conflicted shape in the event that that shape lost the cell or cells in conflict. Each invocation of process 2900 constitutes a distinct win-lose scenario for a shape. For example, if two shapes shared one conflicted cell, process 2900 would be invoked twice thereby creating two scenarios. Then, for each scenario the believability of each shape that would exist in that scenario and the believability of the scenario as a whole is calculated as per formulas 2701 and 2702. Finally, the most believable scenario is selected. If more than one scenario is equally most believable, all such scenarios are retained. Any one is used for subsequent processing. But the one(s) not initially used can be accessed in downstream processing if subsequent interpretation processes find excessive irregularity Process 2500: After all processing of FHCGs containing recognized strings, and formatted time/dates and numbers has occurred, all unrecognized strings (which may be have been assigned to a G1 and then de-assigned during G1 editing or simply never assigned a G1) are collected and assigned to the special unrecognized string FHCG, and whatever general number cells are remaining are assigned to the special general number FHCG. The unrecognized string FHCG is processed the same as any other recognized string-based FHCG, except for the subsumability criteria. An unrecognized string-containing cell is subsumable if it contains a string or is empty and is not assigned to a G1 group of recognized logical type (i.e., is not "unrecognized string") and has the same visual content as the visual characteristics of the first cell in the G1.

The unrecognized number FHCG is processed the same as any other recognized numeric FHCG except for the subsumability criteria. An unrecognized number-containing cell is subsumable if it is also of type general number or it is empty.

Conflict tracking and resolution is processed the same for unrecognized strings as for recognized strings. Whatever detected conflicts are not resolved through process 2140 are resolved by creating distinct G1 shapes over all conflicted shapes. Conflicted cells are removed from conflicting shapes using process 2900 and are designated as G0 shapes, and the resulting G1s are processed by process 2130.

Process 2700: To the degree that the G1 groups created (and by extension, the cells within them) will, in a downstream process become a part of a logical schema in grid form, called hereafter a G3/4, the G1s as physical representations of logical types will have a definable logical role in that schema called a schema role. From a logic perspective, there are only two schema roles for types in a schema: that of locator "L" (or key or dimension) and that of content "C" (or non-key attribute or measure or account or variable). Since both L's and C's are defined in terms of the same set of underlying types and all types have at least names and values all processes may refer to Locator names, Content names, locator values and content values in addition to type names and type values. Process 2700 assigns schema roles to types as represented by G1s. Though it is tempting to assume that all string data represent labels, and thus function as locators, while all numeric data represents content, such an assumption is overly simplistic when it comes to interpreting real world gridded data.

There are two calculations are used to determine the degree to which a collection of adjacent values is usable as a locator. First, the count of distinct non-empty values in the collection divided by the count of filled values in the collection. This count is called the Lscore. And second, the count of filled values in the collection divided by the count of cells or positions in the collection. This count is called the density.

As such, the example embodiment begins the process of assigning schema roles at the end of phase 2 processing during process 2700.

Visual appearance G1s are not assigned schema roles in this embodiment of the present invention. In others, they may. All G1s that do not define visual appearance and whose logical signature is categorical in nature are initially assigned the role of locator. All G1s that are of type date, time or number in any format are tested for ordinal sequence in their distinct values. If the distinct values of the G1 are found to define an ordinal sequence, and if that ordinal sequence is not adjacent to another G1 of numeric type also with ordinal sequence, the G1 is assigned the schema role of locator (or L). Otherwise, the G1 is assigned the role of content (or C).

The process of re-evaluating previously assigned schema roles may continue throughout all phases. For example, some of the conditions whose appearance in subsequent phases would indicate that a G1 composed of strings and initially assigned a schema role of locator would be better interpreted as a content include:

1) the G1 is discovered to be inside another G3/4 and there are numeric data on either or both sides of the G1 and the locator orthogonal to the G1 has the same structure on either side of the G1 so that it does not look appropriate to split it at its intersection with the G1;

2) the G1 did not combine with any other G1 locators and does not constitute a collection of distinct values capable of serving as a locator;

3) the believability of the worksheet increases significantly with the flipping of the G1s role from locator to content.

Some of the conditions whose appearance in subsequent phases would indicate that a G1 composed of numbers and initially assigned a schema role of content would be better interpreted as a locator include:

1) The G1 defines a sequence and that sequence can serve as a locator with respect to some data as content;

2) the G1 can act as a locator in conjunction with other G1 locators;

3) the believability of the worksheet increases significantly with the flipping of the G1s role from content to locator.

Process 2750: G1 believabilities can be calculated either when G1s are being hypothetically created during process 2300 or when they are being actually created during any G1 creation processes such as process 2100 or 2900. Below are listed the G1 shape and scenario believability formulas used in the present embodiment. Other believability formulas could be envisaged in other embodiments.

Formula 2751 Believability of a Shape

Let a=Count of recognized cells in the shape, b=Avg. number of candidate assigned shapes per cell in the shape c=Count of unrecognized cells in the shape, d=Count of cells in the shape e=Count of empty cells Believability of a shape=

$$(a/b)+(\tfrac{1}{2}*(c/b))+(\tfrac{1}{4}*e/b))/d$$

Formula 2752 Believability Per Scenario=

Let a=result of 'Area-weighted average believability for all the shapes in the scenario' calculation b=result of 'Relative count of explained cells in the scenario' calculation c=result of 'Relative count of shapes in the scenario' calculation 'Believability per scenario' is calculated as a*b/c The 'Area-weighted average believability for all the shapes in the scenario' calculation is defined as follows:

Per shape, let b=believability for the shape, where believability for the shape was calculated by a formula such as formula 2751, c=Count of cells in the shape Let d=Count of cells in all shapes in the scenario 'Area-weighted' average believability for all the shapes in the scenario=Sum over all shapes 's' in the scenario of (b*(c/d))

The 'Relative count of explained cells in the scenario' calculation is defined as follows:

Let x=Count of cells for all shapes in the scenario y=Count of cells in the scenario having the greatest amount of cells 'Relative count of explained cells in the scenario' is calculated as x/y.

The 'Relative count of shapes in the scenario' calculation is defined as follows:

Let x=Count of shapes in the scenario (where each singleton counts as one shape)

y=Count of shapes in the scenario with the smallest number of shapes

'Relative count of shapes in the scenario'=x/y

Process 2900: Given a G1 that is chosen to lose a cell C: If C is the first cell of the G1, adjust the G1 so its first cell is the first non-empty cell following C in the G1 that matches the G1's type signature. If no such cell is found, the G1 is deleted. If C is an interior cell, then zero, one, or two G1s, and zero, one or two G0s may be created. A new G1 (call it G1$a$) is created from the cells from the first cell of the original G1 up to but not including C. G1$a$ has empty cells removed from its end by process 2130. If it has only 1 filled cell after this, it is deleted and the filled cell is designated a G0 (if recognized). Within the set of cells from the first cell after C to the last cell of the G1, the process searches for the first non-empty cell that matches the G1's type signature, designating all non-empty cells (which are unrecognized) as unassigned along the way. If no cell is found, the process is done. Otherwise, a new G1 (call it G1$b$) is created starting at the found cell and has empty cells removed from its end by process 2130. If there is only one recognized cell in G1$b$, G1$b$ is removed and the cell is designated as a G0. If C is the last cell of the G1, it is removed from G1 and process 2130 is run on the G1. If there is only one filled cell left, it is designated as a G0 and the G1 is deleted. (End process 2900)

FIG. 12 shows the set of G1s created by the FHCGs that were illustrated in FIG. 10*b*. There are two vertical L-role G1s for Country and Account and one horizontal L-role G1 that was interpreted as Year by using a sequence of Year names close to the contemporaneous real time. There are three horizontal C-role G1s for the numeric units Currency and Percentage. These geometric type range interpretations are a significant transformation of the input grid, and the next phase of processing (phase 3) will grow the representational capability.

The goal of this processing phase is to group G1 structures of the same most probable schema role and geometric (e.g. vertical or horizontal) orientation into the largest groups possible so long as the G1s are homogenous in terms of schema role and, if serving as locators that their Lscore is increasing with size. These rectangular shapes or tuple sets will serve as further refinements of locator/dimension/key structures and content/data structures.

There are two main processes in phase three: process 3000 and process 3300. The purpose of process 3000 is to manage the creation of G2 structures from G1s. As a part of its execution, process 3000 calls process 3300 to test whether the current G2 can be expanded at a particular cell, and if so whether the current G2 can be extended without the need to split either the current G2 or the G1 into which the G2 is expanding or whether to enlarge the G2 in a lateral direction. The decision as to whether G2 expansion can take place without needing to consider different options for editing either the current G2 or the G1 into which the G2 is attempting to expand is based largely on the alignment of the G2 relative to the G1 and on the believability impacts of splitting either or both groups.

FIG. 13 provides a block functional diagram of the processes in phase 3. Process 3000 is the main driver, initializing a G2 and then invoking process 3300 repeatedly to test where and how a G2 can grow.

Process 3000 processes all L-role G1 shapes first followed by all C-role G1 shapes. Although roles may be processed in any order, in one embodiment all vertical L-role G1 shapes are processed first, followed by all horizontal L-role G1 shapes, followed by all vertical C-role G1 shapes, followed by all horizontal C-role G1 shapes followed by any rectangular C-role G1 shapes.

Processing proceeds as follows: A G2 shape is created with an initial G1, which defines its first edge, and a G2 "accumulator" structure (which will be described below) is initialized. The G2 shape is given the orientation of the G1 shape. The process will attempt to expand from the initially given G1 shape by incorporating additional G1 and G0 shapes. The primary direction of expansion for a vertical G1 is horizontally from left to right (e.g., to higher column letters in a spreadsheet) and the primary direction of expansion for a horizontal G1 is vertical from top to bottom (e.g. to higher row numbers in a spreadsheet). More than one G2 shape at a time may be partly complete and undergoing expansion within the process, each with its own "accumulator" structure.

During each point in time during the creation of a G2, the G2 accumulator has:

- a description of the bounding box for the G2 that provides top, bottom, left and right cell limits;
- a fixed first edge, namely the collection of cells that comprised the initializing G1;
- a current expansion-testable line (which may or may not be straight) that is the outermost collection of cells in the G2 in the direction of expansion as it currently exists in the process of creation; a current expansion-testable cell which is the current cell being tested for expansion within the current expansion-testable line;
- a current cell being tested for subsumability which is the cell within the current expandable-into line that is adjacent to the current expansion-testable cell in the direction of expansion; a range of cells having the same subsumption response as the current cell being tested for subsumability.

When a G2 is initially created, the G2 accumulator is initialized as follows: the "current expansion-testable line" is set to the cells of the initial G1, and the current expansion-testable cell hereafter called "Cx" is set to the first cell of the G1, and the current cell being tested for subsumability hereafter called "Cy" is set to cell adjacent in the direction of expansion to the first cell of the G1. The G2 being tested for expansion is referred to as G2x.

The process of trying to expand the G2x begins with determining whether there are any untested cells remaining in the current expansion-testable line. When the G2x has just been created, this will be the case. The process then performs the expansion-test process 3300, which may result in the initial G2x being modified or split into multiple G2xs, each of which will have its own associated "G2 accumulator". Following the running of process 3300, the resulting G2x or G2xs are expansion-processed as follows:

For each of the resulting G2xs: If there are no cells remaining in its current expansion-testable line, then the process checks if there were any "yes" results from the expansion test for that G2x. If there were no "yes" results, then expansion of the G2x stops, the G2x is entered into the list of resulting G2 shapes, and the cell-shape tracker is updated to indicate that all cells within the G2x are used in this G2x. Otherwise, if there were any "yes" results from the expansion test, then each cell for which the expansion test was "no" is marked as being an end cell for the G2x, each cell for which the expansion test was "yes" is entered into the collection of cells forming the current expansion-testable line, and G2x expansion-processing repeats.

When all G1s have been processed and all G2s have been expanded as far as they can be by the process described here, process 3000 is complete.

The purpose of process 3300 (described below) is to calculate whether or not a particular expansion-testable cell Cx, can or can not be expanded into the current expandable into cell Cy and whether or not modifications to the G2x or what the G2x is expanding in to need to be made. Process 3300 relies on the following three functions that are shared between all of the test cases:

A function GMax(cell) is defined which returns, for a cell, the maximum shape-level number of shapes that incorporate that cell. If a cell C1 is used by a G1 shape but not a G2 shape, then GMax(C1) is 1. If cell C1 is also used by a G2 shape, then GMax(C1)=2.

A function Role(shape) is defined which returns, for a shape, the most probable schema role of that shape (which might be L or C).

A function G(cell, level) is defined which returns, for a cell and a shape level, the shape at that shape level which incorporates that cell.

Process 3300 may also make use of the Lscore for a G2 and how it would change if it grew. Those possible expansions that would produce a declining Lscore are flagged.

Process 3300 proceeds as follows. Recall that the current expansion-testable cell is "Cx" and the current cell being tested for subsumability is "Cy" and that the G2 for which the process is testing the ability to expand is "G2x". There are five different processing branches that may be followed depending on the output of the functions described above. The fifth branch in turn has four of its own subsequent branching points. The first three branches are much simpler than the second two matches, and can be termed together "simple yes or no".

(Simple yes or no (1)): When either GMax(Cy)=2 or both GMax(Cy)=0 and Role(G(Cy, 0)) is different than Role (G2x), then the expansion test result for Cx is "no", Cx is set to the next cell in the current expansion-testable line and process 3300 ends.

(Simple yes or no (2)): When either GMax(Cy)=0 and Role(Shape(Cy, 0))=Role(G2x) or Cy is empty, then the expansion test result for Cx is "yes", Cx is set to the next cell in the current expansion-testable line and process 3300 ends. In FIG. 14, this rule is what extends the G2LV from its first Cx cell at A3 to the empty cell at B3.

(Simple yes or no (3)): When GMax(Cy)=1 and either Role(Shape(Cy, 1)) is different from Role(G2x)) or both a) Role(Shape(Cy, 1)) is L and Role(Shape(G2x) is L and b) the orientation of the G2x is different than the orientation of Shape(Cy, 1), then the expansion test result for Cx is "no", Cx is set to the next cell in the current expansion-testable line and process 3300 ends. This case is how the G2LH does not expand from the Year G1 of row 1 to the Currency G1 from cell D4.

(4) When GMax(Cy)=1 and Role(Shape(Cy, 1)) and Role (Shape(G2x)) are both C and the orientation of Shape(Cy, 1) is different than the orientation of Shape(G2x): if the G1 shape returned by Shape(Cy, 1) has the same logical signature as the shape returned by Shape(G2x) or is of type "unrecognized number" and can be formed into a rectangle with it, then the expansion test result for Cx is "yes", otherwise it is "no". The two shapes can be formed into a rectangle if the following holds: within the bounding box formed by the extreme upper-left cell across the two shapes to the extreme lower-right cell across the two shapes, the cells are either empty or have the same logical signature as the G1 shapes or have type "unrecognized number". Cx is set to the next cell in the current expansion-testable line and process 3300 ends.

(5) When GMax(Cy)=1 and Role(Shape(Cy, 1)) and Role (Shape(G2x)) are both L and the orientation of Shape(Cy, 1) and Shape(G2x) are the same, then the process must account for different possible alignment relationships of which the present embodiment lists the four below.

In the alignment relationship (1), if the first slice of G2x is either at the same row or column ordinal along G2x's orientation as the first such ordinal of G(Cy,1), or before that ordinal, and the cell ordinal of the last slice of G2x is either at or before the same such ordinal as the last cell of G(Cy,1), then the expansion test for Cx is "yes", Cx is set to the next cell in the current expansion-testable line and process 3300 ends.

In the alignment relationship (2), if G(Cy,1) extends beyond one of G2x's endpoints and G(Cy,1) can be split so as to align with G2x's endpoint without either reducing G(Cy, 1)'s believability or removing any of its cells, then the process attempts to split G(Cy,1) into two G1s (call them G11 and G12) so that the boundary between their parts aligns with the relevant boundary or boundaries of G2x. The process of splitting G(Cy,1) into the two G1s is similar to what is performed in process 2900, except that there is no "losing" cell but instead simply a division between the last cell of the first G1 and the first cell of the second G1. As in process 2900, in particular, the first G1 is end-tested with process 2130 and the second one has both empty and unrecognized cells removed from its beginning and is end-tested with process 2130. Process 3300 is then restarted.

In the alignment relationship (3), if G(Cy,1) extends beyond one of the current G2x's endpoints and G(Cy,1) cannot be split so as to align with G2x's endpoint without either reducing G(Cy,1)'s believability or removing any recognized cells from G(Cy,1), test to see if the G2x can have its endpoints extended so as to align with G(Cy,1)'s endpoint. The extension could be upward and/or downward if their orientation if vertical, and leftward or rightward if their orientation is horizontal. This test will be true if all cells which would be added are empty. If the test is true, the following occurs: the definition of G2x's boundary is altered so that it includes the boundary of G(Cy,1); the cell-shape tracker is updated to mark the cells both of G(Cy,1) and of the additionally-incorporated area as part of G2x; cell Cx is also marked with an expansion test result of "yes", Cx is set to the next cell in the current expansion-testable line, and process 3300 ends. This is rule and relationship by which the G2LV in FIG. 14 has its lower boundary extended to the bottom row of Accounts when the first filled cell (B4) of the Accounts G1 is tested for subsumability.

In the alignment relationship (4), if G(Cy,1) extends beyond one of the current G2x's endpoints and G1x cannot be split so as to align with G2y's endpoint without either reducing G1x's believability or removing any recognized cells from G(Cy,1), and G2x cannot be extended so as to align with G(Cy,1)'s endpoint, then the process will split G2x into two G2s ("G2a" and "G2b") and split G(Cy,1) into two G1s ("G1a" and "G1b"). The splitting process and subsequent cascading of edits follows the logic of the prior case, and either or both of G1a or G1b may be deleted or become a G0. Furthermore, as part of splitting the entire G2x, any other G1s in G2x will be split according to same logic at the cell Cx. Cell Cx is also marked with an expansion test result of "yes", Cx is set to the next cell in the current expansion-testable line, and process 3300 ends.

The purpose of (Phase four) process 4000 is to identify G2Ls and content groups, principally G2Cs but also remaining G0Cs, that can be combined into first approximations of either perpendicular schemas or vertical or horizontal schemas and to so combine them. These grid-represented schemas will get refined in subsequent processes and may even be further split or merged. But process 4000 is the first time they are created.

There are numerous ways that the process of building approximate schemas can take place. For example, larger schemas can be identified first, and relative to those larger schemas geometrically nested schemas may be detected and marked as not applicable locations relative to the larger, nesting schema. Or, prospective schemas may be split into smaller schemas in the presence of certain kinds of nested elements in which case a larger number of smaller schemas will be created perhaps without any nested schemas at all. Since these smaller schemas will be merged in downstream processes such as 8100, the result is the same. The present embodiment reflects the latter approach.

Figure 15:
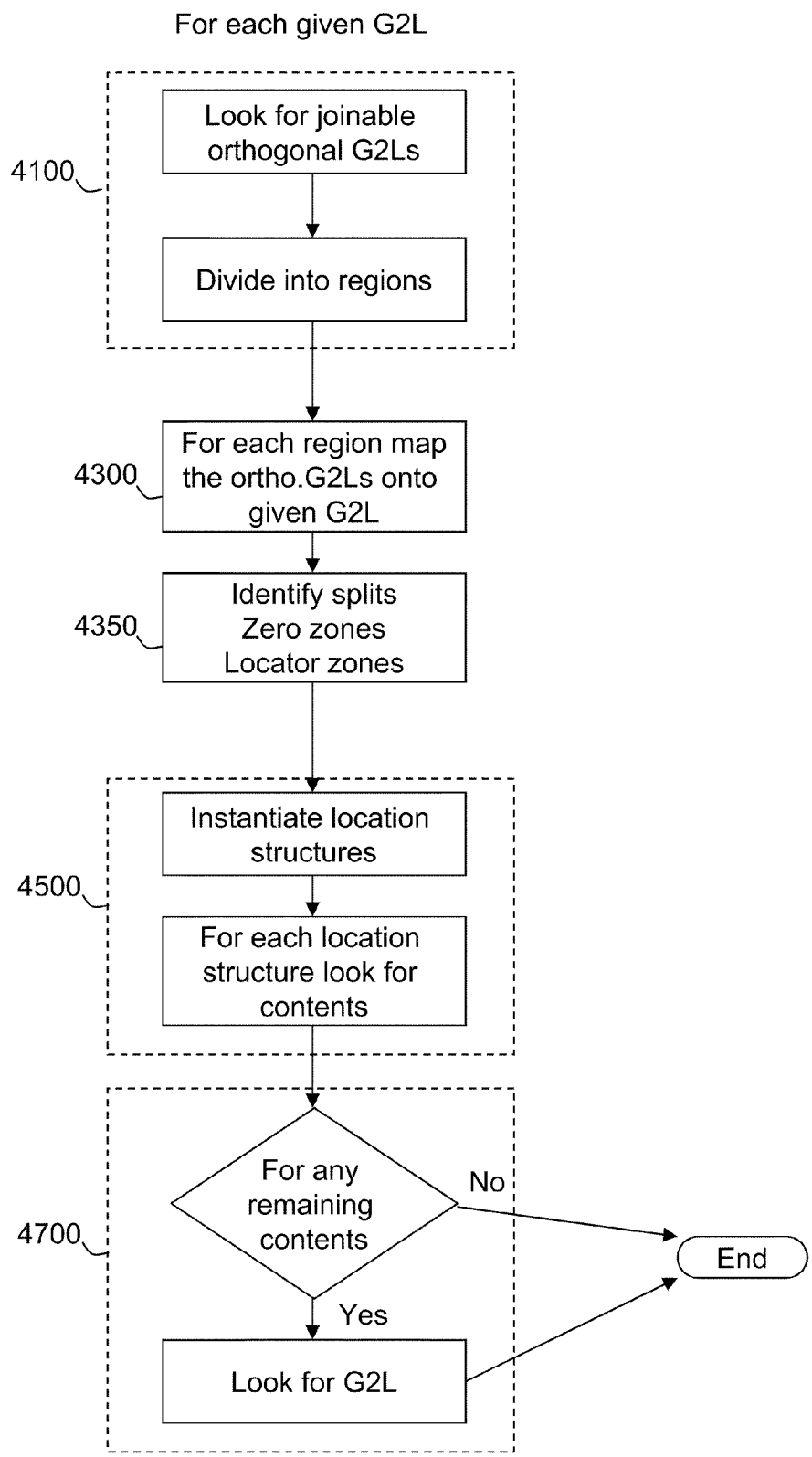
FIG. 15 is a block-level functional diagram of the processes of phase 4 according to one embodiment of the present invention.

Phase four, as depicted in the block functional diagram of FIG. 15, is composed of the following processes:

Process 4100 looks, relative to a given G2L, for orthogonal G2Ls whose joining with the given G2L is semantically possible (a term defined below) and divides them into regions that are internally homogeneous with respect to the set of orthogonal G2Ls that can join with the given G2L.

Process 4300 maps for each G2L and for each region defined in process 4100 the collection of orthogonal G2Ls onto the given G2L, identifying zero zones (cells not capable of joining with an orthogonal G2L), locator zones (zones within which locator tuples may exist) and points (if they exist) where the given G2L needs to split, ultimately defining what are called G3/4s.

Process 4500 identifies, relative to each G3/4, contents within the range of locations defined by the G3/4 as well as and cell locations that are logically undefined relative to the G3/4.

Process 4700 identifies relative to any remaining contents that are not yet associated with a G3/4, G2Ls that can serve as locators for that content and if found, instantiate an appropriate G3/4.

Process 4100 joins each G2L with as many orthogonal G2Ls as semantically possible (either in their entirety or parts thereof). The expression "semantically possible" means that a line drawn perpendicularly from any cell of an orthogonal G2L (which line is drawn down if the orthogonal G2L is horizontal and to the right if the orthogonal G2L is vertical) whose joining with the original G2L is semantically possible must be able to touch—without crossing another cell identified as a locator-some cell that can be touched by a line drawn perpendicularly from any cell in the original G2L (to the right if the G2L is vertical and down if the G2L is horizontal), which line must not cross a cell identified as a locator as it travels from its cell of origin on the original G2L.

For example, if some G2L (call it G2Lx) were vertical and there was another vertical G2L ten columns to the right and there was an orthogonal G2L (call it G2Ly) that was nine columns long and ran along the $1^{st}$ cell above the top of the G2Lx, it would not be semantically possible for any other G2L above G2Ly say G2Lz which was also orthogonal to G2Lx to join with G2Lx for the same range of cells with which G2Ly was capable of joining Process 4100 begins by identifying for each G2L its nearest parallel G2L neighbor called G2Ln (to the right if G2L is vertical and below if the G2L is horizontal). Then it draws a line from the last cell of the G2L (but not including that cell) to the cell immediately before where it intersects either G2Ln or its extension. This line is called the last edge of the zone of clarity. And it draws a line from the $1^{st}$ cell before the first cell of the G2L to the cell where it intersects either G2Ln or its extension. As with the last edge, this second line, called the first edge of the zone of clarity does not include the cell immediately above the G2L nor does it include either the cell in the G2Ln it intersects or its extension line. If there is no nearest parallel G2L, the lines drawn extend to the edge of the bounding box.

Process 4100 relies on the following two functions to find the set of semantically joinable G2Ls.
(1) Nearest G (Colx, Cell xy) returns the next nearest G2L that has a cell in the x column above the cell with coordinates xy. Successive invocations of this function will potentially return a series of G2Ls all of which contain a cell in column x and each of which is above the previously identified G2L.
(2) Nearest G(Rowx, Cell xy) returns the next nearest G2L that has a cell in the x row left of the cell with coordinates xy. Successive invocations of this function will potentially return a series of G2Ls all of which contain a cell in row x and each of which is left of the previously identified G2L.

Process 4100 continues by taking the first cell of the last edge as drawn, calling it the current cell, and then invoking the appropriate Nearest G function. If no G2L is returned, this means there is no orthogonal G2L over that cell and the Nearest G function is then invoked for the next cell along the last edge. If a G2L is returned, its unknown row or column position is compared with that of the first edge. So long as the G2L returned is before the first edge, this step continues. If a G2L is returned whose row or column position matches or comes after that of the first edge, the Nearest G function is halted for the current cell. All G2Ls discovered in this way are retained in memory for subsequent use.

When the appropriate Nearest G function has been appropriately invoked for all cells along the last edge, the retained collections of G2Ls per cell are divided into regions wherein the collection of G2Ls within any region is constant. Appropriate bookkeeping is performed for all G2Ls that were split by one or more region boundaries.

The output of process 4100 is thus a collection of one or more regions associated with each G2L and for each region a collection of one or more orthogonal G2Ls whose joining with the G2L is semantically possible.

Process 4300 maps for each G2L and for each region produced by process 4100 the collection of orthogonal G2Ls onto the given G2L identifying zero zones (cells not capable of joining with an orthogonal G2L) and locator zones (zones within which locator tuples may exist) and points if they exist where the given G2L needs to split and ultimately defining what are called G3/4s.

Process 4300 begins for each given G2L and for each region r defined in process 4100 and within each "R" for each of the n G2Ls that are each orthogonal to the given G2L and identifies (if it exists) the cell or cells of G2L that intersect the 'arbitrary length segment' or simply segment (possibly several cells thick) defined by each of the orthogonal G2Ls in region R. If the given G2L had only 7 cells and there were only one orthogonal G2L in region r and the orthogonal G2L was 2 cells thick and intersected with the given G2L at cells number 2 and 3 the intersection results would look like the example below:

| Given G2Lcell # | Intersects with segment defined by the orthogonal G2L |
|---|---|
| 1 | No |
| 2 | Yes |
| 3 | Yes |
| 4 | No |
| 5 | No |
| 6 | No |
| 7 | No |

Once the orthogonal G2Ls have been mapped onto the given G2L (thus identifying the cells of the given G2L that intersect with the segments defined by each of the orthogonal G2Ls which cells are called 'intersection cells'), process 4350 uses that information to partition the given G2L where necessary due to the presence of multiple orthogonal G2Ls and to determine which of the given G2Ls' cells belong to its locator zone and which belong to its zero zone.

Process 4350 begins here. Test whether or not the first cell of the G2L is a part of an intersection.

If the first cell of the given G2L is a part of an intersection, it's role is a part of the zero zone of the first partition of the given G2L, partition 1. Each successive cell that is also part of the intersection with the same orthogonal G2L is labeled a zero zone cell. The first cell that is not a part of the intersection with that same orthogonal G2L is labeled the $1^{st}$ locator value cell in partition 1. Once that first locator value cell has been found, the cell prior is assigned the additional attribute "last". From that first locator value cell each successive cell is examined for the presence or absence of an intersecting orthogonal G2L. The next intersection cell in the given G2L is labeled the first cell in the zero zone for partition 2 and the prior cell is assigned the attribute "last locator value partition 1" The process continues until the last cell in the given G2L has been assigned a role.

When all the cells in G2L have been tested, the process will split-build from G2Ls as follows: it will split the given G2L into the discovered number of partitions and cascade changes across shape and cell trackers. For each partition, it instantiates a G3/4 and, for each instantiated G3/4 adds the corresponding partition of the given G2L and the corresponding orthogonal G2L to the list of included G2Ls in the G3/4. Process 4350 is then repeated.

If the first cell of the given G2L is not a part of an intersection its role is a function of whether or not there exists an orthogonal G2L above or to the left of the first edge.

If there is such a non-adjacent but joinable orthogonal G2L the $1^{st}$ cell in the given G2L is labeled a $1^{st}$ locator value cell in partition 1 and each successive cell up to the first cell that contains an intersection with an orthogonal G2L is labeled as a "locator value cell of partition 1". The first cell that contains an intersection with an orthogonal G2L is labeled the $1^{st}$ cell in the zero zone of partition 2. The process continues until the last cell in the given G2L has been assigned a role. Repeat the split-building from G2Ls and then repeat process 4350.

If there is not such a non-adjacent but joinable orthogonal G2L the $1^{st}$ cell in the given G2L is labeled a zero cell in partition 1 and each successive cell that has no intersection is also labeled as a part of the zero zone for partition 1. In addition, the first sequence of intersection-bearing cells is also labeled as a part of the same zero zone for partition 1. After the first cell in the zero zone for partition 1 has been found, the first cell that is not a part of the intersection with that same orthogonal G2L is labeled the $1^{st}$ locator value cell in partition 1. Once that first locator value cell has been found, the cell prior is assigned the additional attribute "last". From that first locator value cell each successive cell is examined for the presence or absence of an intersecting orthogonal G2L. The next cell in the given G2L that defines an intersection with an orthogonal G2L is labeled the first cell in the zero zone for partition 2 and the prior cell is assigned the attribute last locator value partition 1. Look for example at the following table as a continuation of the example above.

| Given G2L cell # | Intersects with an orthogonal G2L | Role_partition (p) |
| --- | --- | --- |
| 1 | No | Zero zone p1 |
| 2 | Yes | Zero zone p1 |
| 3 | Yes | Last cell zero zone p1 |
| 4 | No | $1^{st}$ locator value in p1 |
| 5 | No | Middle locator value p1 |
| 6 | No | Middle locator value p1 |
| 7 | No | End locator value p1 |

The process continues until the last cell in the given G2L has been assigned a role. Repeat the split-building from G2Ls and then repeat process 4350.

When all G2Ls have been processed in processes 4100, 4300 and 4350, Process 4500 identifies, relative to each G3/4, contents within the range of locations defined by the G3/4 as well as cell locations that are logically undefined relative to the G3/4.

Process 4500 begins for each given G3/4 composed of both vertical and horizontal G2Ls. For every cell within the region R defined by the cross product of the slices across in each of the G2Ls that make up the given G3/4, it gets the id of every group whose most probable schema role is content whether G0 or G2 that has at least one cell within region r and adds that id to the G3/4 shape tracker and the appropriate cell tracker. Then it identifies every cell in region r that contains a group whose most probable schema role is locator and adds the cell_id for each identified cell to the list of not-applicable locations in the logical schema associated with the given G3/4. Process 4500 then repeats for G3/4s composed of only one vertical or one horizontal G2L. When all G3/4s have been processed, process 4700 is executed.

Process 4700 begins by testing whether there are any remaining content groups that are not yet associated with a G3/4. If there are not, Phase 4 sub-phase one processing is complete. If there are then for each such content group (i.e., groups whose most probable schema role is C), and beginning with either the left or the top edge and moving along each edge from the first cell to the last cell, Invoke the appropriate Nearest G function.

If no G2Ls are returned by the Nearest G function or if the number of G2Ls returned is above some user threshold as indicative of an interpretation problem stop process 4700 relative to the given C group and make available the range of cells, their contents and history of assigned shapes to a user. Then continue to the next remaining C group. If more than one but less than the threshold number of G2Ls is returned for both edges of the content instantiate a G3/4 with the appropriate Gs.

When there are no remaining content groups process 4700 is complete.

Figure 16:
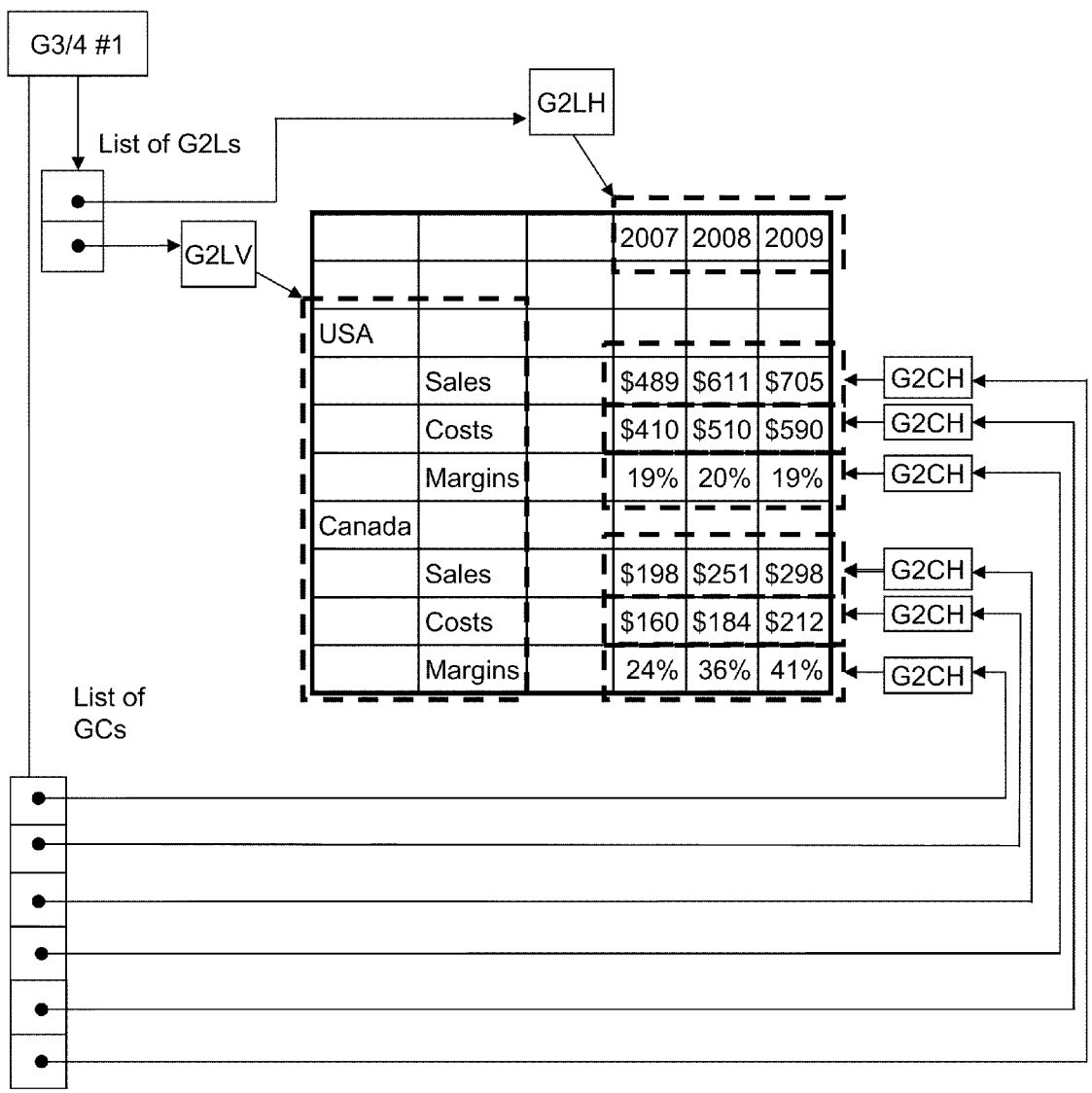
FIG. 16 illustrates the representative spreadsheet of data introduced in FIG. 2 overlaid with cell boundaries corresponding to the instantiated third intermediate representation and their incorporation into an instance of the instantiated fourth intermediate representation as produced by phase four according to one embodiment of the present invention.

FIG. 16 illustrates the example grid of FIG. 14 after a single G3/4 (G3/4#1) has been created from the set of two G2Ls and the 6 G2CH shapes. The compound geometric type ranges may have irregularities, and are now ready for additional geometric type resolution provided by phase 5 to remove these irregularities.

The purpose of phase 5 processing is to test for and where discovered correct for misalignment between the G2Ls and the G2Cs that were joined to form G3/4s in process 4000. There are two kinds of alignments and therefore possible misalignments between G2Ls and G2Cs. The beginnings and endings ($1^{st}$ slice and last slice relative to the G2L) of the G2L and G2C in a G3/4 need to align meaning, specifically, that their beginnings and endings share the same row or column (depending on orientation). The purpose of process 5100 is to test for and correct such misalignments of beginning and ending. Additionally the border between a G2L and the one or more G2Cs or G0Cs that are adjacent to it within the G3/4 need to align, meaning, specifically, that the position of the cell boundary that divides the G2L and the adjacent C needs to be the same across all slices of the G2L. The purpose of process 5300 is to test for and correct such border misalignments. The reason why misalignments need to be tested for and corrected is that they indicate a lack of homogeneity within the G3/4 whose proper conversion into a collection of logical schema tuples depends on having discovered all those cells that can be converted using the same mapping of logical types to physical locations in the grid and then to describe the specific mappings for those cells that appear as irregularities relative to those cells that can be treated as homogeneously organized.

Figure 17:
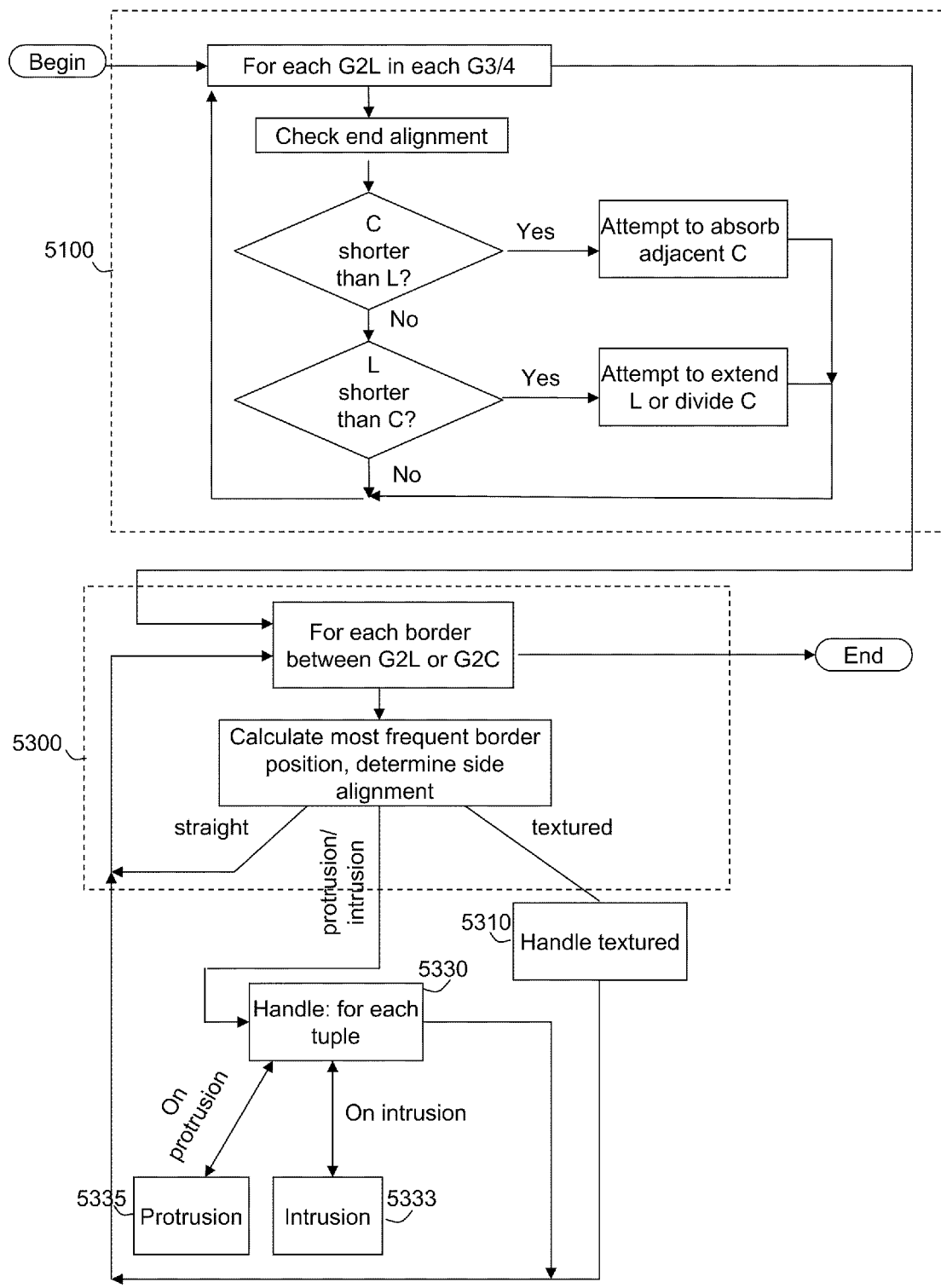
FIG. 17 is a block-level functional diagram of the processes of phase 5 according to one embodiment of the present invention.
Figure 18:
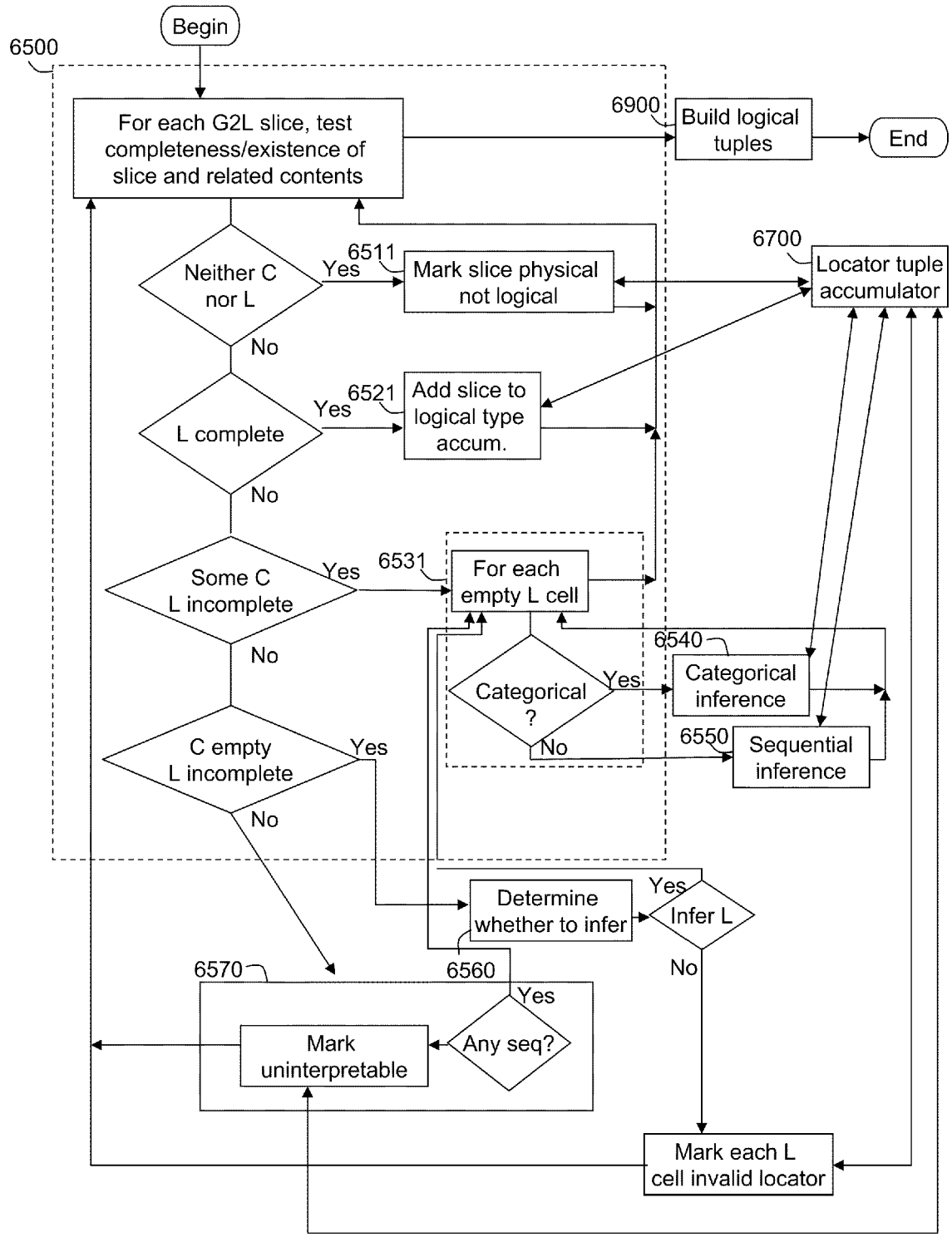
FIG. 18 is a block-level functional diagram of the processes of phase 6 according to one embodiment of the present invention.

FIG. 17 depicts a block functional diagram of the processes of phase 5. The results of process 5100 are input to process 5300 which transforms G3/4s based on slice-by-slice border relationships between L and C components.

In other embodiments of the invention where tuples (albeit rough ones) are created earlier in the process, and thus where very small tuple structures are coalesced into larger ones, there would not occur processes such as those described above in phase 4 or here in phase 5 that attempt to first discover larger mostly homogeneous structures (phase 4) and then ferret out the irregularities (phase 5).

Process 5100 provides beginning-ending alignment testing and resolution. For each G3/4 and within each G3/4 for each G2L (V or H or both) the process performs a begin-end alignment test (BEAT) by first testing whether the beginning and ending of the G2L is aligned with the beginning and ending (i.e., endpoints) of the associated one or more GC. If the endpoints are aligned and there is another G2L in the G3/4 then the BEAT is repeated for that G2L as well. If they are aligned, the next G3/4 is gotten and tested.

If all the G2Ls in every G3/4 are aligned G0 to process 5300

Else, for every G2L whose endpoints are found to not be aligned with the endpoints of its associated G2C, if the shorter G2 is a C, test if the C can be extended using the rule that the C, here called C1, can be extended if there is another C (G2C or G0C), say C2, adjacent to both C1 and the G2L and C1 and C2 do not have different orientations. If C1 can be extended, add C1 to the G3/4 and repeat the BEAT. If the shorter G2 is a G2L, test if the G2L (call it G2L1) can be extended using the rule that a G2L1 can be extended to include a new L (of G2 or G0 form) if the new L and the existing G2L1 can find a common extended signature can be found for the new L and the existing G2L1 across all of the rows or columns that would result from their joining. If G2L1 can be extended, add the new L to G2L1 and modify the definition of the G3/4 accordingly making sure to cascade changes appropriately and repeat the BEAT. If there is an additional L but G2L1 can not be extended, split the G3/4 at the end of G2L1 (and cascade changes). If there is no additional L, and the cells that require L values to preserve alignment with the GC are occupied and not interpretable as L cells, mark the rows or columns of the missing L values as uninterpreted. If the cells that require L values are empty, add dummy locator values for the missing Ls. When all G2Ls across all G3/4s have been tested by the BEAT and processed where necessary in process 5100, process 5100 ends.

Process 5300 tests for border misalignments within every G3/4 between the G3/4s one or two contained G2Ls and for each contained G2L its adjacent GCs. Depending on the outcome of process 5300 either of processes 5310 or 5330 is invoked.

For every G3/4 and within each one for each border shared with a GC calculate the position of the most frequently occurring vertical or horizontal border between the G2L and the 1 or more GC. If the count of most frequently occurring border positions is greater than 1 OR IF the count of border positions not equal to the mode is greater than or equal to some user defined threshold called "Userthreshold" generally around one fourth of the total number of slices in the G2L Go to process 5310, else if there is one most frequently occurring border position and the count of slice-specific border positions not equal to the border position of the most frequently occurring border position is greater than zero and less than "Userthreshold" Go to process 5330.

Both processes 5310 and 5330 described below specify a set of conditions recognizable from within the G3/4 as a whole where each condition represents an irregularity that needs to be resolved. Then, for each recognizable condition, one or more modifications are specified whose implementation serves to resolve the identified irregularity. Both for processes 5310 and 5330 and for each kind of recognizable condition, if the border irregularity does not match any known patterns, the cells that make up the border region are marked as uninterpreted with respect to the G3/4 within which the cells are located.

Recall that it is also the aim of certain embodiments to allow for users to assign interpretations to ranges of cells for which the interpretation system has no current interpretation—or one where the user wishes to over ride the systems current interpretation—but is capable of learning one and appropriately applying that learning to new and unanticipated cases.

When the number of slice-specific border positions that vary across the border between a G2L and its adjacent GCs is equal to or above Userthreshold, that border may be called textured and is smoothed with process 5310 described below.

Process 5310 examines both the characteristics of the entire border between the current G2L and the adjacent GC or GCs and the characteristics of each slice-specific border. Process 5310 looks to see whether the range of cells that defines the texture (i.e., those cells that lie between the minimum and maximum length across the collection of the G2L slices) aligns with locator values in the orthogonal locator of the G3/4 or not. It also looks to see whether the textured part of the border can be removed from the current G2L without impacting the distinctness of each of the G2L slices.

Test 1: whether there exists a locator value that is a part of the locator zone of a G2L orthogonal to the given G2L and within the same G3/4 that is either above (if the given G2L is vertical) or to the left (if the given G2L is horizontal) of the textured border cell(s)

Test 2: whether the cells that make up the textured border are required for the current G2L's non empty slices to each be unique Test 3: whether the protruding cells in the textured border are required for the current G2Ls non-empty slices to each be unique The recognizable cases and their associated resolutions are now stated

| Recognizable case | Resolution |
| --- | --- |
| Test 1 is no and Test 2 is no | Remove border And report un-interpreted border |
| Test 1 is yes Test 2 is no | Remove border protrusions, mark as not applicable and report as un-interpreted border |
| Test 3 is yes | Keep G2L border to include outer (protrusions) If there is a conflicting ortho locator, mark the locator protrusion cells as not applicable and report Otherwise, if not empty recast as attributes of G2l slice |

Process 5330 examines each slice-specific border. For each such border, if the border position is equal to the most frequently occurring position the next slice, if any remain, is obtained. If the count of cells in the G2L slice is greater than the count of cells for those slices whose border position equals that of the most frequently occurring border position, process 5333 is invoked on that slice. If the count of cells in the G2L slice is less than the count of cells for those slices whose border position equals that of the most frequently occurring border position, process 5335 is invoked on that slice.

Process 5333 handles what might be called "protrusion cases" where the current G2L slice is seen to protrude into the GC. When this is the case, and on a per slice basis, the following tests are made by process 5333, the binary outcome of which determines both the recognized condition and the resolution to be taken.

The first test is whether there exists a locator value that is a part of the locator zone of an G2L orthogonal to the given G2L and within the same G3/4 that is either above (if the given G2L is vertical) or to the left (if the given G2L is horizontal) of the protruding cell(s).

The second test is whether the value(s) in the protrusion is or are required to distinguish the current G2L slice from the other non-empty slices in the current G2L.

The third through seventh tests test for each of five different cases for the presence or absence of data in particular regions of the G3/4. Specifically the presence of content is tested for a) if the current G2L is vertical by the $1^{st}$ condition in each of the following tests and b) if the current G2L is horizontal by the $2^{nd}$ condition in each test; the tests being (third test) straight above the protrusion, or straight left of the protrusion; (fourth test) straight below the protrusion, or straight right of the protrusion; (fifth test) above and to the right of the protrusion, or below and to the left of the protrusion, (sixth test) below and to the right of the protrusion for both cases; and (seventh test) straight across from the protrusion or straight down from the protrusion.

The recognizable cases and their associated resolutions are now stated:

| Recognizable case | Associated resolution |
|---|---|
| Test 1 is yes AND<br>Test 2 is no AND<br>Test 3 or 4 is yes<br>Tests 5, 6 and 7 are all three yes | Remove the protrusion from the current G2L<br>Reinterpret the protrusion as a separate GL orthogonal to current G2L<br>Remove the Left or Above locator value (depending on orientation) from the orthogonal G2L<br>Instantiate 2 new G3/4 defined in terms of the reinterpreted protrusion as a GL |
| Test 1 is no AND<br>Test 2 is no<br>Test 3 is no AND<br>Test 4 is no | Remove from current G2L<br>Reinterpret as G12C of rest of tuple |
| Test 1 is yes AND<br>Test 2 is no<br>Test 3 or Test 4 is yes<br>Test 5 or test 6 is yes<br>Test 7 is no | Remove from current G2L<br>Reinterpret as G1/2C of rest of tuple<br>Interpret rest of tuple AS locator Name<br>Split G3/4 iff G2L above not equal G2L below protrusion |
| Test 1 is yes AND<br>Test 2 is no<br>Test 3 or Test 4 is no<br>Test 5 and Test 6 and Test 7 is yes | Try to reinterpret protrusion as content<br>If Fail: Reinterpret AS G1/2C of rest of tuple<br>AND Label cell as N/A in HMschema |
| Test 1 is no AND<br>Test 2 is yes | Keep in current G2L |
| Test 1 is yes AND<br>Test 2 is yes | Remove location defined at intersection of current tuple AND ortho locator value AS Not applicable in HMschema |
| Test 1 is yes<br>Test 2 is no<br>Test 3 AND Test 4 is yes | If protruding cell can be recast AS content<br>Remove it from current G2L And Reinterpret it AS content<br>Else mark interpretation problem for the G2L slice, the protrusion and the locator value of the orthogonal G2L above or to the left of the protrusion |
| Test 1 is yes AND<br>Test 2 is no<br>Test 3 and Test 4 is yes<br>Test 5 is yes AND<br>Test 6 is no | Remove the protrusion from current G2L<br>and remove current tuple from G2L<br>Reinterpret AS G1/2L orthogonal to current G2L<br>split G3/4 into 2 schemas:<br>G3/4 1 = G2L above protrusion and full ortho G2L<br>G3/4 2 = G2L below protrusion and protrusion |

Process 5335 handles what might be called "intrusion cases" where the current G2L slice is seen to be intruded into by the GC. When this is the case, and on a per slice basis, the following tests are made by process 5335, the binary outcome of which determines both the recognized condition and the resolution to be taken.

Test 1: Are the intruding cells empty?
Test 2: Are the non-empty slices of the current G2L unique without recasting the intruding cells as part of the G2L?
Test 3: Does the line of content cells that includes the intrusion define a sequence?
Test 4: Is the line of content cells that extends straight out from the intrusion empty?
Test 5: Is the content sparse as relates to the G3/4 as a whole?

The recognizable cases and their associated resolutions are now stated:

| Recognizable case | Resolution |
|---|---|
| Test 1 is yes | Remove from current G2C<br>Reinterpret AS G1/2L<br>Append to the G1 that aligns with the G1s of the other cells in the slice. If the G1s do not align then append to the top G1 |
| Test 2 is no<br>Test 3 is no | Recast cell as part of the G1 that aligns with the G1s of the other cells in the slice. If the G1s do not align then align with top or bottom G1 that has the closest signature. If neither has closest append to top |
| Test 3 is yes | Recast cell as singleton<br>Recast content line minus singleton AS G1/2 locator<br>Split G3/4 above new G1/2 locator |
| Test 4 is yes AND<br>Test 5 is no | Recast cell as attribute of locator tuple OR singleton |
| Test 2 is yes<br>Test 3 is no<br>Test 4 is no | Recast cell as attribute of locator tuple or singleton |

The purpose of phase 6 is to further homogenize the G2Ls of each G3/4 by testing for heterogeneity of logical signatures across slices of G2Ls and when found either resolving them or splitting the G2L and associated G3/4, and G1s Process 6000 begins by determining for each G3/4 and within each G3/4 for each G2L structure and within each G2L structure for each slice and within each slice for each cell 'c', whether the logical signature of the G0 or G1 in the current cell 'c' is constant across all slices. If the logical signature is not constant, then for each cell border between which a change in logical signature (i.e., type or collection of types assigned to the G in the cell) takes place across slices, the process then tests if the distinct logical signatures share a common extended logical signature. If the two logical signatures do share a common extended logical signature as would be determined by querying the catalog for the collection of types "CoT" relative to which each of the logical signatures appears as a unit and then taking the intersection of those two collections to determine if both of the two distinct logical signatures appear as units of a common type, then each of the two distinct logical signatures is recast as the unit of the nearest type for which they are both units where by nearest is meant appears the soonest in the CoT. If there is a next cell "c", process 6000 is then repeated, otherwise process 6500 is started.

If the two logical signatures are distinct but do not share a common extended signature, then for each cell border between which a change in logical signature takes place, split G2 at the signature change line (and make the appropriate edits to the G3/4, G2 and G1 shapes). If there is a next cell "c", process 6000 is then repeated, otherwise process 6500 is started.

The purpose of processes 6500-6700 is to convert the G2Ls that are contained in each G3/4 into homogeneous collections of logical locator tuples. Towards that end, the collection of processes interprets missing values of G2Ls based on sparsity patterns within the G2L and the associated GC as well as based on the kind of type or types whose value or values are missing. Moreover, valid slices in a G2L need not denote logical tuples—they may just represent grid layout styles.

Process 6500 begins by calculating the Lscore for each G2L. Lscores will also be recomputed as empty G2L values are inferred. Well formed G2Ls have an Lscore of 1.

Process 6500 tests each G2L slice and its associated content for sparsity and data type patterns and based on that routes the G2L slice to another phase 6 process for further processing. For each G3/4 and within each G3/4 for each G2L structure and within each G2L structure for each slice 's', it tests whether there are any empty cells in the current slice 's' and tests whether there is any data in the vector of contents adjacent to the current slice 's' of G3/4.

If both the G2L slice and the content vector are empty, then go to step (6511). Mark the slice number of the G2L as invalid logical locator tuple and send the slice information to process 6700. (step (6511))

If the G2L slice is complete, then (step (6521)).

Mark the slice as valid present input logical locator tuple and send the information to process 6700, (end step (6521)).

If the G2L slice has some filled and some empty cells and the content vector is non-empty then get the count of empty GL cells in the G2L slice. If the count of empty GL cells in the G2L slice is one then go to step (6531).

(Begin step (6531)). Test whether the units of the empty GL are categorical or sequential. If the units of the GL are categorical then go to process 6540. Otherwise, if the units of the GL are sequential, go to process 6550 (End step (6531)).

If, however, the count of empty GL cells in the G2L slice is greater than one, then go to step (6532).

(Begin step (6532)) Create a storage mechanism for the G2L slice. Then for each GL in the slice that is empty go to step (6531) (End step (6532))

If the G2L slice has some filled and some empty cells and the content vector is empty, then go to process 6560. Otherwise, go to process 6570.

The purpose of process 6540 is to infer values for each empty GL cell in a given G2L slice when the units of the cell are categorical and the associated content vector is not empty and thus the slice needs to function as a logical locator.

Process 6540: If the first G2L slice is filled for the G1L that was found to be missing in process 6500 and determined to be categorical in step (6531) then infer that the empty GL cell within the G2L slice is assigned the same value as the value of the nearest filled cell above. Mark the GL cell within the slice as a valid inferred value of a logical locator tuple and send the information to process 6700. This is the case by which, in FIG. 19, logical tuple 1 through 9 are given an inferred value of "USA", which is depicted in italics for the inference, and logical tuples 10 through 18 are given an inferred value of "Canada".

If the first G2L slice is empty for the G1L that was found to be missing in process 6500 and determined to be categorical in step (6531) then test whether the last G2L slice is filled for that same G1L. If the last slice is filled, infer that the empty GL cell within the G2L slice is assigned the same value as the value of the nearest filled cell below. Mark the GL cell within the slice as valid inferred value of a logical locator tuple and send the information to process 6700.

If neither the first nor the last cell is filled then perform the "middle interpretation strategy" which looks for more subtle clues as to how best to infer missing G1L values of the kind given to process 6540.

The "middle interpretation strategy" looks for visual and repeating tuple clues tests first in a test called "T1" whether there exist any merged cells in the G1L (call them G1Lc) within which the empty G1L cell is located, such that each unique value in the G1L occurs once per merged cell range. If T1 is positive, then infer that the value of the missing cell in the G2L slice is assigned the same value as the value in the containing merged cell. If the T1 is negative, then perform a second test T2 to determine whether there are any visual content (e.g., format, color, etc.) G1s that divide G1Lc into slices such that each unique value in G1Lc occurs once per value of the format G1.

If T2 is positive, then infer that the missing value of the G1Lc is the same value as the filled cell within the containing G1 format shape. Mark the GL cell within the slice as valid inferred value of a logical locator tuple and send the information to process 6700. Otherwise, if T2 is negative, get the count C of G1s in the G2L whose values are present across all slices in the G2L for which the slices orthogonal content vector is not empty (step (6546)). If the count C is >=1, perform a third test T3 to determine whether the tuples formed from the union of the dense G1s repeat.

If T3 is positive, then by dividing the G2L into slice ranges "SR" wherein within each slice there are no repeating tuples formed from the dense slices taken above test in a fourth test T4 whether there is then a 1-1 correspondence between slice ranges SR and present values of the current G1. If the result of T4 is yes, infer that empty cells are assigned the same value as the filled cell within the containing dense slice range SR Then mark the GL cell within the slice as valid inferred value of a logical locator tuple and send the information to process 6700.

If the result of T4 is no, perform test T5 to determine whether the cells in the content vectors orthogonal to the collection of G2L slices that contains a missing GL value for the row or column of the GL that was found to be missing in process 6500—not just the present one given—contain any aggregation formulas whose ranges of input cells corresponds to G2L slices that are filled for those G1Ls that are empty in the current slice. If T5 is yes, infer that the empty cell for the GL whose value was found to be missing in process 6500 is an invalid locator value in a logical locator tuple and any filled cells are a probable name for an aggregate content value and send the information to process 6700. If T5 is no, perform a test, T6 to determine whether there are any formulas in the in the content vector orthogonal to the given G2L slice. If T6 is yes, infer that the empty cell for the GL whose value was found to be missing in process 6500 is an invalid locator value in a logical locator tuple and any filled cells are a probable name for a derived content value and send the information to process 6700. If T6 is no, mark the empty cell for the GL whose value was found to be missing in process 6500 as "uninterpreted" and send the information to process 6700.

The purpose of Process 6550 is to infer missing values for a GL cell when its units are sequential. Process 6550 invokes the following formula to infer the values of missing sequential G1Ls.

Let
- x0=Value of nearest present "before range" cell
- x1=Value of nearest present "after range" cell
- c=count of empty cells in range that are associated with non empty contents
- v=Value of nearest present cell before range of empty cells
- d=distance from cell being inferred to first empty cell in the range (when same cell, distance is 0)

The inferred value of empty cell associated with non empty contents is calculated by the formula $v+(d*(x1-x0)/(c+1))$.

Mark the GL cell within the slice as valid inferred value of a logical locator tuple and send the information to process 6700.

The purpose of process 6560 is to determine whether empty G1 values in a G2L slice whose orthogonal content vector is also empty are logically missing and thus an inference routine should be run to fill them or whether the empty G1 values serve no semantic purpose and should be left blank.

Process 6560 begins by performing the following 3 tests called T1, T2 and T3 respectively on the current G2L slice of the current G3/4. T1 tests if the count of empty content vectors orthogonal to G2L slices that have the same pattern of filled and empty cells within the G2L structure as a whole as the current G2L slice is greater than zero; T2 determines whether filled L cells in the current slice match known content names; T3 determines whether filled L cells match other slices with present content and inferred L value.

If T1 is yes and T3 is yes then go to process 6500 step 6531. If T1 is no or T2 is yes or T3 is no, mark the empty GL value as an invalid locator value and send the information to process 6700. Otherwise mark each empty cell in the G2L slice as uninterpreted and send the information to process 6700.

The purpose of process 6570 is to test for G2L slices that were completely empty but whose orthogonal content vector is not empty, whether there is a basis for inferring values for the missing cells in the slice.

Process 6570 test for the presence of G1Ls in the G2L whose units are sequential. If the test is positive then go to step (6531). Otherwise, mark the slice as uninterpreted and send the information to process 6700.

Process 6700 tracks and accumulates the physical slice and type value interpretations as generated by phase 4. Each time one of its processes generates an interpretation for a physical slice of a G2L, it sends the physical slice number within the G2 and set of corresponding type values (if any) to process 6700 for tracking and accumulation. Process 6700 maintains, for each G2 being processed by one of these processes, a mapping of slice numbers to set of corresponding type values (if any) along with information indicating whether that value was represented in the cell or was inferred by an inference process. It also maintains, for each set of corresponding type values, a mapping to the slice number for which the set of type values was obtained. When a slice number and optional set of type values are given to process 6700 for a G2, it first adds the slice number to the set of slice numbers being mapped for the G2 and then if there is a set of type values adds the set of values to the set of value sets being mapped for that G2, it adds a mapping from the slice number to the value set and adds a mapping from the type value set to the slice number.

Process 6900 is invoked once per G3/4 after all G2L slices for that G3/4 have been processed by process 6500. The purpose of process 6900 is to combine information about each G2L's set type values with the corresponding cells in the associated G2Cs to create a complete set of logical tuples for the G3/4.

Figure 19:
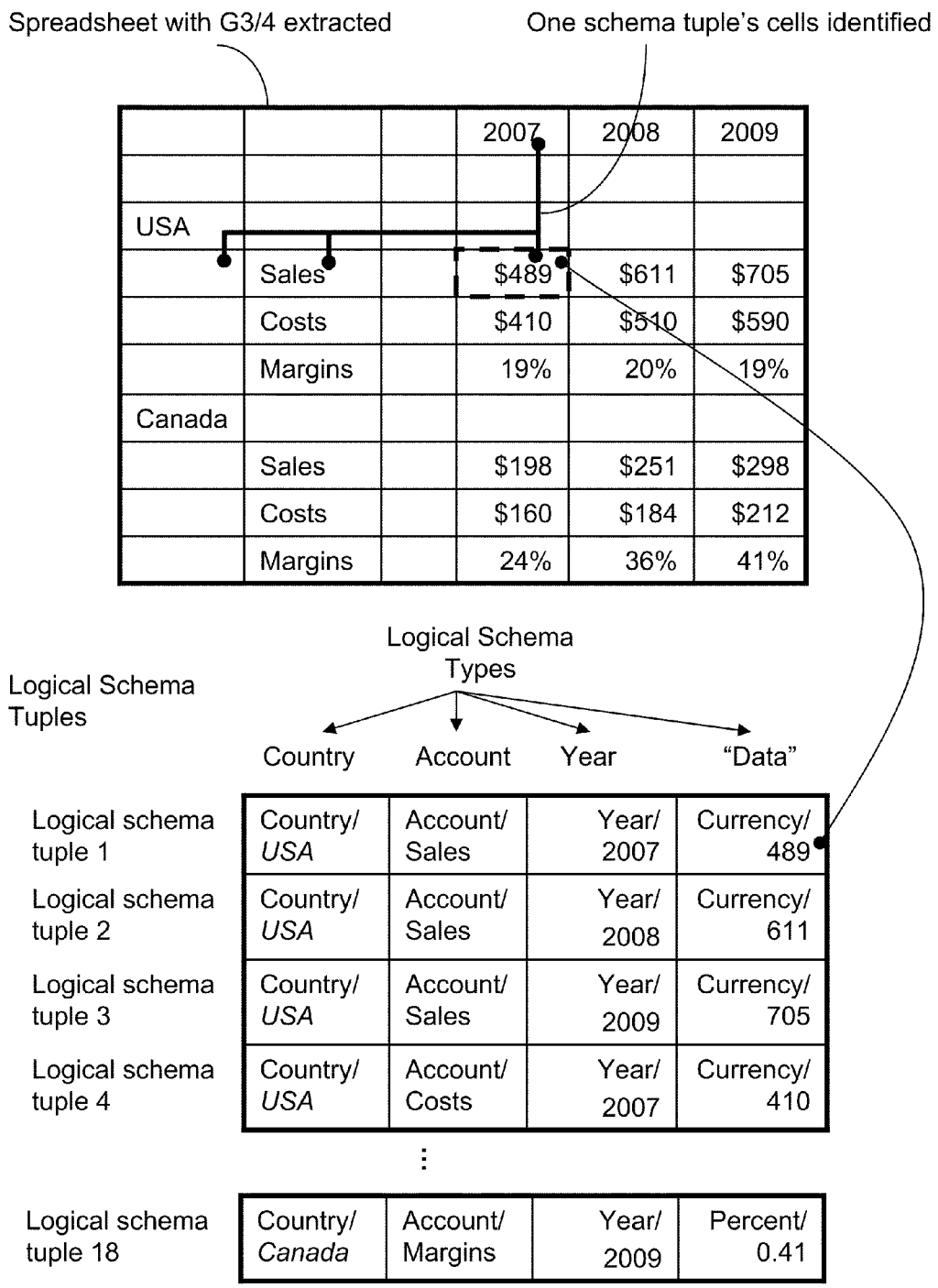
FIG. 19 illustrates the representative spreadsheet of data introduced in FIG. 2 along with a representation of the logical tuples extracted by phase 6 according to one embodiment of the present invention.

Process 6900 proceeds as follows: For a G3/4, either one or two G2s will have had corresponding slices and type value combinations accumulated and mapped by process 6700. If there was only one such G2, then for each type value set, a logical tuple is constructed with one slot for each type in the type value set and one additional slot that is assigned a system built-in type of "Data" which has as a valid unit every other unit which could be available as the content of some location. The logical tuple's value for that type is initialized to indicate that it is empty of any data value. FIG. 19 shows a logical schema with types defined (based on the types found in the G3/4 of the sample spreadsheet) of "Country", "Account", "Year", and "Data". Each slot corresponding to a type in the type value set has its type set to the corresponding type of the type value set and its value set to the corresponding value of the type value set. The slice number is retrieved for the type value set. The G2C of the G3/4 that contains that slice is accessed. The cell ordinal of the G2C in the direction orthogonal to the direction of the G3/4 slice is combined with the cell ordinal along the direction of the G2L corresponding to the slice number to which the type value set maps. The cell described by the intersection of these two cell ordinals is examined. If it contains a data value, the logical tuple's additional slot's value is set to this value and its type is set to the type of the G2C.

If however, there are two G2Ls mapped for the G3/4, then for each combination of type value sets of the G2s as generated by process 6700, a logical tuple is initialized with the one slot for each type in the combination of type value sets, and one additional slot that is initialized to indicate it is empty of any data value. The orthogonal cell ordinals corresponding to the slice numbers to which each type value set maps are combined into a single cell identifier. The G3/4 content applicability accumulator is accessed for that cell identifier to determine if content is applicable for that combination of locators. If so, the cell described by the intersection of these two cell ordinals is examined, and if it contains a data value, the logical tuple's "data" slot type is set to the type of the G2C containing the cell, and the "data" slot's value is set to the value of the cell. If, however, content is not applicable to that combination of locators, then the logical tuple's "data" slot is set to indicate that data is not applicable within it.

For each G3/4, the output of phase 6 is 1) a description of the logical schema of which the raw gridded data is a physical representation 2) a specification of every locator tuple in the G3/4 (whether horizontal or vertical or both), 3) a mapping from every cell in the spreadsheet to its corresponding value in a logical schema tuple, 4) a description of every instance of that schema represented in the G3/4, 5) for every logical location specified in the logical schema either the content value found in the corresponding cell of the G3/4 (called the cell's semantic value) or a description of the logical state of the cell such as missing or not applicable and 6) for every cell in the G3/4 that was a part of a G2L and empty, whether that empty cell was logically missing and its value inferred during processes 6500 and 6700 or whether that empty cell was an invalid locator and thus no inference was made.

This is illustrated in FIG. 19 which shows a G3/4 in a spreadsheet, a representative schema tuple as identified in the G3/4, a representative mapping from a cell in the G3/4 to a semantic value in a logical tuple, the logical schema definition associated with the G3/4, and a sampling of the logical schema tuples extracted from the spreadsheet. In the logical schema tuple 1, a content of 489 Currency units were associated with the values of three locator types: USA for Country, Sales for Account, and 2007 for Year.

The logical schema so created along with its individual tuples is enormously more useful than the atomic tuples contained in the spreadsheet's (or other gridded styles of) raw data. For example, whether the intent is 1) to merge, compare or upload spreadsheet data with or into a database or 2) compare spreadsheets that have different layouts and formats and may use different terminology or 3) query the contents or one or more spreadsheets using a query language with the expressiveness of SQL- or OLAP-style language, only by having converted the atomic tuples into logical schema tuples can this be achieved. This is because the atomic tuples given in the raw spreadsheet provide no concept of logical schema definition or associated tuples that can be queried for or interacted with. From the spreadsheet in its raw atomic tuple form, a person or process is limited to querying for the value of a cell of given coordinates or rank or sort data by values found in rows or columns.

Figure 20:
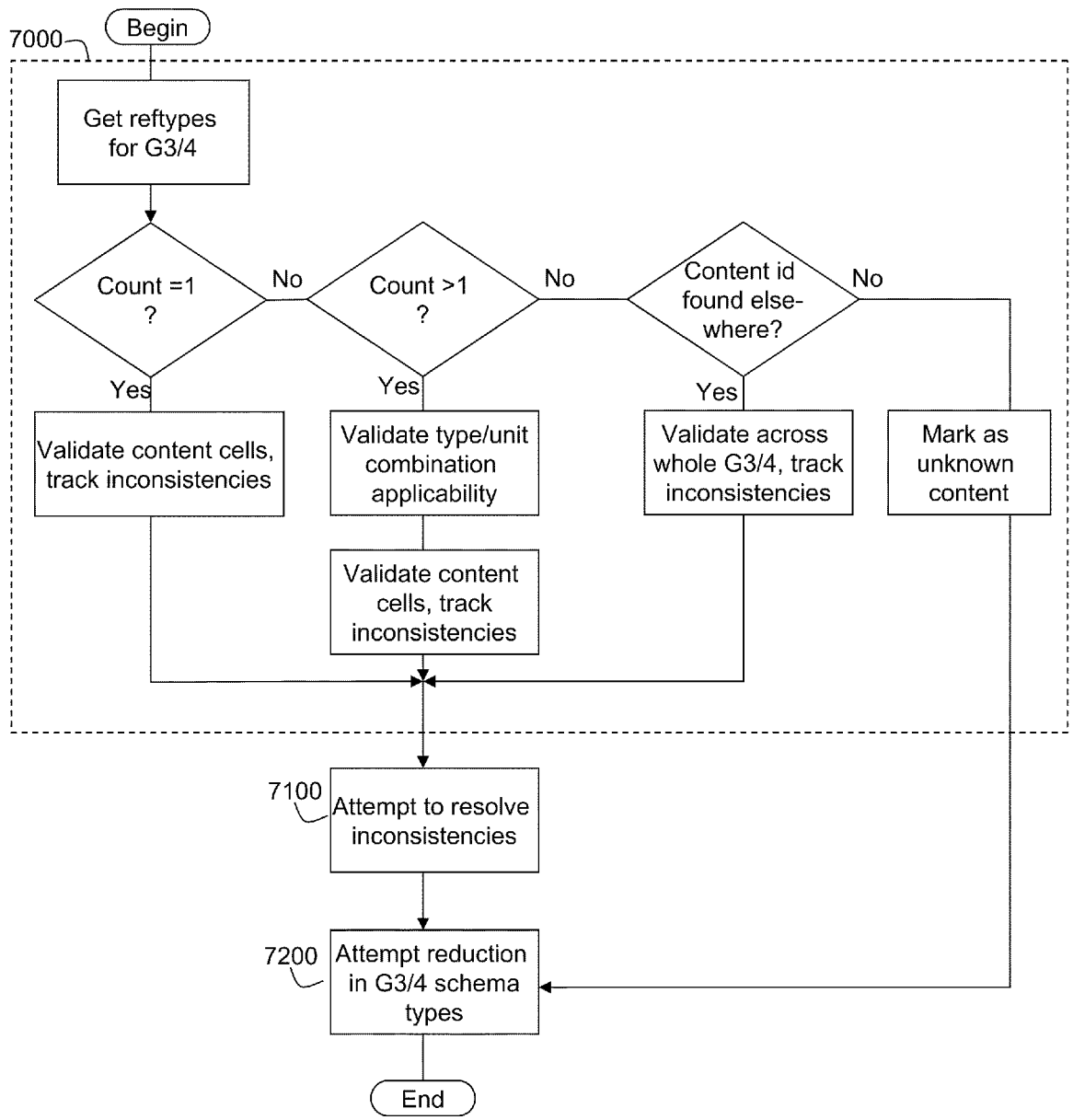
FIG. 20 is a block-level functional diagram of the processes of phase 7 according to one embodiment of the present invention.
Figure 21A:
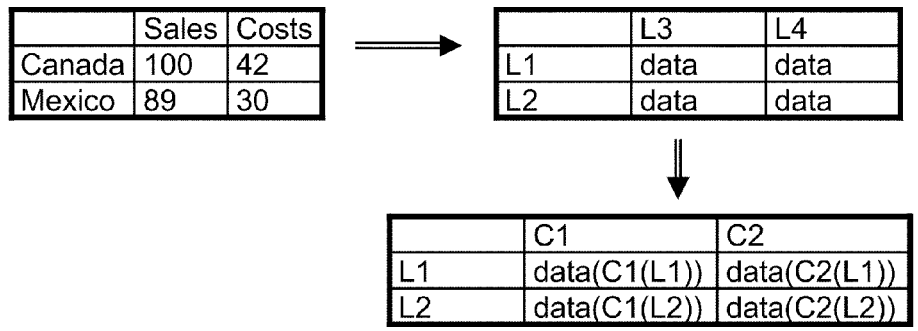
FIGS. 21a-f illustrates configurations of information addressed by phase 7 according to one embodiment of the present invention.
Figure 21B:
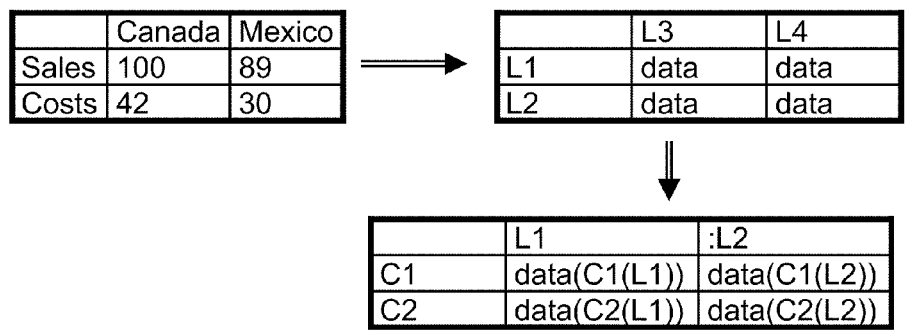
Figure 21C:
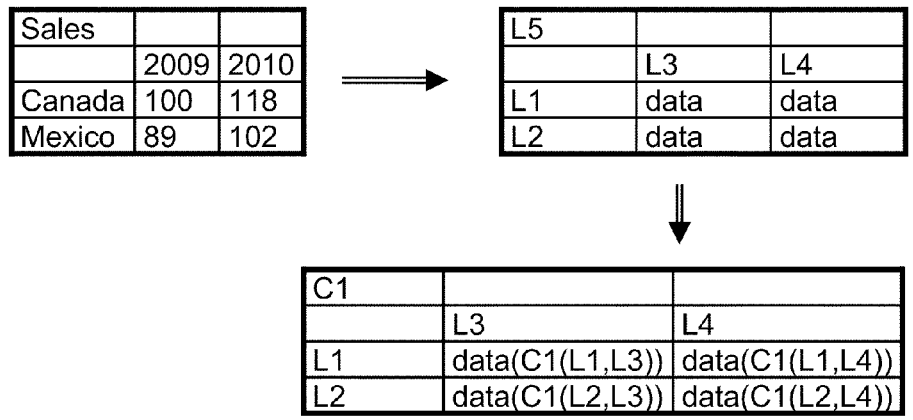
Figure 21D:
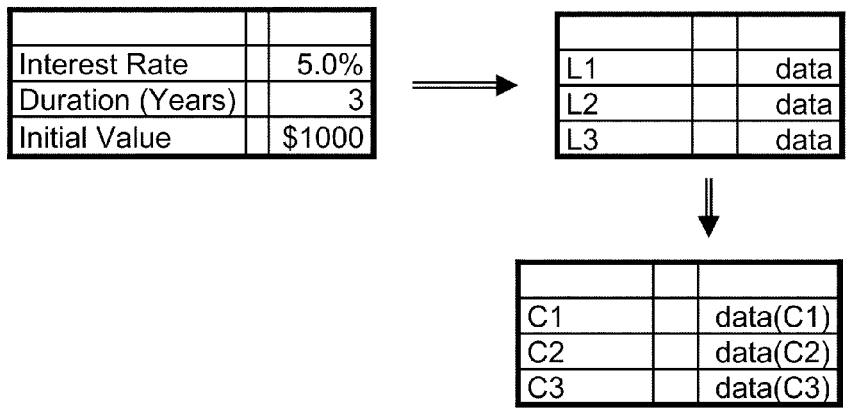
Figure 21E:
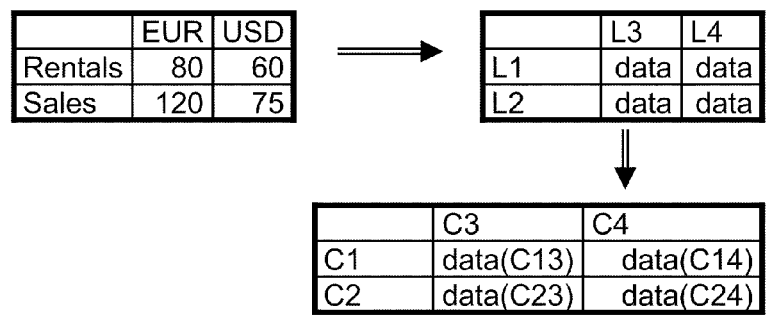
Figure 21F:
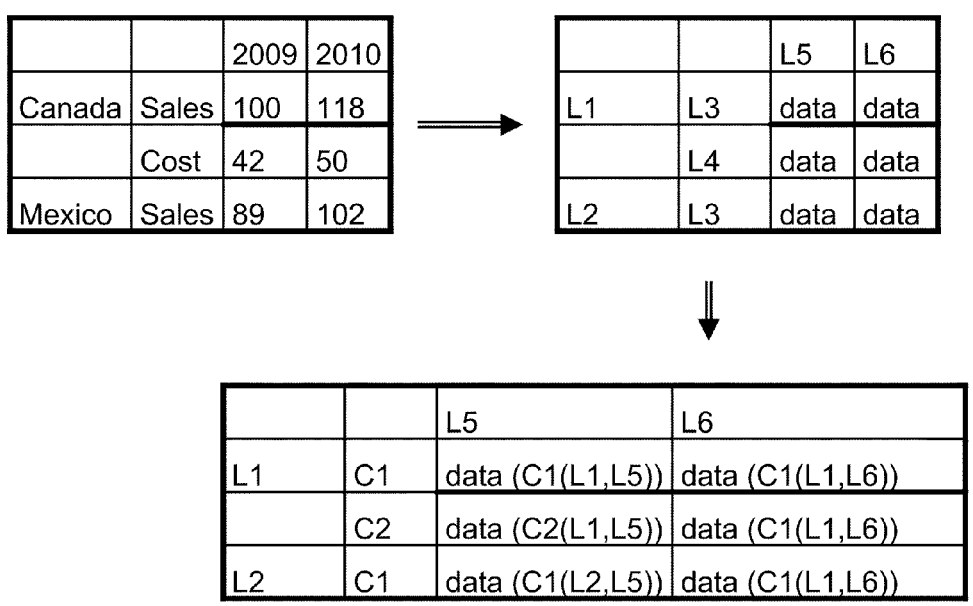

Process 7000 which may be triggered by the end of process 6900 (or as early as during the creation of FHCGs in another embodiment) identifies and links individual content names (or variable or account or measure names) with a specific set of content values where each content value is associated with some location value. Referring to FIG. 20, process 7000 converts HMschemas that have the form shown in FIG. 19 and in the present embodiment were created in processes 6700 and 6900 into HMschemas where the placement of content names is determined as shown for example in FIGS. 21a through 21f where content names are positioned in various relationships to locator names, for example orthogonal to, outside of the grid of, and nested within. Many other forms are possible and will be obvious from the permutations and repetitions of one or more content and/or locator name-type slots in the logical tuples.

The method in process 7000 for identifying content names and associating them with data values is now given:

For each G3/4 and within each G3/4 for each G2L in the G3/4 Get the count "R" of types whose values are the names of other types hereafter called Ref types. When all G2Ls have been processed for a given G3/4, sum the R's. If the sum of the R's=1 then for each value 'v' of 'R', get from the catalog the set of allowable units associated with that value of R (keeping in mind that a value of a Reftype is itself a Content name). Then perform a test called TC which tests for each cell C in each orthogonal content vector associated with V, if the logical signature in C is a member of the set of allowable units of the V. Record for each distinct V the count of cells called IC whose content units were inconsistent with what was allowed by the definition of the content name and if IC is greater than zero, also the cell_id of each inconsistent cell value. For all V's where IC was greater than zero, go to process 7100 and run it on every inconsistent cell.

If the sum of the R's is greater than 1, then for each unique combination of V's called compound Vs or hereafter "CV's" as defined either by 2 or more R's having V's on the same row or the same column or for a row and a column that intersect at a cell, if the count of allowable units in the intersection called "I" of each of the allowable units for all of the V's in the CV=0 stop the interpretation process for that CV and mark the CV as uninterpreted and send that information to the homogeneous schema tuple accumulator for the G3/4. Otherwise, if the count of units in I is greater than 0, treat the set of units in I as the set of allowable units for each cell in the content vector associated with that specific content name (which may only be a single cell). Repeat test TC.

If the sum of the R's=0 then for each of the following distinct zones labeled Zn, taken in some order such as the zero zone of the G3/4, followed by the perimeter of the G3/4, the perimeter of the worksheet, the worksheet tab, the worksheet file name and the worksheet properties, get the count CF of filled cells in the Zn of the G3/4 that are recognized content names. If that count=1 assign that cell value the role of content name for all the contents in the HMschema interpreted for G3/4. If that count >1, treat the collection of content name-containing cells as one compound content name V, Else if that count=0 repeat process using a different Zn If all Zns have been tried and no recognized content names were found, repeat the process looking for any filled cells instead of only cells recognized as content names. Unless there is not even a file name this repetition of the process will find some unrecognized candidate names for the content in the G3/4.

Process 7100 resolves inconsistencies between content names and data. For each pairing of content name and inconsistent values of the associated content vector get the units allowed by the content name and the logical signatures of the content values Add as many dummy content names as there are regions of distinct content within the range of cells associated with a single content name.

Then, for each region of distinct content, if numeric units are associated with the content names and string values are associated with the content values (i.e., data) test if the string values can be interpreted as a string representations of number. If they can, do it and return to process 7000. Else test if the string values can be interpreted As a string reps of attributes of each cell including but not limited to the logical state of the cell such as denoted by terms like "missing", "not applicable" or "invalid" and any other terms that might exist in a table of "logical state terms". If they can, do it and return to process 7000. Otherwise, mark the content name and associated content values in the logical specification of G3/4.x as inconsistent, and send that information to report the interpretation problem and return to process 7000.

If there are categorical units associated with the content names and numeric data associated with content values then test if the numeric content values can be interpreted as numeric representations of categorical units. For example, test if any logical schemas extracted so far contain the same set of numeric tokens as found in the content values where those numbers are listed in a G1 that contains one instance of each number and the numbers listed in the G1 are a superset of the numbers found amongst the content values and where there is associated in a parallel G1a set of strings whose distinct values are one to one correlated with the distinct G1 number values. If such a test is positive, recast the numbers as numeric representations of string data and send for each content value both its numeric representation and its string value to the logical tuple accumulator and return to process 7000. Else mark the content name and associated content values in the logical specification of G3/4.x as inconsistent, and return to process 7000.

The purpose of process 7200 is to try to reduce the number of types in the HMschema specification of the G3/4.

Given a G3/4 and its interpretation as a logical specification of a homogeneous schema, and for each pair of G1Ls within the G3/4, test whether the pair of G1s can be recast as distinct roles in a common logical signature shared across the range of G1s (Step (7201)). For example a G1 with a logical signature of month and a G1 with a logical signature of year could be recast as distinct levels in a common type, "Time" where "Time" was defined as supporting months and years as levels. If the result of running step (7201) is yes, do it. If the count of remaining pairs of G1Ls to analyze is greater than zero, get the next pair of G1Ls and rerun step (7201). Otherwise, go to process 8100.

FIGS. 21a through 21f illustrate some of the variety of patterns of content names that might be found within a logical schema. In each of the cases, the first grid represents a spreadsheet, the second grid represents the logical schema information known as a result of the processing in phase 6 and the third grid represents the additional logical schema information known as a result of performing processes 7000-7200.

The semantically enriched schemas produced by processes 7000-7200 have significantly more utility than the un-enriched logical schemas that were input to process 7000. Whether for humans or machine processes, it is very important to know within a schema what the content names are, what data belongs to each content name and the degree to which the data found is consistent with the definitions associated with the content name. This is because the content names (e.g., Sales, costs, number of defects, customer turnover) typically represent the information of interest. The location structure is an organizing principle for the content and is composed of items that are known in advance. Whether called variables, measures, indicators, accounts or content names, it is these content names that people typically query for, analyze and report on.

Figure 22:
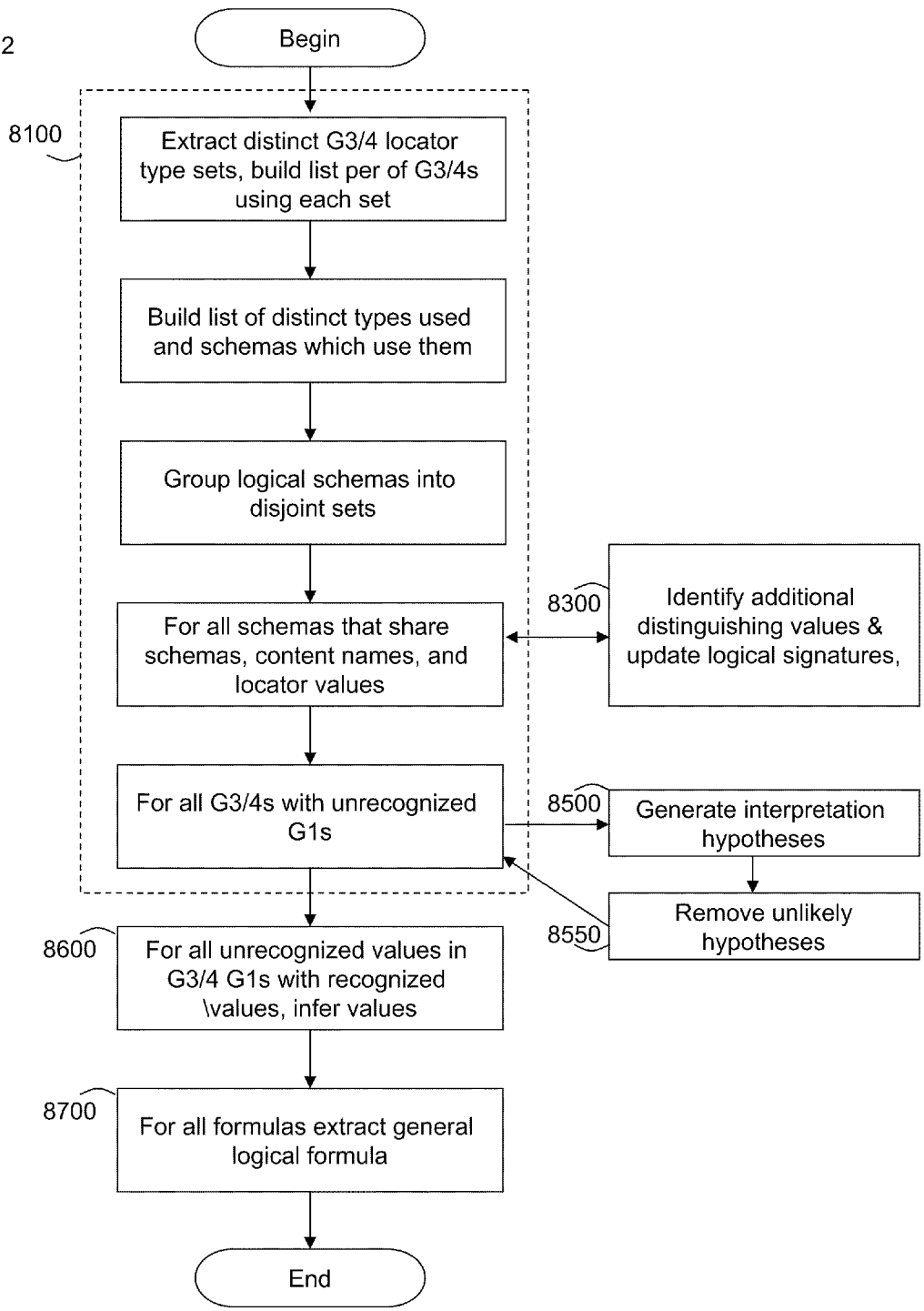
FIG. 22 is a block-level functional diagram of the processes of phase 8 according to one embodiment of the present invention.
Figure 23:
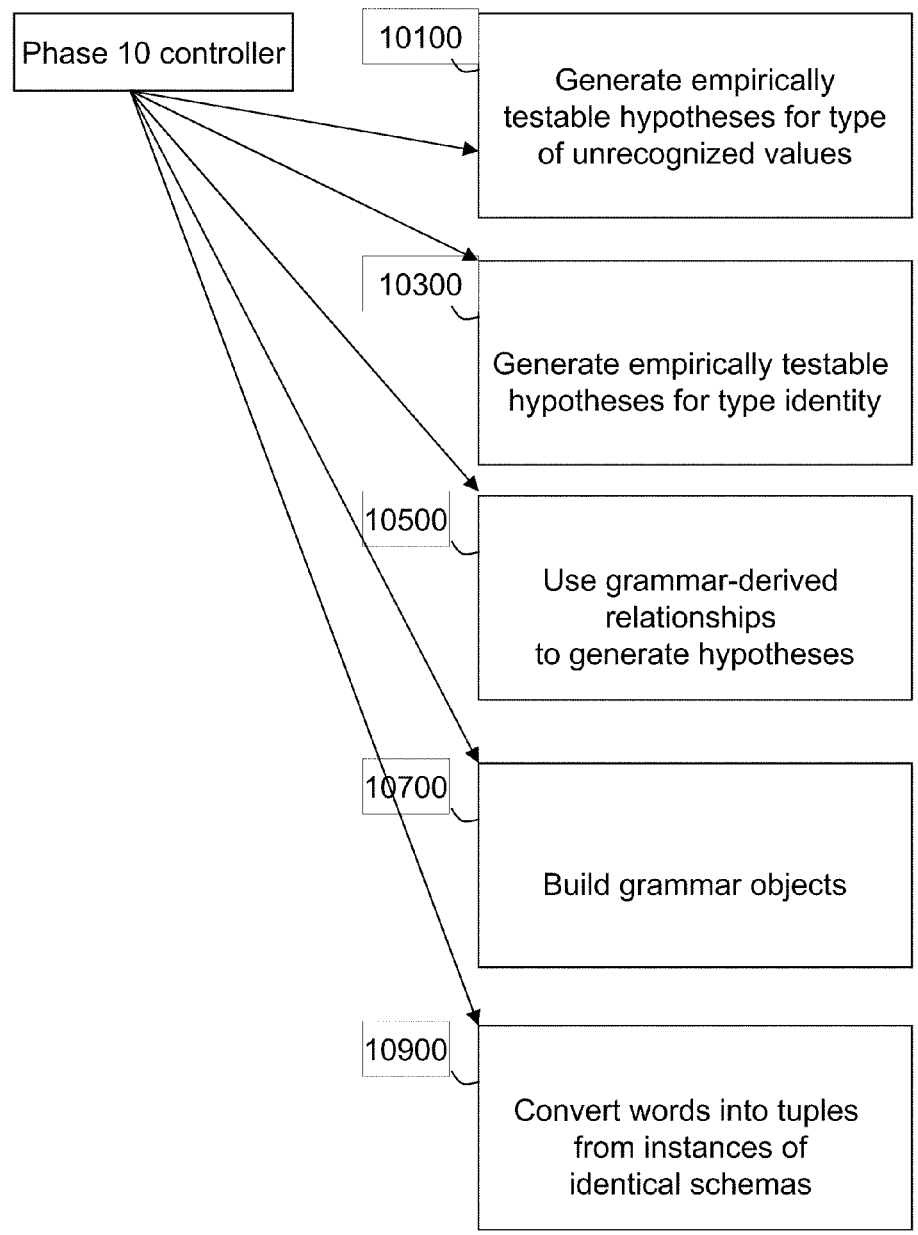
FIG. 23 is a block-level functional diagram of the control of the processes of phase 10 according to one embodiment of the present invention.

Given a collection of G3/4s that have each been converted into tuples and had content names and associated values extracted, so that there is specified for each G3/4, one or more types that define the location structure, one or more content names and one or more cells identifiable in terms of a location value and capable of containing a content value, and have each been represented as Grid representations of a logical schema, process 8100 described consolidates the collection of logical schemas as much as possible. FIG. 22 depicts a block functional diagram of the processes that occur in phase 8. Process 8100 creates useful collections and groupings of the G3/4s that have been built, and identifies and clarifies the relationships between multiple G3/4s that otherwise refer to the same locations for the same contents via process 8300. It also generates hypotheses as to the interpretations of G1s constructed of entirely unrecognized tokens (via processes 8500 and 8550) and partly of unrecognized tokens (via process 8600). Process 8700 transforms any grid formulas found that calculate in terms ultimately of cell values into general dimensional semantic formulas that calculate in terms of the enriched semantic schema.

Process 8100: For each G3/4 take the specification of the locator types of which it is composed and if that set of locator types matches a distinct set of locator types already created, add a reference to the G3/4 in the findings section of the matching logical specification, otherwise add the collection of locator types as a new distinct set.

When every G3/4 has been processed, identify every distinct type found in the collection of logical signatures associated with the G3/4s and for each distinct type build a list of the logical schemas in which it is found.

If there was more than one distinct logical schema, group the logical schemas into distinct groups between which groups no types are shared. Each group defines a heterogeneous schema. All G3/4s that share the same locator types and Content names but cover different location values are partitions of the same logical schema.

Figure 24:
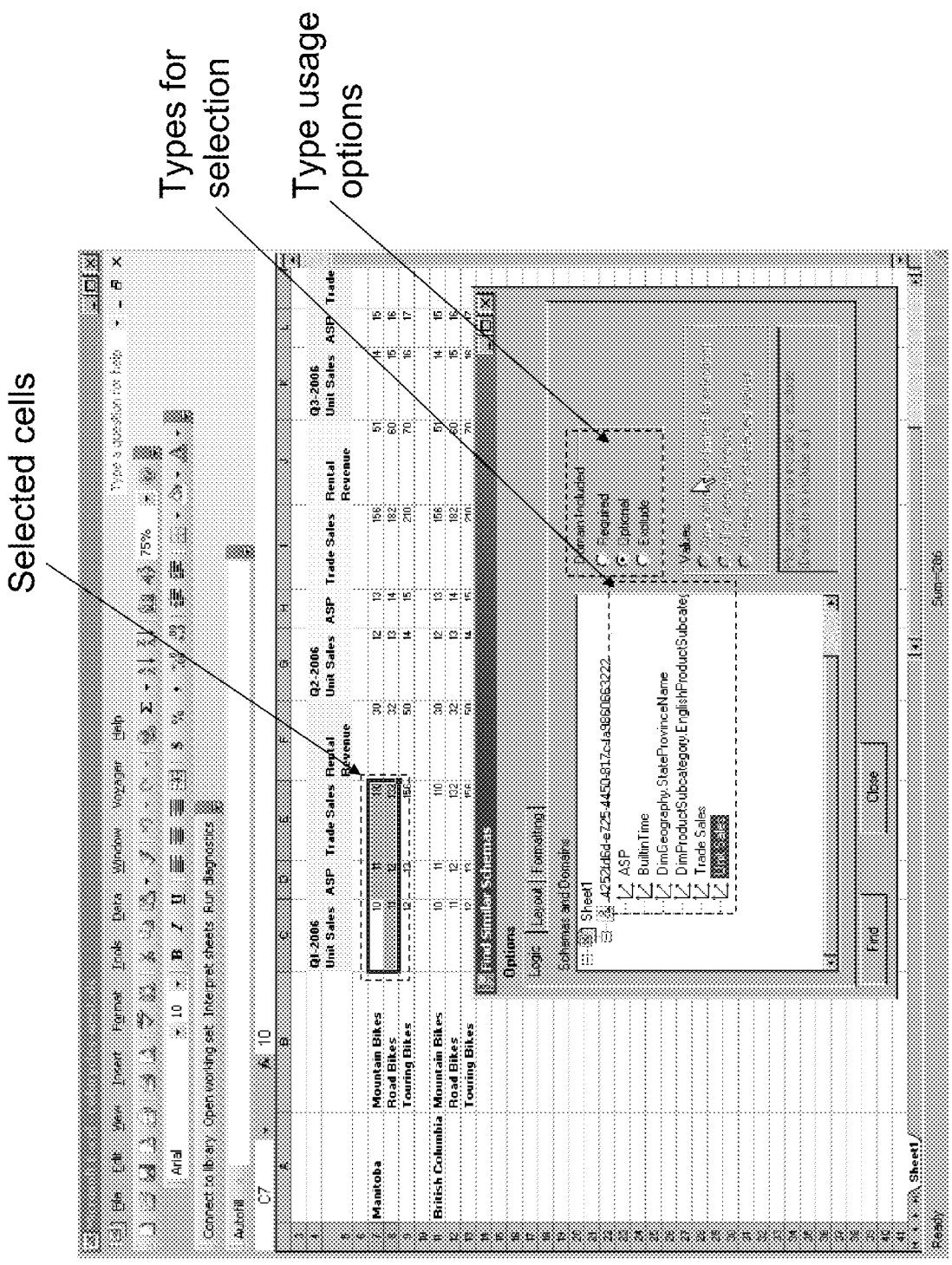
FIG. 24 shows a user interface displaying the information derived in process 8100 according to one embodiment of the present invention.
Figure 25:
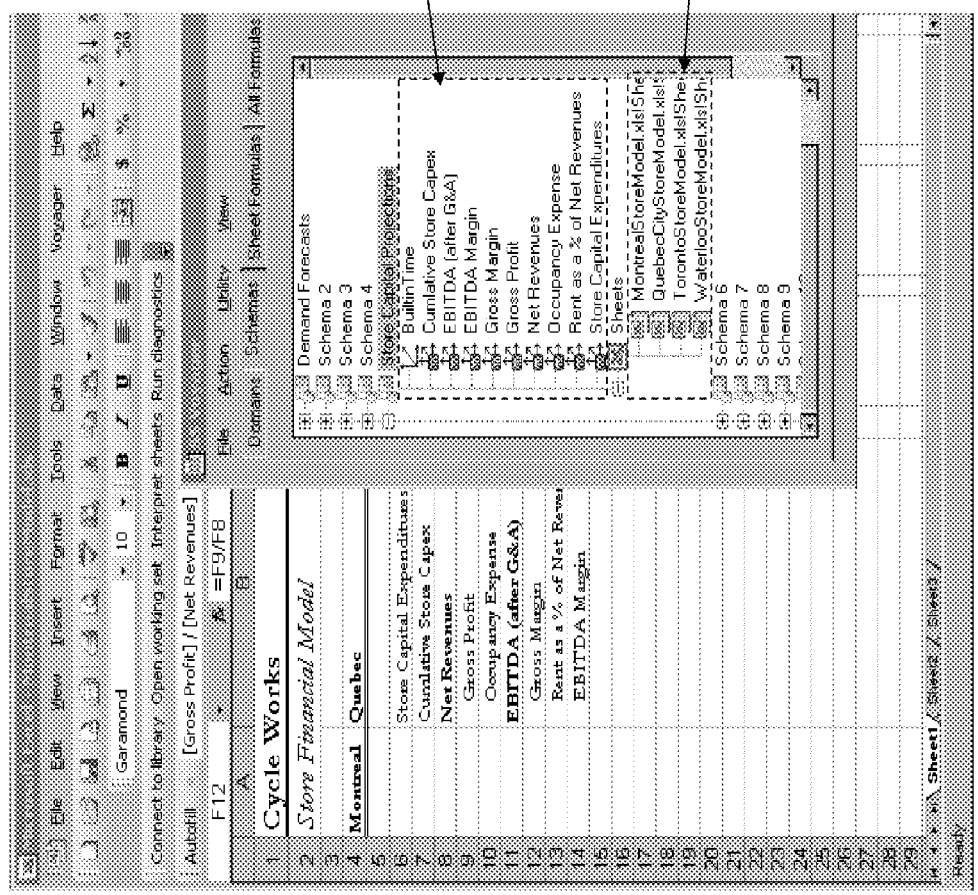
FIG. 25 shows a user interface displaying the logical types of an enriched schema and a collection of physical data sources that share the enriched schema though possibly with different physical representations according to one embodiment of the present invention.

FIG. 24 shows a user interface displaying the information derived in process 8100. For a representative enriched logical schema given the name "Store Capital Projections", the types which comprise this schema are listed in the region labeled "Enriched logical schema's types". The region labeled "Physical sources containing tuples (in any physical organization) of the enriched logical schema" lists specific spreadsheets that contain tuple data for the schema, even as the physical layout of the data can be entirely different between the spreadsheets.

Process 8300 searches for cells around the perimeter of existing G3/4s or worksheets or file names or other border areas that have not yet been assigned a logical role in a schema that serves as an interpretation for a region of gridded data and converts those cells either into additional logical tuples such as values in a dimension that partitions a collection of gridded data or as unanalyzed attributes associated with the gridded data and its logical interpretation. It does not matter to the process what order the cells or internal steps are processed in. But in the exemplary embodiment cells surrounding G3/4s that share the same location types and values as other G3/4s are processed first.

Process 8300: First, given the output of process 8100, test whether there are two or more G3/4s or collections of G3/4s that share the same logical schema and content names and locator values. If there are at least two such G3/4s or collections of G3/4s then for each such group of G3/4s or collections that share the same logical schema test whether there are any remaining cells called "RC" in the following distinct zones labeled Zn, taken in some order such as the zero zone of each G3/4, followed by the perimeter of each G3/4, the perimeter of each worksheet, worksheet tab, worksheet file name(s) and the worksheet properties, get the count CF of filled cells in the Zn of the G3/4. If CF is greater than zero, then for each G3/4 or collection for which there exists at least one RC, test whether any of the RC in Zn were interpreted as values of a recognized type and if so whether an RC can be found for each of the G3/4s or collections of G3/4s where the RC for each G3/4 has been interpreted as a distinct value of the same type. For all tests that were positive, add the RC for each G3/4 to the collection of cells in the G3/4 (or to each G3/4 if a collection) and add the logical interpretation to the logical schema associated with the G3/4 or each G3/4 in the collection.

Second, if some but not all of the G3/4s or collections had positive test results identify the zone where the positive test results occurred relative to the G3/4 or collection (e.g. to the left of the G2LV, in the zero zone or above the G2LH). Then if the positive test results were found in the same zone for each G3/4 or collection and if those G3/4s or collections for which the test results were negative had one filled cell in the same zone, interpret the value in each of those cells as an unrecognized value of the type to which belonged the recognized values extracted from the other G3/4s or collections whose test results were positive.

Third, given the output of process 8100, identify all G3/4s or collections of G3/4s whose logical schema is a proper subset of a recognized logical schema. For each such G3/4 or collection and where there exists at least one border cell, test whether any of the border cells were interpreted as values of a recognized type that matches one of the types in the logical schema for which the logical schema of the G3/4 or each G3/4 in the collection was identified as a proper subset. For all tests that were positive, add the cell to the collection of cells in the G3/4 or to each G3/4 in the collection and add the logical interpretation to the logical schema associated with the G3/4 or the collection. If the logical schema for the G3/4 or each G3/4 in the collection now has the same types as the logical schema already recognized, add the G3/4 or each G3/4 in the collection as a partition of that schema, else ADD the logical schema of the G3/4 or each G3/4 in the collection to the catalog of recognized schemas.

Repeat the second step on those G3/4s or collections whose test results were negative in the third step.

Fourth, once the first two steps have been completed, with additional repetitions of the second step performed where necessary, add every cell that is below or to the right of at least one G3/4 and that has not yet been converted into a logical tuple as an unanalyzed attribute of the nearest G3/4 below or to the right of it. Add every cell that is above all the G3/4s or to the left of the topmost leftmost G3/4 when there is one such G3/4 as unanalyzed attributes of the collection of G3/4s in the worksheet. When the fourth step is complete, process 8300 is terminated. Begin process 10100.

Together, processes 10100, 10300, and 10350 leverage existing interpretations in order to hypothesize new interpretations both for entirely unrecognized G1s that belong to G3/4s that have been converted into tuple form and for specific cell contents that are individually unrecognized but that have been assigned to a G1 of recognized type that now belongs to a G3/4 that has been converted into tuple form. Although processes 10100-10350 could be called as early as from phase two processing, in the present embodiment they follow in sequential order from the end of process 8300.

As a part of the semantic enrichment of logical schemas that has been occurring since phase 7 processing, some embodiments of the present invention call out at this point to catalog-driven hypothesis generation processes. Process 10100 generates empirically testable hypotheses for the type identity of an unrecognized value in a gridded data source that is associated with a recognized type. If the process were run and succeeded in finding a type interpretation for one or more unrecognized terms those interpretations would be returned, else a failure report.

Process 10300 generates empirically testable hypotheses for the type identity of a contiguous collection of cells from a gridded data source previously inferred to belong to a common though unrecognized type. If the process were run and succeeded in finding a type interpretation for one or more unrecognized types and as well as their individually unrecognized values, those interpretations would be returned, else a failure report.

The purpose of process 10350 is to select from the collection of possible interpretations produced in the second step of process 8500, zero or more best candidates. This is accomplished through the application of a variety of removal conditions, which conditions can be applied independently of one another.

Based on having already mapped the data source to a homogeneous schema comprised of two or more types or dimensions, process 8700 converts specific cell formulas in the data source into general dimensional formulas that may be associated with distinct content names and/or ranges of locator values or any other type role. Process 8700 can work on the output of phase 6 processing (logical schemas and their tuples), and also can work on the output of phase 7 processing (enriched logical schemas and their tuples), and also schemas that were constructed by other means (such as manual or user-guided processes, or derived by other automated processes).

For each formula-containing cell, where the formula-containing cell may be termed 'y', the cells referenced in the formula x1, x2, and so forth, and the formula is in the general expression of the form $y=f(x_1, x_2, \ldots x_n)$, first, the process gets the calculated cell's full tuple specification, expressible in the form $C(L)_y$. Also, the process gets the cell formula $F(x_1, x_2, \ldots)$ where each $x_i$ is an input cell referenced by the formula and F is the formula (including simple functions and compounds of functions, operators, and literals) which produces the value of the cell from the x arguments. The process then replaces each cell reference $x_i$ with the logical tuple that corresponds to the group with the highest group number (G3/4, G2, G1, or G0) that incorporates that cell. The result is a function expressible in the form $C(L)=F(C(L)_1, C(L)_2, \ldots)$.

Second, for the formula-containing cell and associated $C(L)_y$ expression, identify all common logical types/domains ($T_j$) that occur in both y and all of its $x_i$'s. For each $C(L)_i$, for each common $T_j$: if the value for that has the same instance on both the one $C(L)_y$ and the $C(L)_i$, remove the type $T_j$ from the $C(L)_i$; however, if the value for $T_j$ is not the same between $C(L)_y$ and $C(L)_i$, then if $C(L)_i$ has a value for $T_j$ that can be described in terms of a single relationship relative to the value from $C(L)_y$ (wherein the possible relationships include at least those that are found in standard relational and/or dimensional languages such as but not limited to sequential relationships of before and after, numeric relationships of distance, temporal relationships and hierarchical relationships of ancestry and descendants), then the value of $T_j$ in $C(L)_i$ is replaced by a function that translates the value of $T_j$ in $C(L)_y$ into the value of $T_j$ in $C(L)_i$ according to the described relationship. (For example, if $C(L)_y$'s $T_j$ value is Month March and $C(L)_i$'s $T_j$ value is Month February, then the function "month+1" is placed in $C(L)_i$ $T_j$ slot. If there is no such relationship that can be determined, then the value of $T_j$ in $C(L)_i$ is not changed.

Having removed $T_j$ values from the formula that were common with the $C(L)_y$ target, and substituted a formula for each $T_j$ value in the formula that has an available relationship-generating formula from the $T_j$ value in the $C(L)_y$ target, the general formula is completely constructed.

For each general formula that is derived from a specific cell formula using process 8700, the cell coordinate is retained and associated with the general formula. For each general formula derived by process 8700, the formula is sought in a list of general formulas associated with the type that is the content descriptor for the cell holding the formula, and the general formula is added in if not already present. If already present, the cell holding the specific formula is added to the list for the already-existing general formula.

The present embodiment employs a mechanism for comparing two formulas for algebraic equivalence when determining whether a general formula is already in a list of formulas, so that, for example, the general formulas "units*price" and "price*units" are treated as equivalent. If a formula F1 is algebraically equivalent with a pre-existing version F2, the formula F1 (and its related cells) is retained, with an attribute indicating that is an algebraic equivalent of F2, so that all algebraic equivalents can be retrieved as well as specific variants.

Figure 26:
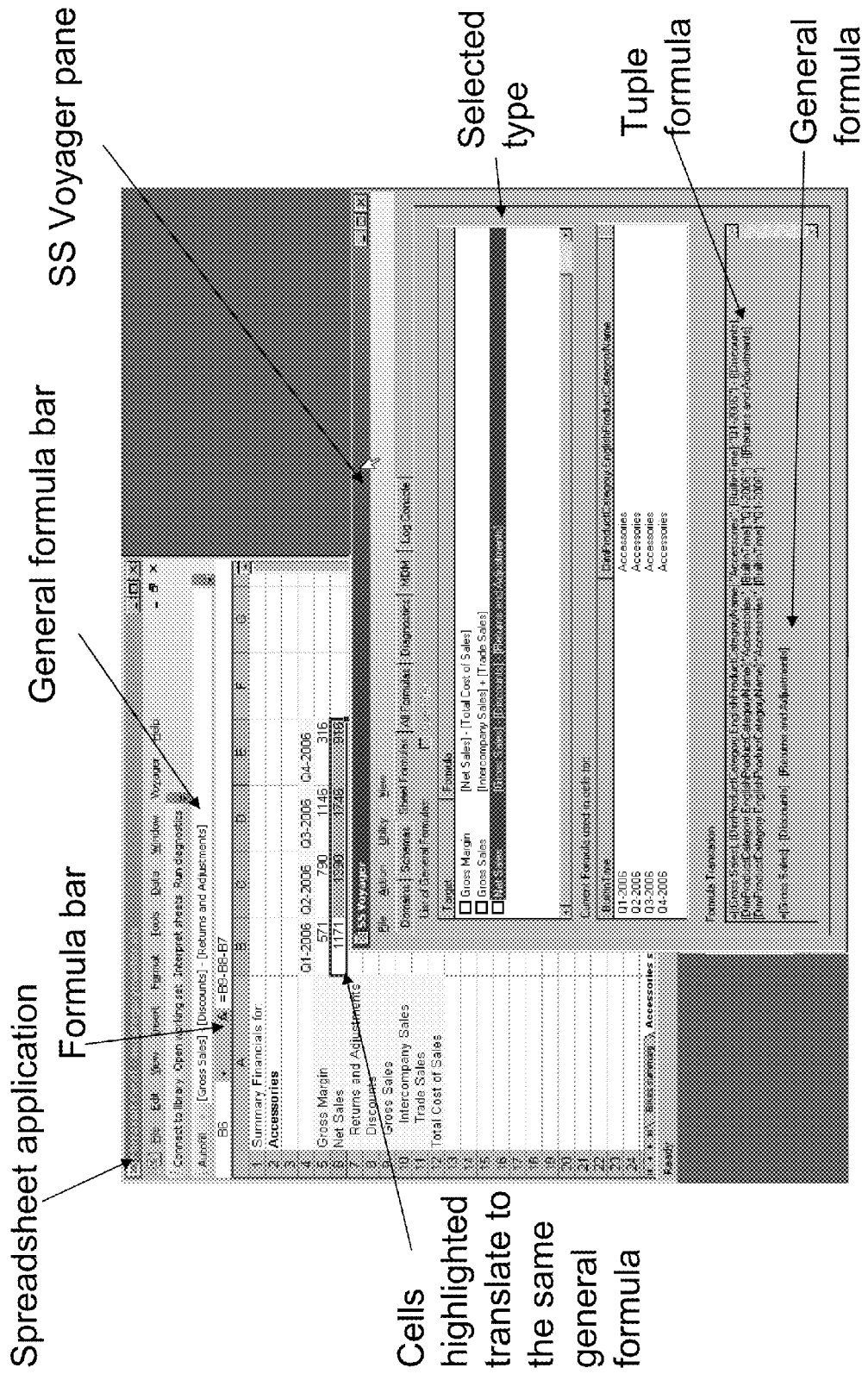
FIG. 26 shows a user interface displaying the inputs to and results of process 8700, and information gleaned from processes 8700, 9500, 9510,9520 and 9530 according to one embodiment of the present invention.

FIG. 26 shows a user interface displaying the inputs to and results of process 8700. The result of process 7200 that is input to process 8700 is labeled "Tuple Formula", showing the full translation of the cells of B9-B8-B7 into enriched logical schema tuple form, along with the operators that combine them. The result of process 8700, after removing types whose values are in common between the schema location of B6 and the input cells, is the general formula labeled "General formula". This translation is also visible in the spreadsheet application, in the region labeled "General formula bar", so that the general form of a formula can be always present for the select cell in the spreadsheet with the same ease and flexibility that the cell formula can be.

The purpose of process 8900 is to materialize the logical specification of the G3/4 in an appropriate catalog of specifications. All pending specifications have their statuses converted to known by the end of process 8900.

Through all of the eight phases of level one's semantic interpretation processing, the processing goal was to continually convert less semantically enriched data into data that was ever more semantically enriched. Following phase eight, data is understood in terms of interconnected schemas; attempts were made to interpret unrecognized terms. Content names were discovered whether they were simple or compound, inside or out of the G3/4 as a region. And general formulas were extracted so that it becomes possible to interact with the raw data via the semantically enriched schemas and their associated tuples which were illustrated in FIG. 19 as the output of process 8700.

The purpose of level two processing called semantic interaction is to provide extremely useful methods for interacting with the raw data. Although in the present embodiment, the methods are directed against the semantically enriched schemas produced at the end of process 8700 from raw data in gridded form, the methods presented below and other methods omitted from this embodiment could be directed against any of the eight level one processing phases as well as the catalog-driven interpretation services described in the next section.

Process 9500: In response to a request (whether initiated by a user gesture or automatic process), given a type identifier, process 9500 returns a collection of the general formulas used to calculate values for that type, by referring to the list that was constructed in process 8700. The list includes the algebraic equivalence attributes.

Process 9510: In response to a request (whether initiated by a user gesture or automatic process), given a type identifier, process 9510 returns a description of the content cell identifiers for which values of the type are applicable as content values in a G3/4 schema. The description is constructed by referring to the list of HMschemas using the type in a C role that was collected in process 6000 double-check.

Process 9520: In response to a request (whether initiated by a user gesture or automatic process), given a type identifier, process 9520 returns the list of all general formulas that have been defined as calculating values for a type used as a content.

Process 9530: In response to a request (whether initiated by a user gesture or automatic process), given a type identifier and a general formula, process 9530 returns a list of cell identifiers for all cells containing a spreadsheet formula where the spreadsheet formula was generalized into the general formula. The process optionally returns (based on an additional configuration parameter) cells containing spreadsheet formulas which generalize to particular formulas that are algebraic equivalents of the general formula, or all algebraic equivalents of the given general formula. The process is described as follows:

For each general formula involved (either simply the given general formula, or it and any specified algebraic equivalents), the list of associated spreadsheet cells that were generalized into the general formula (as obtained by process 8700) are retrieved and accumulated.

Figure 27:
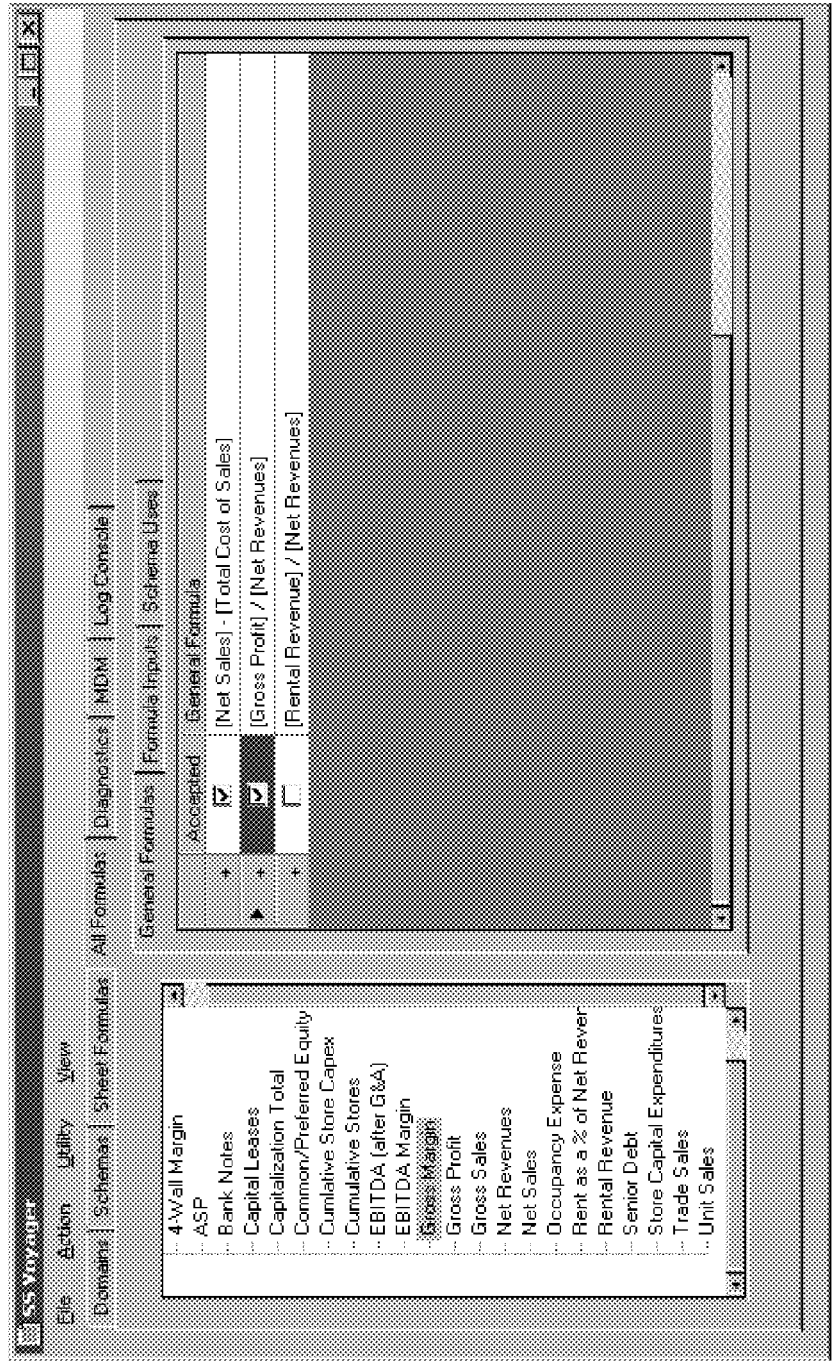
FIG. 27 shows a user interface displaying the result of a request for all general formulas that have been determined to calculate values for a particular type according to one embodiment of the present invention.

FIG. 27 shows a user interface displaying the result of executing process 9520 to retrieve all general formulas that have been determined to calculate values for the "Gross Margin" type. There are three such formulas. The first two are algebraically different because each calculates for a different unit of Gross Margin: as a difference between sales and costs and as profit as a percentage of net revenues. The third is a mistake of the kind which commonly occurs in spreadsheets, where a cell formula does not reflect the semantics of the labeling. Process 9520, run upon that particular general formula and "Gross Margin", will return all of the cells across all spreadsheets that are calculated by this wrong formula, and by running process 9700 on that range of cells, a suitable correct formula can be written into the spreadsheet cells which contained the incorrect formula.

FIG. 26 shows a user interface displaying the inputs to and results of process 8700. In the spreadsheet visible in the region labeled "Spreadsheet application", the current cell is B6, and the area labeled "Formula bar" shows cell B6 calculated by the formula B9-B8-B7. The "SS Voyager" pane in the lower right region of the figure shows a variety of information gleaned from processes 8700, 9500, 9510, 9520 and 9530. The type and general formula currently selected in the SS Voyager pane (indicated by the "Selected type" label) are found in all of the cells highlighted in the spreadsheet application, which cells are labeled with "Cells highlighted translate to the same general formula". The result of process 7200 that is input to process 8700 is labeled "Tuple Formula", showing the full translation of the cells of B9-B8-B7 into enriched logical schema tuple form, along with the operators that combine them. The result of process 8700, after removing types whose values are in common between the schema location of B6 and the input cells, is the general formula labeled "General formula". This translation is also visible in the spreadsheet application, in the region labeled "General formula bar", so that the general form of a formula can be always present for the select cell in the spreadsheet with the same ease and flexibility that the cell formula can be. If the formula in the "General formula bar" were altered, that formula would be translated by process 9700 into cell formulas for a range of cells such as the range visible in "Cells highlighted translate to the same general formula".

Process 9700 creates specific spreadsheet formulas for a range of cells in which the specific spreadsheet formulas implement a particular general formula for a content type. The particular general formula may have been input by a user, retrieved from a database, or constructed by any other means, and may reflect a modified version of a general formula that was already derived for the content type. The range of spreadsheet cells into which the formulas are to be placed may be constructed by a number of means, including but not limited to the range governed by some general formula or a user-specified range.

Each cell that will contain a formula is associated with a G3/4 which has associated with it all of the information derived by process 6600. For each cell in the target range, each function argument that specifies a component of an HMschema is translated to a cell reference (or other reference that refers to cells, for example a "named range" in Microsoft Excel), while all other arguments to the function (literal strings and numbers, for example) are translated into the appropriate language syntax. For each cell into which a formula is being generated, a structure (call it "TargetCtxt") is first initialized with all of the type values that correspond to the locator values associated with that cell via process 6600. Next, as arguments for the function are being translated into the target language syntax, for each argument that refers to a single value component of an HMSchema, if the HMSchema component is a component of the same HMschema into whose cells the formulas are being generated, the cell reference generated will be to that HMschema. Otherwise (the function argument refers to a different HMschema), a table of candidate HMschemas that provides priority attributes for the use of each candidate HMschema in mapping references to cells will be consulted to arrive at the HMschema whose cell will be referred to. For the HMschema that is determined to be the one to which a cell reference will be generated, the cell reference in the HMschema is derived as follows: A tuple (call it "RefTuple") is constructed wherein the value of each type specifically referred to in the function argument will appear as a value of that type, and the values of all types that appear both in the locator slots of the HMSchema's G3/4 and in TargetCtxt but are not referred to as having different values in the function argument are filled with the corresponding type value from TargetCtxt. When RefTuple is constructed, the locator and content slots constructed by process 6000 are searched for the slot (if only 1 G2 in the HMSchema's G3/4) or slot combination (if 2 G2s in the HMSchema's G3/4) whose tuple values match the values of RefTuple. The cell specified in this way is the cell whose reference is then added to the function being translated.

When a the HMSchema component being referenced is a range of HMSchema values (for example, sales across the years 2008, 2009 and 2010), the set of HMSchema tuples is first determined, and then the process is run across the group of tuples. The exemplary embodiment may decide to generate a compressed cell set reference.

The purpose of process 9800 is to enable what are often called "semantic search" capabilities in the information technology community. In response to a request (whether initiated by a user gesture or some other process), process 9800 retrieves a set of cells which form a context.

First, the set of given cells is translated into a set of tuples by, for each cell, constructing a tuple of the type values that correspond to the locator values associated with that cell via process 6600. These tuples have both known types and values for these types. The list of schemas per type (generated by process 8100) is retrieved. The user or process may then specify whether to select schemas that either include or exclude any combination of the types associated with the set of tuples constructed from the selected cells. In the present embodiment, this ability is provided by a user-interface dialog, however, this may be specified by other means. Furthermore, for schemas that are selected, the user may optionally specify that particular data partitions defined by a schema to be selected include or exclude values for their types that have some relationship (for example, equivalence, within 10% of, after, a hierarchical ancestor of, etc.) with the values of the values specified in the set of tuples. Given the relationships specified, the method then refers to a collection of known schemas and their physical partitions, selects only the physical partitions that meet the value relationships specified (if any). The partitions may be in gridded form (for example, analyzed spreadsheets), or OLAP "cubes", tables/views in a relational database, or any other form to which logical tuples can be associated. The identifiers of the known schemas and the associated matching partitions are then returned to the requestor.

Process 9900 creates a classification of formulas, based on the combination of contained types, values and functions, and the use of the general formula in other general formulas, that can be used to further guide the interpretation of a schema as having a particular business function, and also to further guide the construction of G3/4 interpretations. The process examines the types referenced in the formula, the values that are referenced, the functions and operators in the formula, and the referencing of the formula by other formulas, and returns a classification according to the following table:

| Condition | Classification |
|---|---|
| Cvalues input only AND used in other Cnames | Inputs |
| Cvalues are outputs of summary operations | Sums |
| Cvalues are output of Average operations | Averages |
| Cvalues are output of weighted Average operations | Weighted averages |
| Cvalues are output of rolling Average operations | Rolling averages |
| Cvalues are first or last entries in recurring time series | Balances |
| Cvalues are derived from prior time values | Forecasts |
| Cvalues are derived from higher level inputs | Allocations |
| Cvalues are derived from other Cvalues at other locations which are themselves derived from this Cvalue at this location | Simultaneous equations |

| Testing formulas | | |
|---|---|---|
| Condition | Classification | Testing |
| Cvalues input only AND used in other Cnames | Inputs | No derived inputs |
| Cvalues are outputs of summary operations | Sums | No doiuble counting or missed counting |
| Cvalues are output of Average operations | Averages | No doiuble counting or missed counting |
| Cvalues are output of weighted Average operations | Weighted averages | Weights sum to 1 No double/missed counting |
| Cvalues are output of rolling Average operation | Rolling averages | No double/missed counting |
| Cvalues are first or last entries in recurring time series | Balances | No aggregation |
| Cvalues are derived from prior time values | Forecasts | Consistent with forecasting policy |
| Cvalues are derived from higher level inputs | Allocations | Consistent with allocation policy |
| Cvalues are derived from other Cvalues at other locations which are themselves derived from this Cvalue at this location | Simultaneous equations | No circular references |

Level three phase 10 processing provides model-driven interpretations to the other processes in the present embodiment. Although these kinds of services occur in relation to a catalog of symbols, types and schemas, and although such a catalog provides significant value to any embodiment, the principles of catalog design are well understood.

As such, there follows only a very brief description of the most salient elements of the catalog that are worth highlighting. The catalog is composed of symbol, type, and schema entries and is available to all processes. Symbols may be composed of and comprise other tokens. Types may be comprised of and comprise other types and schemas. Schemas may be comprised of and comprise other schemas or types. Schema definitions include a list of content names and for each content name one or more associated formulas if present. And if there is more than one, the different location ranges to which the formulas apply. All catalog entries also have associated attributes.

For each entry that is a type there is associated one or more representations of that type. For each combination of a type entry and associated representation there is associated one or more units. For each combination of type entry, associated representation and associated unit there are associated two or more values. The values are components of the unit which belongs to the type. The relationships between the units are also components of a type. Every unit of a type—as a component of that type—also has a separate entry where the unit functions as a type.

Every catalog entry may have an associated set of one or more discovered locations where the entry is known to have occurred or to have been recognized. In addition, the present embodiment materializes in the catalog the schema tuples extracted from the atomic tuples. In addition every component of every entry such as the values of a type may have multiple physical representations. Each name for the same object or alias in a collection of names where some one name is deemed "the official name" may be considered a different physical representation of the same logical value. The specification of both the discovered locations and the physical representations varies as a function of the kind of data source, such as spreadsheet versus database.

With spreadsheets, for example, locations are specified in terms of 1) One or more optional devices, and relative to each device, 2) a location or path relative to that device ending in a file name and relative to each file name, and 3) one or more worksheets and for each worksheet one or more ranges of cells. For information represented in terms of cell data there are three parts to the physical representation: 1) type representation, 2) formatting including the use of visual content and 3) layout. Layout is specified in terms of the range of cell locations occupied by each component of the logical schema. The type representation also has two parts: 1) the externally visible formatted string and 2) the internal data type.

Process 10100 generates empirically testable hypotheses for the type identity of an unrecognized value in a gridded data source that is associated with a recognized type. Process 10100 proceeds as follows: For each type T in a schema S containing M Types labeled 1 thru M recognized in the given data, when T contains unrecognized values UV, find all other schemas in the catalog that contain T and as many of the S's M types other than T. If no other schemas contain T stop process 10100 and return to calling process. If one or more other schemas contain T but none of these other schemas contains any of S's other M types rank the schemas in terms of the closeness of their values for T with S's values for T. If one or more of the other schemas has, for its values of T, the same values as found for T in S and in the same order and all those other schemas have the same value in the same neighbor-defined position (i.e., the neighbors of UV in T in S are the same as the neighbors of the recognized value RV in T in those other schemas) where T has UV, the process generates the hypothesis that UV in T refers to the same type value as the corresponding recognized value from the one or more other schemas. Otherwise, if one or more other schemas contain T and one or more of them also contains one or more of S's other M types, then the process looks for those schemas where the types-other-than-T that match have the closest correlation of values in those other types. Then for each of the other schemas Sn that has such a match of the types-other-than-T, UV is hypothesized to have the same type-meaning as the value for T in Sn that corresponds to the same collection of values for all the types-other-than-T shared by Sn and S. If there is more than one such schema, each of the collection of values represents a hypothesis for the type-meaning of UV. Process 10100 repeats until there are no more UV, then returns to the calling process.

Process 10300 proceeds as follows: For every G3/4 that has been converted into tuple form and for which at least one of its contained G1s was unrecognized, first identify all the logical schemas (output from process 8100) of which the G3/4's recognized types are a subset.

In the present embodiment this is accomplished by executing two sets of branching links. The first set connects every entry in the catalog of recognized logical structures with each of the entries for each of the larger structures known to contain the entry as a component (as well as a method for getting to the specific component). For example, an employee type may be contained in both a schema consisting of for schema_1 time, employee and hours worked and for schema_2: employee and home address. Each of these schemas contains the type "employee" as a component. The second set connects every entry in the catalog with the entry for each of its components. Thus, schema_1 would contain links from the schema entry to the entry for each of its components (in this case, but not limited to types).

Second, remove the types that represent the intersection between the recognized types in the logical schema associated with the given G3/4 and the concatenation of the types that are the components of the logical schemas identified in step (10301).

After performing the second step, each of the remaining types listed as a component of a logical schema accessed in the first step is a possible interpretation for the one or more unrecognized G1s in the given G3/4.

The purpose of process 10350 is to select from the collection of possible interpretations produced in the second step of 10300, zero or more best candidates.

This is accomplished through the application of a variety of removal conditions, which conditions can be applied independently of one another.

Process 10350 removes from the collection of possible interpretations produced by 10300 all those types: whose root units are incompatible or whose number of potential values is less than the distinct count seen in the unrecognized G1. From those types remaining, rank higher those "whose types removed in step two of 10300" had the closest value correlation (e.g. percent symbols in common if categorical or numeric or numeric correlation if numeric) with the values of the corresponding types in the originally given G3/4.

Prepositions, articles and other grammar terms, though often ignored in search engines provide a powerful source of information for how word meanings combine to form schemas. Process 10500 makes use of the systems own typed representations of whatever local grammar (e.g., English or French) is being used to improve its interpretation results.

Seeing, for example, the sentence fragment "country of headquarters" as the string contents of a cell, a process such as 1300 would first test whether the collection of terms either in a spreadsheet cell or neighboring a word in a sequence of text matches one molecular symbol. If it does then this interpretation is used (e.g. co-located terms). For example, the sentence fragment "of course" has a meaning unique to the combination of its component tokens that does not rely on the use of "of" as a grammatical term. In contrast, the sentence fragments "country of headquarters" or "day of week" do rely on the grammatical meaning of the term "of".

Although in the present embodiment, the test for grammar terms only begins when all other attempts to recognize extracted terms has failed—process 1700—the test for and use of grammar term meanings can happen at any time such as during process 1300 and with reference to any collection of textual terms in any language.

In the same way that spell-checking programs rely on having previously been given a collection of words, spelled correctly, to populate a symbol catalog or table, so too process 10500 relies on having been previously given a collection of language-specific grammar terms and their meanings (which may be context specific where context is specified by the presence or absence of other words in the vicinity of the grammar term). Those meanings are captured in the symbol catalog using the same capabilities as described for the catalog.

Process 10500 generates empirically testable hypotheses using typed grammar objects for the type identity of an unrecognized term extracted from a sequence of tokens such as words and numbers in sentence or sentence fragment form. Process 10500: leverages a user created language-specific table of grammatical relations as illustrated here with 'The' in expressions of the form "The 'x'" (meaning the local count of 'x' is 1)
'of' in expressions of the form 'What is the x 'of' the y? (meaning for some type value 'y' what is the value of the type named 'x'?),
'Per' in expressions of the form x per y (e.g. 'Hours per day' meaning the count of hours for some day)

in order to provide model-driven inference capabilities.

The meaning of the grammar term defines a relationship between two or more types. For example in the question "What is the furg of the tree?" and given that all the extracted terms except for 'furg' were successfully matched, process 10500 would first look for recognized terms on either side of the grammar term 'of'. In this case it would discover that the symbol 'of' is located within a series of words (or context) having the form "what is the 'x' of the 'y'?"

That context, in the catalog would access all the logical type meaning s for 'of' associated with the discovered template "What is the X of the Y?" wherein 'x' denotes the name of some type, and 'y' denotes the value for some type serving as a location for which the type 'x' can be evaluated. Knowing that 'tree' is a value, for example, of type tangible object, and that tangible objects have color results in the extraction of the schema tuple 'Tangible object' as the name of a type for which 'tree' is a value and 'furg' as the name of some type that can be evaluated with respect to trees. Hence process 10500 would conclude that 'furg' means something that can be evaluated of a tree.

Given a collection of tokens physically arranged in a known spatio-temporal relationship, such as a sequence or a grid of characters process 10500 can be invoked wherever there is a token previously determined to be unrecognized and that is situated within a collection of other tokens at least some of which are recognized.

The first step in process 10500 is to identify the types of the nearest surrounding recognized tokens including any grammar tokens. The search extends out from the unrecognized term until at least one grammar term has been identified from having matched a symbol. Each time a grammar term is found, it is used to access one or more schema-templates each consisting of a definition of a collection of types that includes the identified grammar term. The process then compares each schema template to the collection of neighboring recognized tokens, called TR, and ranks the schema templates in order of the number of types from TR that are matched by the schema template.

For each high ranked schema (where high ranked is a user-definable threshold) remove common types between the schema template and the sequence of tokens. The types remaining in the schema template that have the same location relationship to the recognized grammar terms as the unrecognized term in the sequence of text are the possible candidates to interpret the unrecognized token.

For all schema templates that had a type component whose location relationship to the known grammar terms matched that of the unrecognized token, the process materializes the typed identity in an output container O. When all the top ranked schemas have been tested, the collection of type identities in O represent model-driven hypotheses as to the typed interpretation of the unrecognized token. Process 10500 then ends and control passes back to the calling process.

Process 10700 converts sequences of words into logical schema tuples by cumulatively unioning the instances of identical schemas.

The approach for mapping from words to type-roles falls somewhere between what are typically called context-sensitive and context-free grammars. Our approach is context sensitive in that there may be multiple possible type-roles associated with any particular word so that some process needs to be employed to resolve the ambiguity. It is also context-sensitive in the sense that an initially chosen interpretation for a word will link to a schema which in turn will generate hypotheses about the kinds of neighboring words to expect which if found will increase the believability of that interpretation.

However the approach of this present embodiment is context free in that the selection of candidate type-roles can be made on the basis of a single word. Thus, neighboring words do not need to be examined in order to process. The goal is to have the expressibility of a recursive decent grammar with the efficiency of a context-free grammar Resolution of ambiguities when it needs to take place comes from one of several places:
 Type-roles are ranked where possible in order of likelihood, (based on previous experience). The first one is tried first.
 When associated schemas are cumulatively unioned with others and when the newest schema added to the union increases the heterogeneity of the overall schema and where there are other "interpretations" of the word that map to different type-roles and possibly different schemas, then those alternate schemas are tried in the current pass.

Every understood word or multi-word combination maps to at least one type-role. Although the relationship between words and type-roles is, strictly speaking, M to N, the mappings are predominantly 1 to N. As such we create a distinct entry for every word, say "Boston" and "garden" and every multi-word combination such as "Boston garden". This allows us to perform faster mappings close to context-free.

Every word entry in the word to type-role binding is associated with one or more type-roles. The binding contains a pointer to an index to the type roles. The index points to the physical address of the type-role information.

Although there are numerous type-roles such as Type_name, Type_value, Type_unit, Type_operator, Type- _operation result, Type_expression, and Schema_name, the overwhelming majority of significant nouns, verbs adjectives and adverbs proper names and articles used in normal discourse are composed of Type_names and Type_values. Next most common is Type_operator which includes words like "is" and "have" as well as many prepositions. And other grammar terms.

Process 10700 begins by taking the first schema found for the first word matched and place it in the "aggregate schema" accumulator. The schema placed in the accumulator will have a partial instance representing the parsed word, and variables over the other types in the schema. For example, the word blue, recognized as the value of a color type, might link to a simple schema where for every distinct value of type object there is associated some valid value of color and size. When placed in the accumulator this produces an instance of a schema for which all of its logical types are unknown except that one for which the first recognized word filled a slot, as in the following example:

Object: value=unknown; Color: value=blue; size: value=unknown read: Some object has the color blue and some size Second, take the first schema found for the second word matched and compare its location structure with the location structure for the cumulatively existent aggregate schema.

If the two schemas share the same location structure, compare their patterns of instantiations and variables. Are they complimentary, redundant, or contradictory. If complimentary or redundant, then delete the second location structure and add the new partial instance.

For example, if the word after "blue" is "car" the term "car" would access the same schema but with a different known value, namely that of the object.

For example: Object: value=car; Color: value=unknown; size: value=unknown

Third, unioning the schema filled in by "blue" and the schema filled in by "car" produces a further completed schema instance for example: Object: value=car; Color: value=blue; size: value=unknown If the location structures of the two schemas are different in any way then fourth, identify all seemingly identical locator types and identify all non-identical locator types. Then for each non-identical type identify the nearest identical types for both schemas and insert a left hand side parentheses into the resident aggregate schema just after the last identical types and just before the first non-identical one and use the resident aggregate schemas non-identical type (structure) as the left hand side of an about-to-be-specified right hand side and insert an XOR into the resident aggregate schema at this point and insert the non-identical type(s) from the second schema and close with a right hand side parentheses In summary process 10700 processes sentences against a background of types and schemas.

Words are conditionally mapped to Type-roles such as type-value or type-name or type-operator
  The mapping of words to type-roles may be thought of as the "parsed form" of the sentence
Type-roles are conditionally mapped to schemas (where schemas include, among other things, modifier information as well as unexchanged shared context),
  Schemas are cumulatively unioned (both definitions and instances)
  The mapping of the words to their type roles within the context of a schema (effectively generating accumulating partial instances of that schema), may be thought of as its executable form
  This covers any assertion, query and/or command
The executable form may then be executed. Depending on the kind of expression, it may return an answer, some kind of test result, a specific action, or nothing.

Furthermore, although listed above in terms of discrete steps, the steps do not occur in strict sequential order. For example, the first three words in the sentence "The blue car belongs to my wife", may be mapped to type-roles, associated with schemas and executed (as by looking to see if there is some one blue car common to the local awareness of the speaker and listener), before the fourth word in the sentence is even scanned.

A representative example of process 10900 building the logical schema representation for a sentence might look as follows.

For example one "The car is blue."

| Word | Type role | Typed Identity | Associated schema | Schema instance |
|---|---|---|---|---|
| the | Expression | Cnt(local object) = 1 | Context.*1-1+ Cnt(local obj) | Context.this sentence1-1(Cnt(local object) = 1) |
| car | Tvalue | Object.car | Object.*1-1+ (Color, owner, mass) | Object.car1-1(Color.v, owner.v, mass.v) |
| is | Toperator | Gentype.Operator.compare | Compare(T.value, T.value) | Compare(T.value, T.value) = same |
| blue | Tvalue | Color.blue | Object.*1-1+ (Color, owner, mass) | Object.v1-1Color.blue |

Process of Cumulatively Unioning the Schemas and Associated Instances

1. The: Context.this sentence1-1(Cnt(local object)=1)
2. Car, is: Object.car1-1Color.v, owner.v, mass.v union Compare(Tvalue, Tvalue)=same
=>Compare ((Object.car1-1Color.v OR owner.v OR mass.v), (Object.v1-1Color.v OR size.v OR mass.v))=same
3. Blue: Compare((Object.car1-1Color.v), (Object.v1-1Color.blue))=same
In executable form: Compare((Color(Location(Object.car))), Color.blue)

Process 10900 constructs the logically-typed grammar objects used in processes 10500 and 10700 from collections of contiguous collections of atomic symbols. Process 10900 is run when users need to define such objects such as before invoking process 10500 or process 10700 for the first time. Process 10900 operates as follows:
  1. Scan sequences or grids for atomic terms such as characters and phonemes
  2. For different sizes of context as determined by the count of atomic symbols per context
    a. Calculate count of occurrences of different symbols
    b. Identify most frequently occurring symbols
    c. Identify for each "most frequently occurring symbol"—called a grammar symbol—its most commonly occurring neighbor symbols d. For each spatio-temporal combination of neighboring grammar symbols identify the types and type relationships of the surrounding symbols
3. For each surrounding symbol that is a grammar symbol,
   a. extract typed representations of surrounding terms
   b. Join the typed representations of surrounding grammar terms with the typed representations of the non-grammar terms surrounding the adjacent grammar terms and the typed representation of the given grammar terms
   c. Put grammar terms in the center of schema spaces that connect the non-grammar terms as partitioned by the grammar terms The following are examples of grammar templates extracted by process 107000 and their conversion into logically typed grammar objects:
That's a puppy
That's a dolly
That's a sippy cup
That's a ball
That's a "X"=>audio Name, Type.object in focus="X"
That's a puppy=>Name, Type.object in focus="puppy"
The color of the ball is red
The color of the ball is blue
The "X" of the "Y" is "Z"=>"X", Te.object."Y"="Z" where count (Te.object)=1
The name of that man is George
The name of that tree is Walnut
The "X" of that "Y" is "Z"=>"X", Te.object."Y"="Z" where count (Te.object>1 and Te.object is pointed to)
What is the 'x' of the 'y'?: What is the color of the door? What is the height of the shelf?
Does 'y' even have an 'x'?
Is 'x' a 'y'?: Is a penguin a mammal? Is a corporation a person?
When is 'x' not a 'y'?
Do 'x's 'y'? Do penguins fly? Do kids eat? Do managers think?
Which 'x's can't 'y'?

These templates are parameterized, where the grammar terms act as type "operators" to bind terms into schemas, as in the following example: What is the 'x' of the 'y'=>Type.x, Type.value.y Any expression of the form "Type X name, T Y value" is a question about the TX value of the Type Y object The following are examples of logically typed grammar objects:

1 "English Symbol Per"—Grammar Connected Fragment
Logical specification: "Type_name 1", Per, "Type_name 2"
Phys rep: "Type_name 1", Per, "Type_name 2" in sequence
Container: Type_name1 links to Content name of some schema
Type_name2 links to Locator name of same schema 2 "English Symbol Of"—Grammar Connected Fragment
Logical specification: "Type_name 1", of, "Type_name 2"
Phys rep: "Type_name 1", of, "Type_name 2" in sequence
Container: Type_name1 links to locator name of some schema
Type_name2 links to model name of same schema
XOR
Type_name1 links to locator unit name of some schema
Type_name2 links to ancestor locator unit name of same schema
XOR
Type_name1 links to Content name in some schema
Type_name2 links to locator name in same schema It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software tangibly stored on a computer-readable medium, firmware, or any combination thereof. For example, an example of a computer on which embodiments of the present invention may be tangibly embodied is shown in FIG. 28. The techniques described above may be implemented in one or more computer programs executing on a programmable computer including a processing unit 11110 which includes a processor 11113, a storage medium readable by the processor 11113 (including, for example, volatile memory 11112 and non-volatile memory 11111, a hard disk drive 11114, or additional memory connected to the computer through a memory slot 11170), at least one input device 11120, and at least one output device 11140. Program code may be applied to input entered using the input device 11120 and received by a reception unit 11116, to perform the functions described herein and to generate output provided by the processor 11113 to the output device 11140 using a transmission unit 11115. The computer may further receive input and transmit output over a communication network 11200 using a network interface unit 11150.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
   (A) converting a plurality of atomic tuples, representing contents of a plurality of cells stored in a grid, into a plurality of schema tuples, comprising:
      (A)(1) assigning a plurality of catalog-defined types to the plurality of atomic tuples;
      (A)(2) assigning a role of locator to a first subset of the plurality of cells based on the plurality of catalog-defined logical types; and
      (A)(3) determining whether a locator tuple slice in the plurality of cells contains a missing value.

2. The method of claim 1, wherein (A) (3) comprises:
   (A) (3) (a) extracting from the plurality of atomic tuples a locator tuple slice, wherein the locator tuple slice comprises a plurality of locator values, wherein the locator tuple slice forms a 1XN shape within the grid; and
   (A) (3) (b) determining, based on at least some of the plurality of locator values, whether any empty cell in the locator tuple slice implicitly contains a missing value.

3. The method of claim 2, wherein (A) (3) further comprises:
   (A) (3) (c) if any of the empty cells is determined to implicitly contain a missing value, then storing a record of the missing value.

4. The method of claim 1, wherein the grid comprises a spreadsheet.

5. The method of claim 4, wherein (A) (1) comprises assigning the plurality of catalog-defined logical types to the plurality of atomic tuples by matching contents of the plurality of cells with a library of symbols.

6. The method of claim 1, wherein (A) (1) comprises assigning the plurality of catalog-defined logical types to the plurality of atomic tuples by matching data types of the plurality of cells with a library of logical data types.

7. The method of claim 1, further comprising:
   (B) identifying a second subset of the plurality of cells, wherein the second subset contains a plurality of values of a plurality of logical types;
   (C) identifying a third subset of the plurality of cells, wherein the third subset contains a plurality of names of the plurality of values in the second subset, wherein the third subset and the second subset are disjoint.

8. The method of claim 6, wherein the grid comprises a spreadsheet.

9. The method of claim 8, wherein the spreadsheet comprises a tab, and wherein the method further comprises:
   (D) before (C), identifying contents of the tab; and
   wherein (C) comprises identifying the plurality of names based on the contents of the third subset and the contents of the tab.

10. The method of claim 7, wherein the grid is stored in a file, and wherein the method further comprises:
    (D) before (C), identifying a name of the file; and
    wherein (C) comprises identifying the plurality of names based on the contents of the third subset and the name of the file.

11. The method of claim 7, wherein (C) comprises identifying a name that refers to a plurality of cells in the second subset.

12. The method of claim 7, wherein (C) comprises associating a plurality of names contained in a plurality of cells in the third subset with a value of one cell in the second subset.

13. The method of claim 12, wherein (C) comprises associating a combination of the plurality of names contained in the plurality of cells in the third subset with the value of the one cell.

14. The method of claim 7, wherein the second subset is arranged in a rectangular shape, and wherein the third subset is outside the rectangular shape.

15. The method of claim 7, further comprising:
    (D) determining whether the plurality of values are consistent with the plurality of names.

16. The method of claim 15, wherein (D) comprises determining whether the plurality of values are consistent with the plurality of names based on semantic values of the second subset.

17. The method of claim 15, wherein (D) comprises determining whether the plurality of values are consistent with the plurality of names based on logical states of the second subset.

18. The method of claim 1, wherein cells in a second subset of the plurality of cells are associated with a plurality of content names, and wherein the method further comprises:
    (B) identifying, based on contents of the plurality of cells and the plurality of content names, a formula having at least one term including at least one of the plurality of content names; and
    (C) associating the formula with at least one of the plurality of cells.

19. The method of claim 18, wherein (B) comprises identifying a formula having a plurality of terms, wherein each of the plurality of terms includes at least one of the plurality of content names.

20. The method of claim 18, wherein (C) comprises associating the formula with the plurality of cells.

21. The method of claim 18, wherein the contents of the plurality of cells comprise formulas in the plurality of cells.

22. The method of claim 18, wherein (C) comprises replacing a cell reference in a formula in one of the plurality of cells with a logical tuple corresponding to a cell referenced by the cell reference.

23. The method of claim 1, wherein a second subset of the plurality of cells represent a plurality of values associated with a content name, and wherein the method further comprises:
    (B) identifying, based on contents of the plurality of cells in the second subset and the content name, a formula having terms including at least two of the plurality of content names.

24. The method of claim 23, further comprising:
    (C) receiving a type identifier, wherein the type identifier identifies a particular logical type; and
    (D) identifying a collection of general formulas that calculate values having the particular logical type.

25. The method of claim 1, further comprising:
    (B) identifying a first formula in a first one of the plurality of cells;
    (C) identifying a second formula in a second one of the plurality of cells; and
    (D) generating a general formula based on the first formula and the second formula.

26. The method of claim 25, wherein (D) comprises, for the first formula in the first one of the plurality of cells:
    (D) (1) identifying, in the first formula, a reference to a referenced cell in the plurality of cells;
    (D) (2) replacing the reference with a logical tuple corresponding to the referenced cell.

27. A non-transitory computer-readable medium comprising computer program instructions executable by a computer processor to perform a method, the method comprising:
    (A) converting a plurality of atomic tuples, representing a plurality of cells stored in a grid, into a plurality of schema tuples, the method comprising:

(A) (1) assigning a plurality of logical types to the plurality of atomic tuples;

(A) (2) assigning a role of locator to a first subset of the plurality of cells based on the plurality of logical types;

(A) (3) extracting from the plurality of atomic tuples a locator tuple slice, wherein the locator tuple slice comprises a plurality of locator tuples corresponding to a plurality of contiguous cells, from the plurality of cells, having the role of locator and forming a 1XN shape within the grid;

(A) (4) determining, based on values of at least some of the plurality of contiguous cells, whether any empty cells in the plurality of contiguous cells implicitly contain missing values;

(A) (5) if any of the empty cells are determined to implicitly contain missing values, then storing the missing values of the locator tuples of the locator tuple slice corresponding to the cells which are determined to implicitly contain missing values; and (A) (6) converting the plurality of locator tuples into a plurality of logical schema tuples corresponding to the plurality of locator tuples, wherein each of the plurality of logical schema tuples comprises a type of the corresponding locator tuple and a value of the corresponding locator tuple.

28. The computer-readable medium of claim 27, wherein (A) (3) comprises:

(A) (3) (a) extracting from the plurality of atomic tuples a locator tuple slice, wherein the locator tuple slice comprises a plurality of locator values, wherein the locator tuple slice forms a 1XN shape within the grid; and (A) (3) (b) determining, based on at least some of the plurality of locator values, whether any empty cell in the locator tuple slice implicitly contains a missing value.

29. The computer-readable medium of claim 28, wherein (A) (3) further comprises:

(A) (3) (c) if any of the empty cells is determined to implicitly contain a missing value, then storing a record of the missing value.

30. The computer-readable medium of claim 27, wherein the grid comprises a spreadsheet.

31. The computer-readable medium of claim 30, wherein (A) (1) comprises assigning the plurality of catalog-defined logical types to the plurality of atomic tuples by matching contents of the plurality of cells with a library of symbols.

32. The computer-readable medium of claim 27, wherein (A) (1) comprises assigning the plurality of catalog-defined logical types to the plurality of atomic tuples by matching data types of the plurality of cells with a library of logical data types.

33. The computer-readable medium of claim 27, wherein the method further comprises:

(B) identifying a second subset of the plurality of cells, wherein the second subset contains a plurality of values of a plurality of logical types;

(C) identifying a third subset of the plurality of cells, wherein the third subset contains a plurality of names of the plurality of values in the second subset, wherein the third subset and the second subset are disjoint.

34. The computer-readable medium of claim 32, wherein the grid comprises a spreadsheet.

35. The computer-readable medium of claim 34, wherein the spreadsheet comprises a tab, and wherein the method further comprises:

(D) before (C), identifying contents of the tab; and wherein (C) comprises identifying the plurality of names based on the contents of the third subset and the contents of the tab.

36. The computer-readable medium of claim 33, wherein the grid is stored in a file, and wherein the method further comprises:

(D) before (C), identifying a name of the file; and wherein (C) comprises identifying the plurality of names based on the contents of the third subset and the name of the file.

37. The computer-readable medium of claim 33, wherein (C) comprises identifying a name that refers to a plurality of cells in the second subset.

38. The computer-readable medium of claim 33, wherein (C) comprises associating a plurality of names contained in a plurality of cells in the third subset with a value of one cell in the second subset.

39. The computer-readable medium of claim 38, wherein (C) comprises associating a combination of the plurality of names contained in the plurality of cells in the third subset with the value of the one cell.

40. The computer-readable medium of claim 33, wherein the second subset is arranged in a rectangular shape, and wherein the third subset is outside the rectangular shape.

41. The computer-readable medium of claim 33, further comprising:

(D) determining whether the plurality of values are consistent with the plurality of names.

42. The computer-readable medium of claim 41, wherein (D) comprises determining whether the plurality of values are consistent with the plurality of names based on semantic values of the second subset.

43. The computer-readable medium of claim 41, wherein (D) comprises determining whether the plurality of values are consistent with the plurality of names based on logical states of the second subset.

44. The computer-readable medium of claim 27, wherein cells in a second subset of the plurality of cells are associated with a plurality of content names, and wherein the method further comprises:

(B) identifying, based on contents of the plurality of cells and the plurality of content names, a formula having at least one term including at least one of the plurality of content names; and (C) associating the formula with at least one of the plurality of cells.

45. The computer-readable medium of claim 44, wherein (B) comprises identifying a formula having a plurality of terms, wherein each of the plurality of terms includes at least one of the plurality of content names.

46. The computer-readable medium of claim 44, wherein (C) comprises associating the formula with the plurality of cells.

47. The computer-readable medium of claim 44, wherein the contents of the plurality of cells comprise formulas in the plurality of cells.

48. The computer-readable medium of claim 44, wherein (C) comprises replacing a cell reference in a formula in one of the plurality of cells with a logical tuple corresponding to a cell referenced by the cell reference.

49. The computer-readable medium of claim 27, wherein a second subset of the plurality of cells represent a plurality of values associated with a content name, and wherein the method further comprises:

(B) identifying, based on contents of the plurality of cells in the second subset and the content name, a formula having terms including at least two of the plurality of content names.

50. The computer-readable medium of claim 49, further comprising:
   (C) receiving a type identifier, wherein the type identifier identifies a particular logical type; and
   (D) identifying a collection of general formulas that calculate values having the particular logical type.

51. The computer-readable medium of claim 27, further comprising:
   (B) identifying a first formula in a first one of the plurality of cells;
   (C) identifying a second formula in a second one of the plurality of cells; and
   (D) generating a general formula based on the first formula and the second formula.

52. The computer-readable medium of claim 51, wherein (D) comprises, for the first formula in the first one of the plurality of cells:
   (D) (1) identifying, in the first formula, a reference to a referenced cell in the plurality of cells;
   (D) (2) replacing the reference with a logical tuple corresponding to the referenced cell.

* * * * *

UNITED STATES PATENT AND TRADEMARK OFFICE
CERTIFICATE OF CORRECTION

PATENT NO.       : 8,239,750 B2
APPLICATION NO.  : 12/560389
DATED            : August 7, 2012
INVENTOR(S)      : Erik Thomsen Page 1 of 2

It is certified that error appears in the above-identified patent and that said Letters Patent is hereby corrected as shown below:

On the face page, in field (56), under "Other Publications", in column 2, line 4, delete "Perfonal" and insert -- Personal --, therefor.

In column 2, line 48, delete "symbol And" and insert -- symbol and --, therefor.

In column 5, line 46, after "G2LH" insert -- . --.

In column 5, line 56, after "parallel" insert -- . --.

In column 6, line 18, after "characters" insert -- . --.

In column 6, line 39, delete "(G1)as" and insert -- (G1) as --, therefor.

In column 6, line 47, delete "(G2)as" and insert -- (G2) as --, therefor.

In column 7, line 23, delete "9510,9520" and insert -- 9510, 9520 --, therefor.

In column 11, line 11, after "contents" insert -- . --.

In column 11, line 22, after "(1))" insert -- . --.

In column 14, line 10, after ""misisippi"" insert -- . --.

In column 14, line 34, delete "TSC," and insert -- $TSC_i$, --, therefor.

In column 18, line 25, after "accumulator" insert -- . --.

In column 21, line 60, after "irregularity" insert -- . --.

In column 28, line 67, after "joining" insert -- . --.

In column 30, line 3, delete "G2Lcell" and insert -- G2L cell --, therefor.

In column 34, line 24, delete "G2l" and insert -- G2L --, therefor.

In columns 35-36, line 18, delete "iff" and insert -- if --, therefor.

In column 37, line 4, after "G1s" insert -- . --.

In column 37, line 56, after "(6511))" insert -- . --.

In column 38, line 5, after "(6532))" insert -- . --.

In column 48, line 32, delete "9510,9520" and insert -- 9510, 9520 --, therefor.

Signed and Sealed this
Fourth Day of December, 2012

David J. Kappos
*Director of the United States Patent and Trademark Office*

In column 50, line 37, delete "doiuble" and insert -- double --, therefor.

In column 50, line 39, delete "doiuble" and insert -- double --, therefor.

In column 54, line 42, after "grammar" insert -- . --.

In column 55, line 65, after "parentheses" insert -- . --.

In column 56, line 6, delete "modifer" and insert -- modifier --, therefor.

In column 57, line 13, after "terms" insert -- . --.

In column 59, line 6, in Claim 1, after "defined" insert -- logical --.

In column 61, line 1, in Claim 27, delete "theplurality" and insert -- the plurality --, therefor.